United States Patent [19]

Kabasawa et al.

[11] Patent Number: 5,956,206
[45] Date of Patent: Sep. 21, 1999

[54] DISK DEVICE FOR A DISK CARTRIDGE, INCLUDING A LATCH/UNLATCH MECHANISM IN COOPERATION WITH THE SLIDER

[75] Inventors: Hidetoshi Kabasawa, Saitama-Ken; Akito Takegawa, Musashino; Kazuo Yokota, Tokyo, all of Japan

[73] Assignee: TEAC Corporation, Tokyo, Japan

[21] Appl. No.: 08/865,078

[22] Filed: May 29, 1997

Related U.S. Application Data

[62] Division of application No. 08/365,457, Dec. 28, 1994, abandoned.

[30] Foreign Application Priority Data

| Dec. 28, 1993 | [JP] | Japan | 5-70712 |
| Mar. 28, 1994 | [JP] | Japan | 6-57472 |
| Jun. 28, 1994 | [JP] | Japan | 6-146834 |
| Aug. 17, 1994 | [JP] | Japan | 6-193396 |
| Dec. 12, 1994 | [JP] | Japan | 6-307917 |

[51] Int. Cl.[6] ............................................. G11B 17/04
[52] U.S. Cl. .................................... 360/99.06; 369/77.2
[58] Field of Search ............................ 360/99.02, 99.03, 360/99.06, 99.07; 369/77.1, 77.2, 75.1, 75.2

[56] References Cited

U.S. PATENT DOCUMENTS

| 4,792,873 | 12/1988 | Uehara | 360/99.06 |
| 4,794,479 | 12/1988 | Nakanishi | 360/99.06 |
| 5,005,092 | 4/1991 | Shigenai et al. | 360/99.06 |
| 5,119,358 | 6/1992 | Soga | 369/77.2 |
| 5,212,605 | 5/1993 | Lim et al. | 360/99.06 |
| 5,335,124 | 8/1994 | Yokota | 360/99.06 |
| 5,386,406 | 1/1995 | Ikuma et al. | 369/77.2 |
| 5,471,356 | 11/1995 | Tsuji | 360/99.03 |
| 5,485,330 | 1/1996 | Hirose et al. | 360/99.06 |

FOREIGN PATENT DOCUMENTS

| 61-178593 | 11/1986 | Japan . |
| 64-33762 | 2/1989 | Japan . |
| 2-27558 | 1/1990 | Japan . |
| 2-122462 | 5/1990 | Japan . |
| 3-214456 | 9/1991 | Japan . |
| 4-195961 | 7/1992 | Japan . |
| 5-258442 | 8/1992 | Japan . |
| 4-105870 | 9/1992 | Japan . |
| 5-28612 | 2/1993 | Japan . |
| 5-109169 | 4/1993 | Japan . |
| 5-182331 | 7/1993 | Japan . |
| 5-55344 | 7/1993 | Japan . |

*Primary Examiner*—Brian E. Miller
*Attorney, Agent, or Firm*—Andrus, Sceales, Starke & Sawall

[57] ABSTRACT

A disk device is constituted such that a latch lever formed with a contact body and a latching body latches a slider and releases its latching action when a disk cartridge is inserted so that the disk cartridge is lowered and properly positioned. The latching body is formed with: a latching part for latching an engaging pawl of an engagement part of the slider; and a releasing part obliquely formed so as to separate the contact body from the end of the disk cartridge main body in response to the movement of the latching pawl in a latching releasing action.

2 Claims, 49 Drawing Sheets

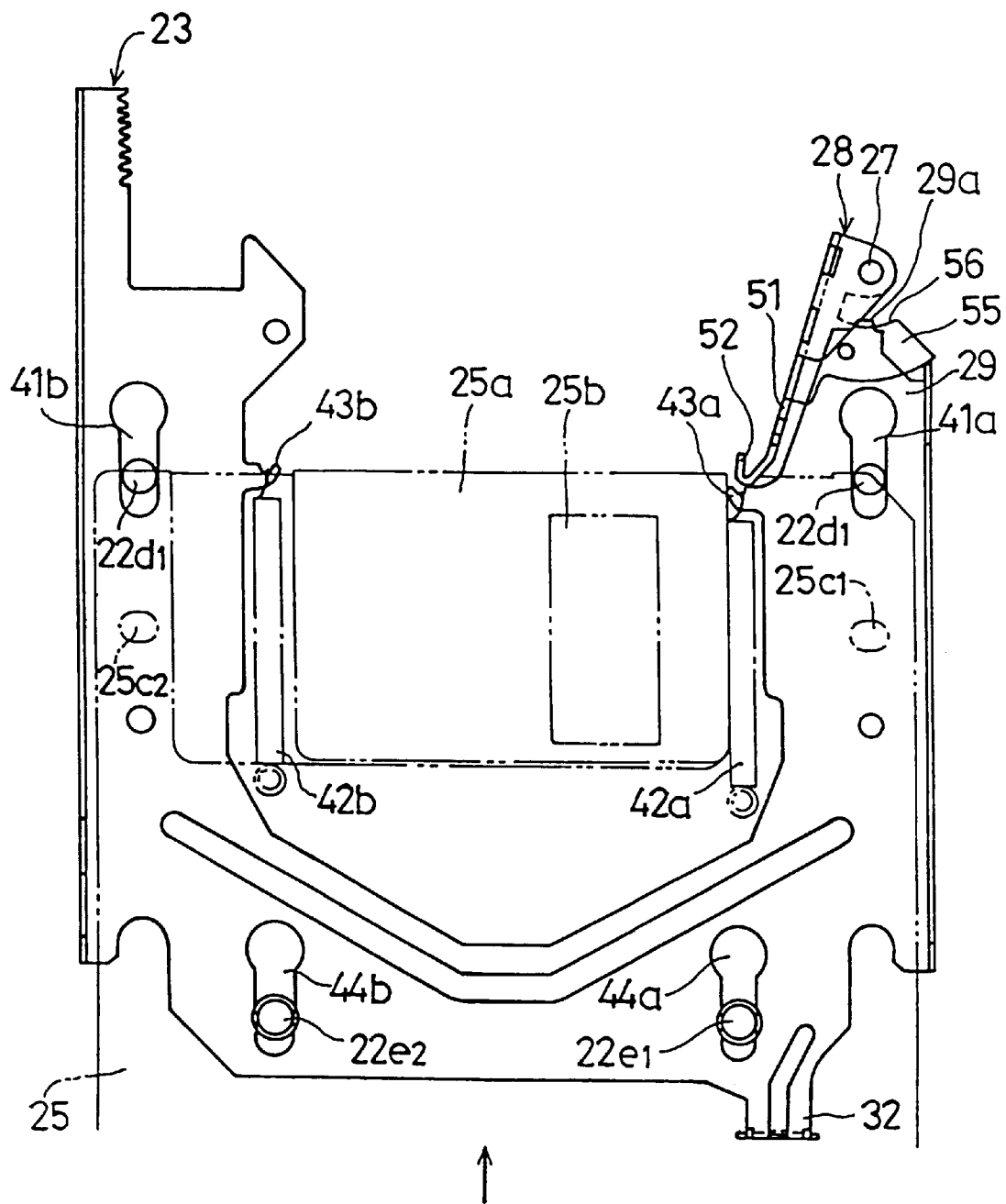

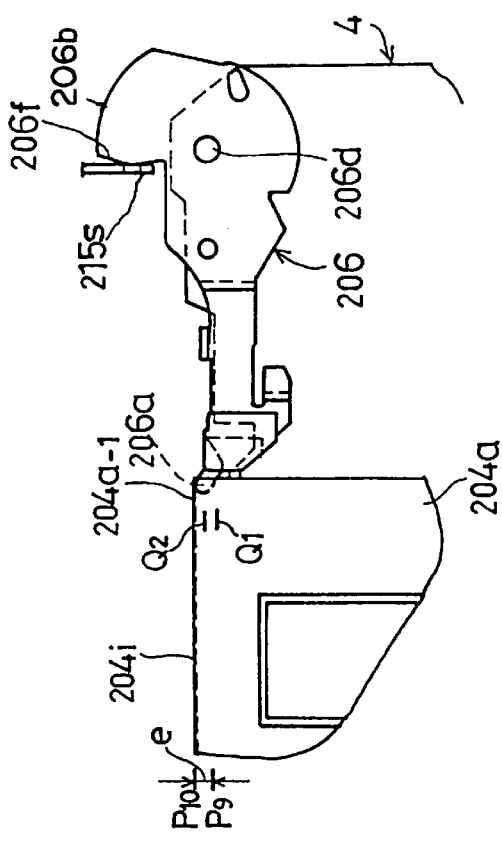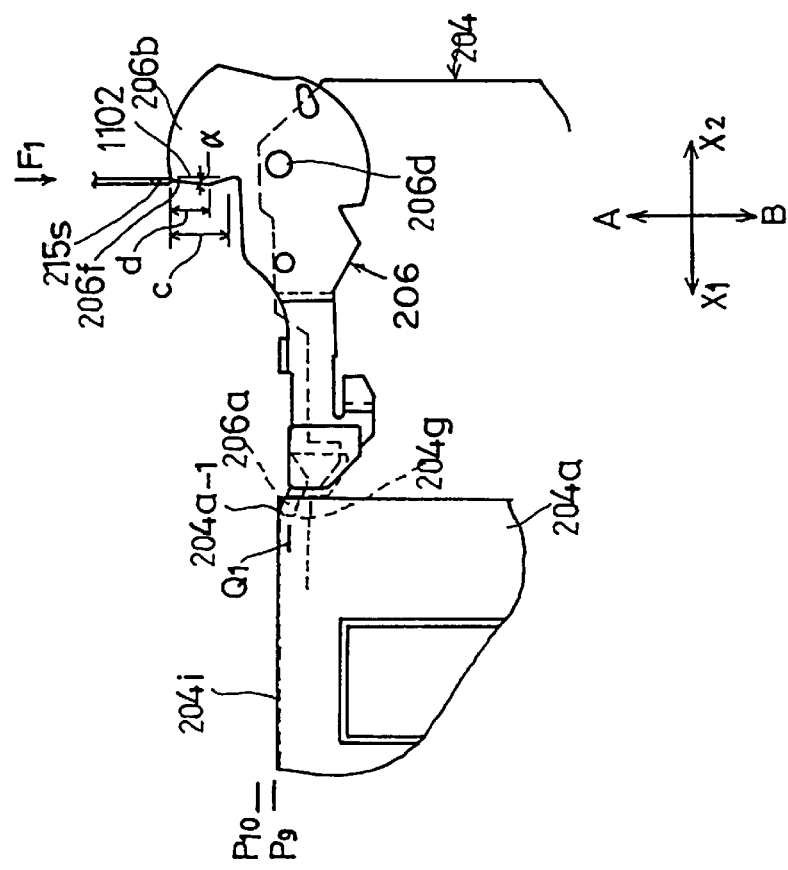

a: ABOUT 0.4mm

α: 5~7 DEGREES

MAGNETIC DISK CARTRIDGE

LATCH LEVER

SHUTTER

SLIDER

HOLDER

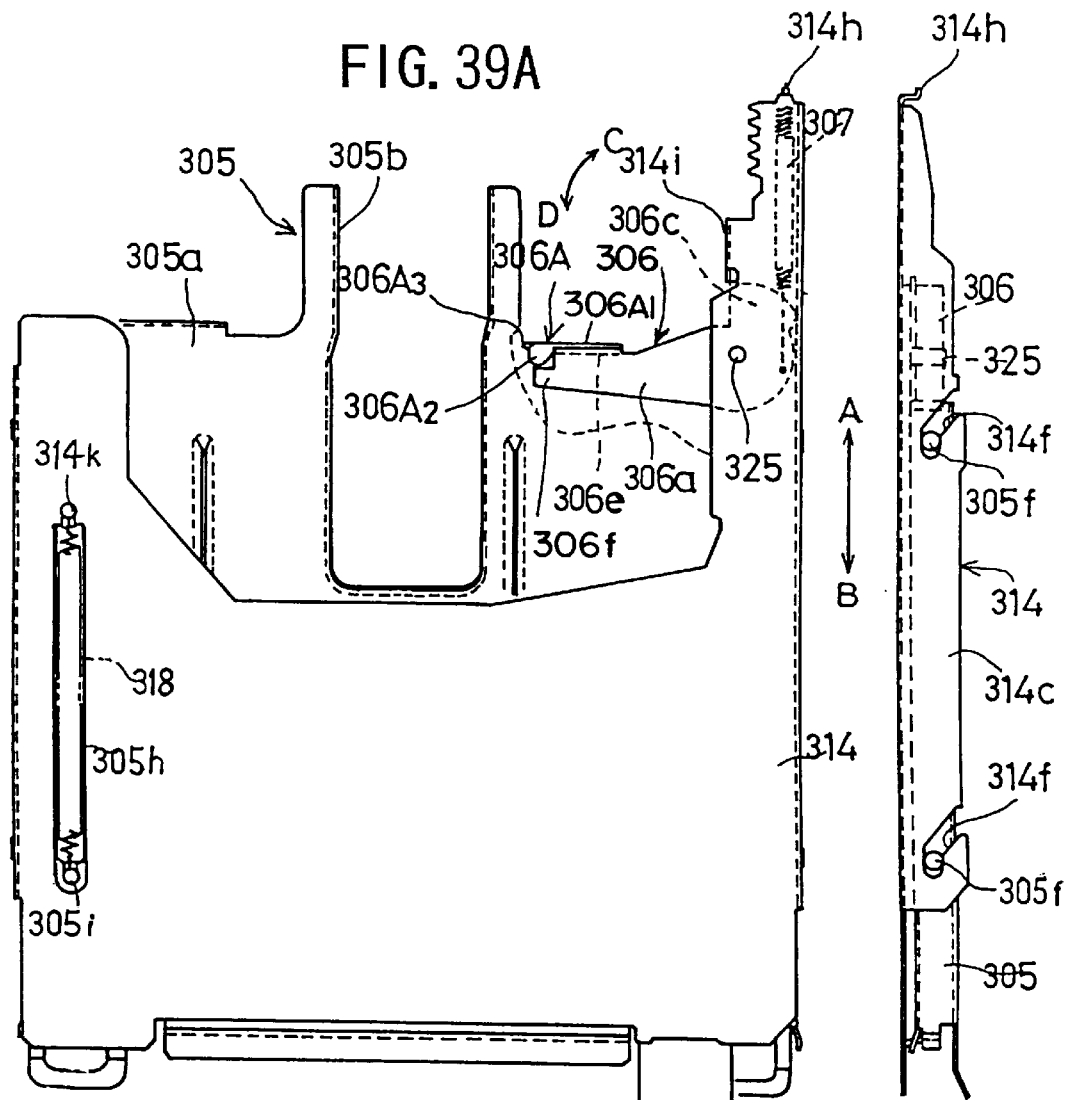

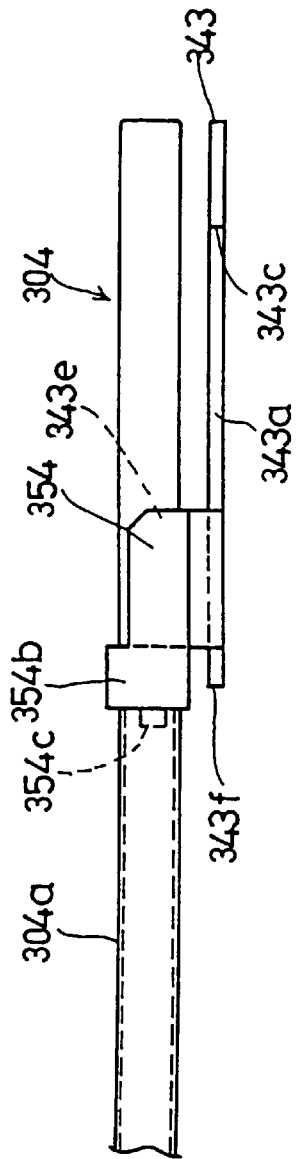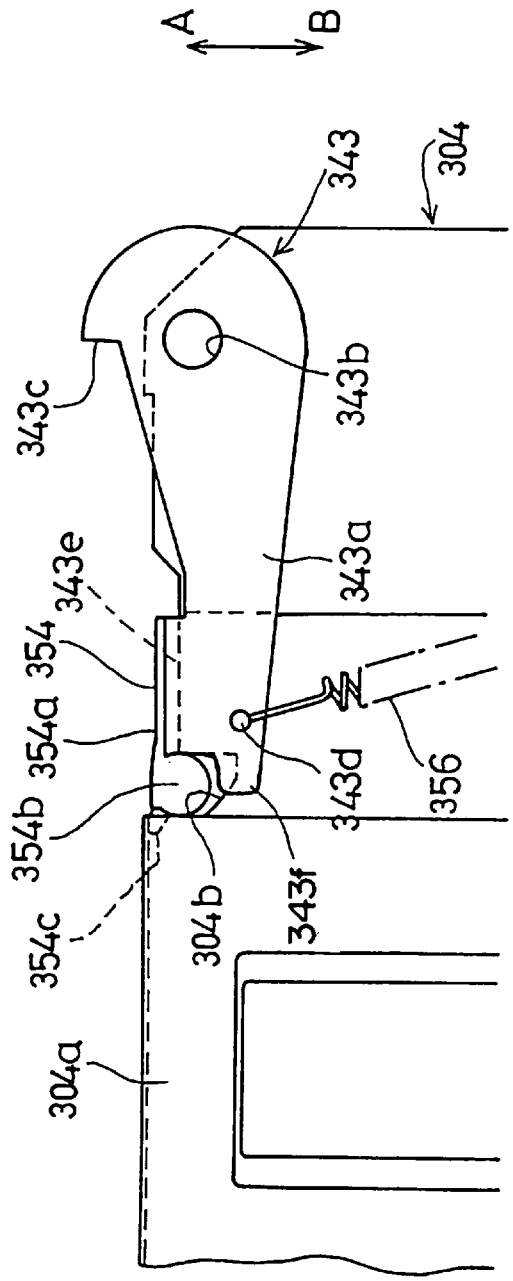
FIG.51A
FIG.51B (A)

(B)

DISK DEVICE FOR A DISK CARTRIDGE, INCLUDING A LATCH/UNLATCH MECHANISM IN COOPERATION WITH THE SLIDER

CROSS-REFERENCE TO RELATED APPLICATIONS

The present application is a divisional application of U.S. patent application Ser. No. 08/365,457, filed Dec. 28, 1994, and now abandoned.

BACKGROUND OF THE INVENTION

1. Field of the Invention

The present invention generally relates to disk devices, and more particularly to a disk device constructed such that a disk cartridge accommodating a disk-shaped recording medium is inserted in the device and mounted therein. Still more specifically, the present invention relates to an improvement relating to a mechanism for mounting an inserted disk cartridge so as to be in a state in which recording/reproducing is enabled.

2. Description of the Background Art

A magnetic disk device is known as one type of disk devices described above. A magnetic disk device performs magnetic recording and reproduction using a disk cartridge accommodating a flexible magnetic disk (disk-shaped recording medium), wherein the cartridge is inserted from outside and mounted in the device (the device is loaded).

A conventional magnetic disk apparatus mainly comprises, for example, a slider and a holder provided on a chassis. The slider is latched to a predetermined position by means of a latch lever.

Specifically, when a magnetic disk cartridge accommodating a disk (recording medium) is inserted into a disk device and held in a holder, the cartridge activates a latch lever so as to allow the slider to slide toward a cartridge insertion opening. In an ejection operation, the slider is made to slide so as to release the latch lever from latching engagement, whereupon the cartridge is thrust and ejected out of the device.

FIG. 1 explains a latching operation of a latch lever of a conventional disk device. In a disk device 11 of FIG. 1, a latch lever 12 is rotatable around a pin 13. The latch lever 12 comprises: a contact part 12a which comes into contact with a disk cartridge 14; and an latching part 12b engageable with an engaging pawl 17 of an engagement part 16 of a slider 15.

The slider 15 is urged in the A direction by means of a spring 18. A groove 16a for allowing substantially conically shaped positioning pins 19a and 19b (the pin 19b is not shown) formed on a chassis (not shown) to be exposed is formed in the engagement part 16. The disk cartridge 14 has a shutter 14a which is openable and closable using the contact part 12a of the latch lever 12. Engaging depressions 14b1 and 14b2 (see FIGS. 2A and 2B) engageable with the positioning pins 19, respectively, are formed in the disk cartridge 14.

When the disk cartridge 14 is not inserted in the disk device 11, the engaging pawl 17 of the engagement part 16 of the slider 15 is latched to an inner curved edge 12b1 of the latching part 12b of the latch lever 12, and the contact part 12a is at a terminal position displaced toward the cartridge insertion opening (in the A direction).

When the disk cartridge 14 is inserted (in the B direction) into a holder (not shown) via the insertion opening, the end of the disk cartridge 14 is engaged with the contact part 12a of the latch lever 12. By thrusting the disk cartridge 14 further into the device, the latch lever 12 is rotated in the C direction indicated by an arrow. Due to the rotation of the latch lever 12, the shutter 14a of the disk cartridge 14 is moved in the D direction indicated by an arrow so that a head window 14c is opened. The engaging pawl 17 is unlatched from the inner curved edge 12b1 of the latching part 12b of the latch lever 12 and slides to a straight part 12b2.

Thereupon, the engaging pawl 17 moves along the straight part 12b2 in the E direction indicated by an arrow. That is, the slider 15 slides in the A direction indicated by an arrow by a force of the spring 18. In this state, the holder is lowered so that the disk medium in the disk cartridge 14 is chucked by a spindle motor (not shown), and the engaging depressions 14b1 and 14b2 of the disk cartridge 14 are engaged with the positioning pins 19a and 19b, respectively. Thus, the disk cartridge 14 is properly positioned.

Even when the engaging pawl 17 of the slider 15 is disengaged from the latch lever 12 due to the insertion of the disk cartridge 14 so that the slider 15 is allowed to slide, the contact part 12a of the latch lever 12 urges the disk cartridge 14 in the F direction indicated by an arrow.

FIGS. 2A and 2B show a relationship between the latch lever and the disk cartridge shown in FIG. 1. FIG. 2A is a top view, and FIG. 2B is a side cross sectional view. Referring to FIGS. 2A and 2B, the maintaining of the urging force exerted in the F direction by the contact part 12a of the latch lever 12 even when the latching engagement is absent, may result in the engaging depressions 14b1 and 14b2 settling on the slope of the conically shaped positioning pins 19a and 19b, respectively, while the disk cartridge 14 is being lowered due to the lowering of the holder. Accordingly, there is a problem in that a loading error may occur, wherein the disk cartridge 14 is not lowered to a preset position.

There is another problem that may occur in a process including the insertion and mounting of the disk cartridge. This problem will be described below with reference to FIGS. 3 and 4.

FIGS. 3 and 4 are plan views showing the shutter 14a of the magnetic disk cartridge 14. FIG. 3 is a top view, and FIG. 4 is a cross sectional view of the cartridge 14.

A cartridge main body 10 constituting the cartridge 14 is provided with a groove 10c at the lower major surface thereof, the groove 10c extending in the X1–X2 direction. Pawls 14a-2 and 14a-3 formed in the shutter 14a are engaged with the groove 10c. The shutter 14a moves in the X1–X2 direction while the pawls 14a-2 and 14a-3 are guided by the groove 10c. FIG. 3 shows a state in which the shutter is closed and resides at an end position displaced in the X2 direction.

However, when the cartridge 14 is inserted forcibly in the conventional disk device 11, a relatively large force is exerted on the shutter 14a as the shutter 14a begins to be opened. As a result, the pawls 14a-2 and 14a-3 of the shutter 14a may be dislodged from the groove 10c so as to reside on the surface of the cartridge main body 10 near the groove 10c. Thus, the conventional magnetic disk 11 has a problem in that the shutter 14a and the cartridge main body 10 may come apart.

Still another problem that may occur during the disk cartridge 14 insertion and mounting operation will be described below.

FIGS. 5A and 5B are cross sectional views of a conventional thin magnetic disk device comprising a frame 2 and a front bezel 3. The frame 2 is provided with raised parts 19c and 19d for positioning the magnetic disk cartridge 14 at a preset position. The raised part 19c has, at its center, the positioning pin 19a (19b) tapered toward the top. As shown in FIG. 6 on an enlarged scale, the front bezel 3 has a lower beam 3A and a upper beam 3B. The beams 3A and 3B are formed with notches 3A-1 and 3B-1, respectively, so that the magnetic disk cartridge insertion operation is easily performed. The lower beam 3A has a recessed step portion 3A-2 adjacent to the frame 2. The front of the lower beam 3A has a raised portion 3A-3 formed by the presence of the recessed step portion 3A-2. The recessed step portion 3A-2 forms, above its upper major surface, a space 4 for accommodating a rear edge 14b of the magnetic disk cartridge 14 when the magnetic disk cartridge 14 is inserted. As shown in FIG. 5B, the raised portion 3A-3 acts to hide a part of the inserted magnetic disk cartridge 14.

The magnetic disk device shown in FIGS. 5A and 5B has a magnetic disk cartridge mounting mechanism 5 comprising a holder 5A.

As shown in FIG. 5B, the magnetic disk cartridge 14 is mounted in a preset position such that the positioning depression 14d of a lower face 14c are engaged with the positioning pins 19a (19b), the lower face 14c rests on the raised parts 19c and 19d, and the rear edge 14b is accommodated in the space 4.

The mounting operation of the magnetic disk cartridge 14 is carried out in the following manner.

(1) An operator inserts the magnetic disk cartridge 14 from an opening 3a into the holder 5A, the shutter 14A at the leading edge of the cartridge.

(2) As shown in FIG. 5A, the operator uses his or her finger to thrust a rear end 14e of the magnetic disk cartridge 14 until the tip of the finger comes into contact with the notches 3A-1 and 3B-1 of the front bezel 3. In this way, the entirety of the magnetic disk cartridge 14 introduced into the magnetic disk device.

(3) When the magnetic disk cartridge 14 is settled in a position shown in FIG. 5A, the magnetic disk cartridge 14 releases the magnetic disk cartridge mounting mechanism 5 from a latch (not shown) so that the magnetic disk cartridge mounting mechanism 5 is activated.

In this state, the magnetic disk cartridge 14 is positioned such that the positioning depression 14d reside directly above the positioning pin 19a (19b), the rear end 14e resides at a position P2 slightly displaced in the A direction indicated by an arrow with respect to a position P1 of the edge of the raised portion 3A-3 of the lower beam 3A, and a front end 14i of the disk cartridge 14 resides at a position P10.

When the magnetic disk cartridge mounting mechanism 5 is activated, the holder 5A is moved in the Z2 direction to reach a height H2.

The magnetic disk cartridge 14 is lowered vertically together with the holder 5A so as to be mounted as shown in FIG. 5B.

It will be noted that, in order for the magnetic disk cartridge 14 to be mounted properly, the rear end 14e needs to be introduced deep enough into the device to reach the position P2 beyond the raised portion 3A-3 of the front bezel 3.

However, in thin magnetic disk devices in which the opening 3a of the front bezel is relatively narrow, the magnetic disk cartridge 14 may not be positioned at the position P2 (P10) without the finger of the operator being pressed hard against the front bezel 3.

As described above, the conventional magnetic disk device has a drawback with regard to the operability of the magnetic disk cartridge mounting operation.

There is another drawback with the conventional magnetic disk device in that, when the cartridge 14 is ejected forcibly, an oscillation may cause the latch lever 12 to be disengaged from the shutter 14a with the result that a magnetic head may be gripped by the shutter 14a.

SUMMARY OF THE INVENTION

Accordingly, a general object of the present invention is to provide a disk device in which the aforementioned drawbacks of the conventional technology are eliminated.

Another and more specific object of the present invention is to provide a disk device in which mounting and ejection of the disk cartridge can be carried out in a stable manner.

The aforementioned objects can be achieved by a disk device comprising:

a holder for holding a disk cartridge accommodating a disk shaped recording medium;

a slider for raising and lowering the holder; and a latch member which releases its latching action on the slider at a predetermined position so as to position the disk cartridge inside the holder at a predetermined position;

wherein, the latch member comprises:

a contact part which comes into contact with a shutter of the disk cartridge;

a latching part for latching the slider by being engaged with an engagement part of the slider; and a releasing part which receives a force for separating the contact part from the end of the disk cartridge, when the releasing part releases its latching action on the slider at a predetermined position.

For example, the releasing part has a face slanting with respect to the engagement part of the slider.

The aforementioned objects can also be achieved by a disk device comprising:

a holder for holding a disk cartridge accommodating a disk shaped recording medium;

a slider for raising and lowering the holder; and a latch member which releases its latching action on the slider at a predetermined position so as to position the disk cartridge inside the holder at a predetermined position; and means for leading in the disk cartridge by a predetermined distance into the holder, wherein the latch member comprises:

a contact part which comes into contact with a shutter of the disk cartridge;

a latching part for latching the slider by being engaged with an engagement part of the slider; and For example, the means includes a cooperation mechanism which activates the latch member so as to lead in the disk cartridge into the holder by a predetermined distance, in cooperation with the movement of the slider.

The aforementioned objects can also be achieved by a disk device comprising:

a holder for holding a disk cartridge accommodating a disk shaped recording medium;

a slider for raising and lowering the holder; and a latch member which releases its latching action on the slider at a predetermined position so as to position the disk cartridge inside the holder at a predetermined position;

wherein the latch member comprises:

a contact part which comes into contact with a shutter of the disk cartridge;

a latching part for latching the slider by being engaged with an engagement part of the slider, the disk device also comprising:

a restraining member which, disposed adjacent to the contact part of the latch member, restrains the movement of the shutter in a direction in which the disk cartridge is inserted, the restraining being done when the contact part is near a position at which the contact part comes into contact with the shutter.

For example, the contact part has an engaging pawl projecting from the end of the latch member, and wherein the restraining member has an engaging pawl which projects from the end of the latch member and forms a sharp angle with respect to the engaging pawl.

The aforementioned objects can also be achieved by a disk device comprising:

a holder for holding a disk cartridge accommodating a disk shaped recording medium;

a slider for raising and lowering the holder; and a latch member which releases its latching action on the slider at a predetermined position so as to position the disk cartridge inside the holder at a predetermined position;

wherein, the latch member comprises:

a contact part which comes into contact with a shutter of the disk cartridge;

a latching part for latching the slider by being engaged with an engagement part of the slider, wherein the contact part comprises an engagement part which slides the disk cartridge in a direction in which the shutter is opened, and which is engaged with a depression formed at the front of the disk cartridge.

For example, the engagement part has a projection inserted into a gap formed between the shutter and the front of the disk cartridge.

For example, the latch member has a disk cartridge contact part which comes into contact with a sloping part formed at the front of the disk cartridge and returns the disk cartridge inserted in a tilted position to a level position.

For example, the latch member is rotatably fitted to the holder.

The aforementioned objects can also be achieved a disk device comprising:

a holder which holds a disk cartridge accommodating a disk shaped recording medium and is movable between a position at which the disk cartridge is mounted and a position at which the disk cartridge is inserted or ejected;

a latch member which, provided in the holder, releases its latching action on the disk cartridge at a predetermined position so as to position the disk cartridge inside the holder at a predetermined position at which the disk cartridge is mounted;

wherein, the latch member comprises:

a contact part which comes into contact with a shutter of the disk cartridge;

a latching part for latching the holder by being engaged with an engagement part of the slider; and an engagement part for latching the holder by being engaged with an engagement part of the slider.

BRIEF DESCRIPTION OF THE INVENTION

Other objects and further features of the present invention will be apparent from the following detailed description when read in conjunction with the accompanying drawings, in which:

FIGS. 9, 10 and 11 show the latching operation of the latch lever shown in FIGS. 8A and 8B;

FIGS. 24A and 24B show the operation of leading in the magnetic disk cartridge in the second embodiment;

Figure 27:
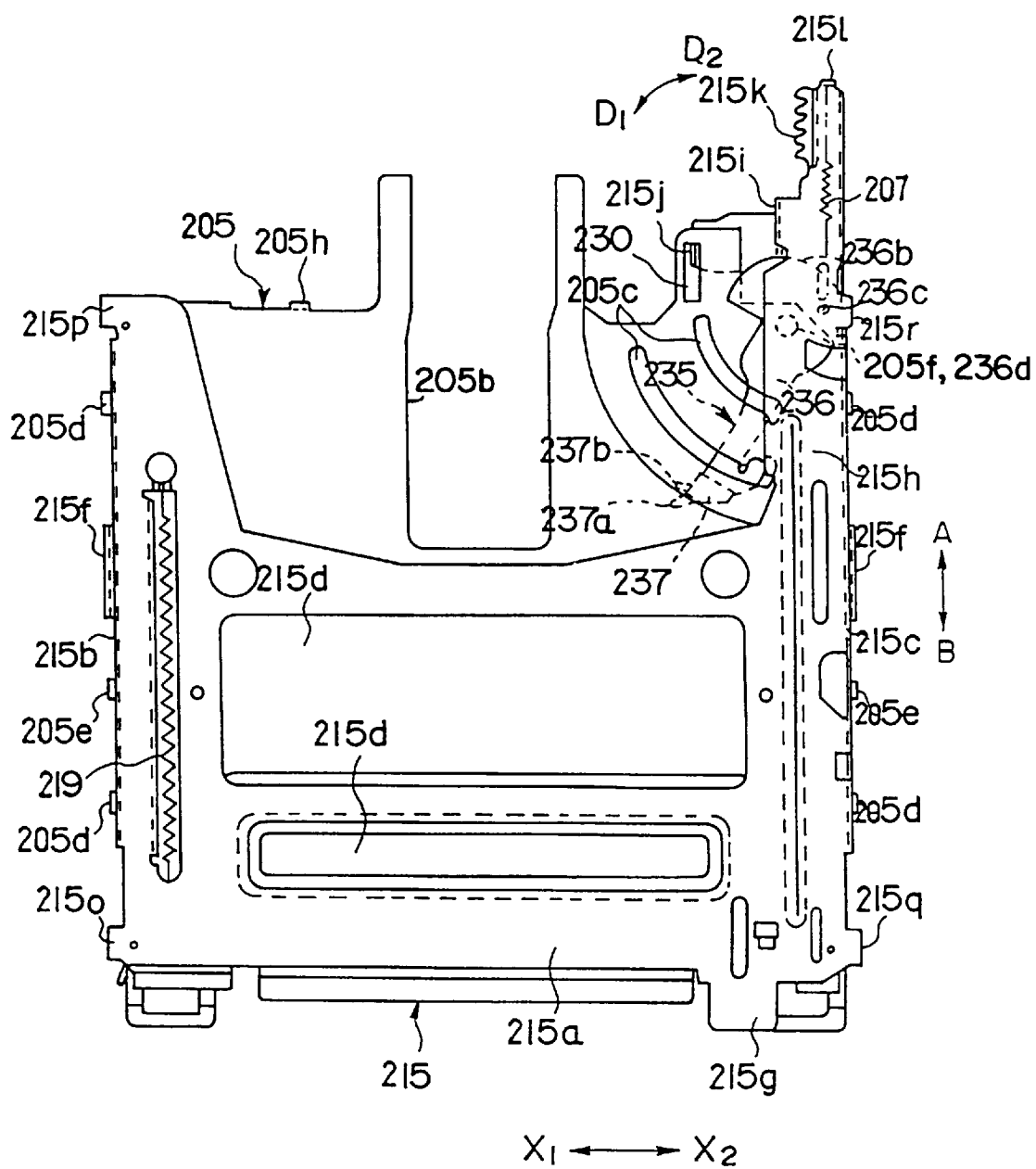
Figure 28:
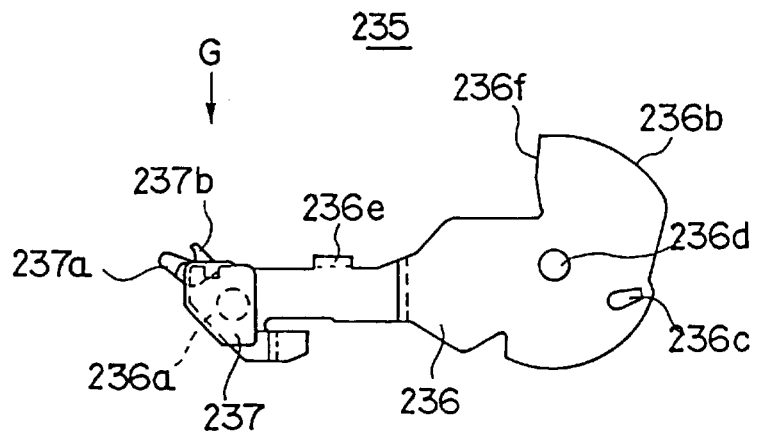
Figure 29:
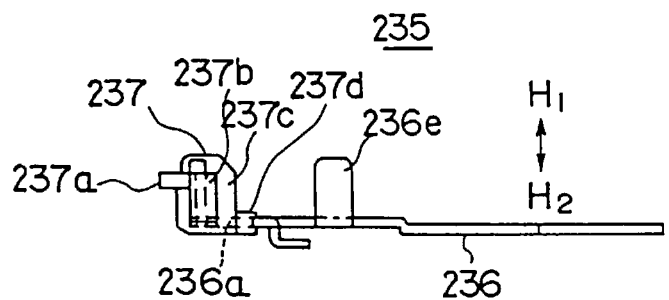
Figure 30:
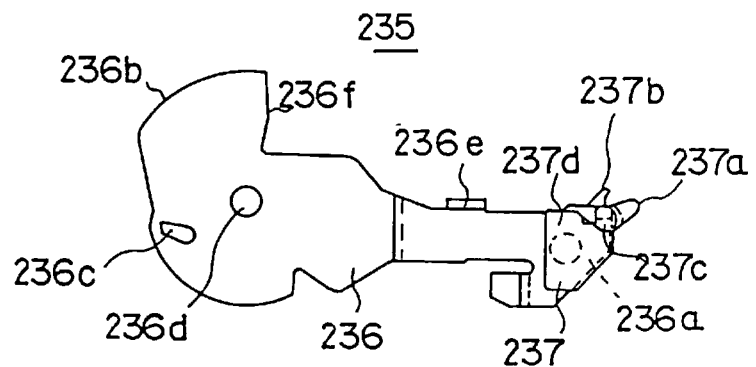
Figure 31:
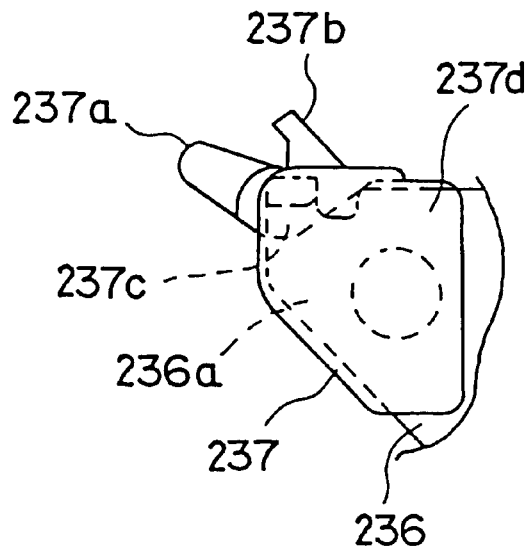
Figure 32:
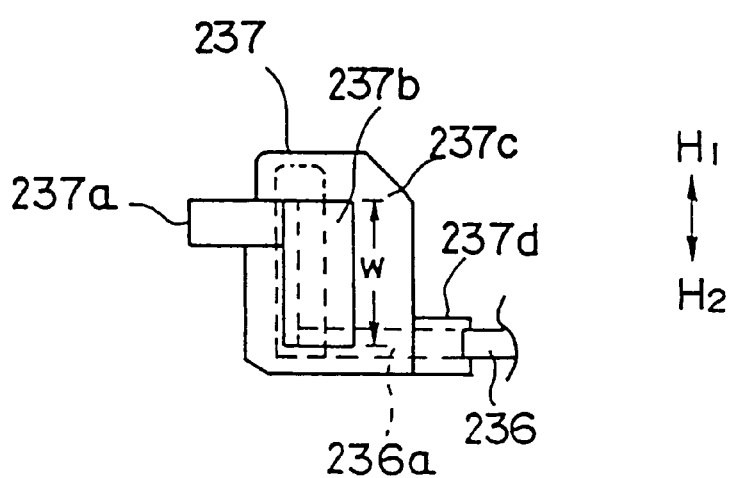
Figure 33:
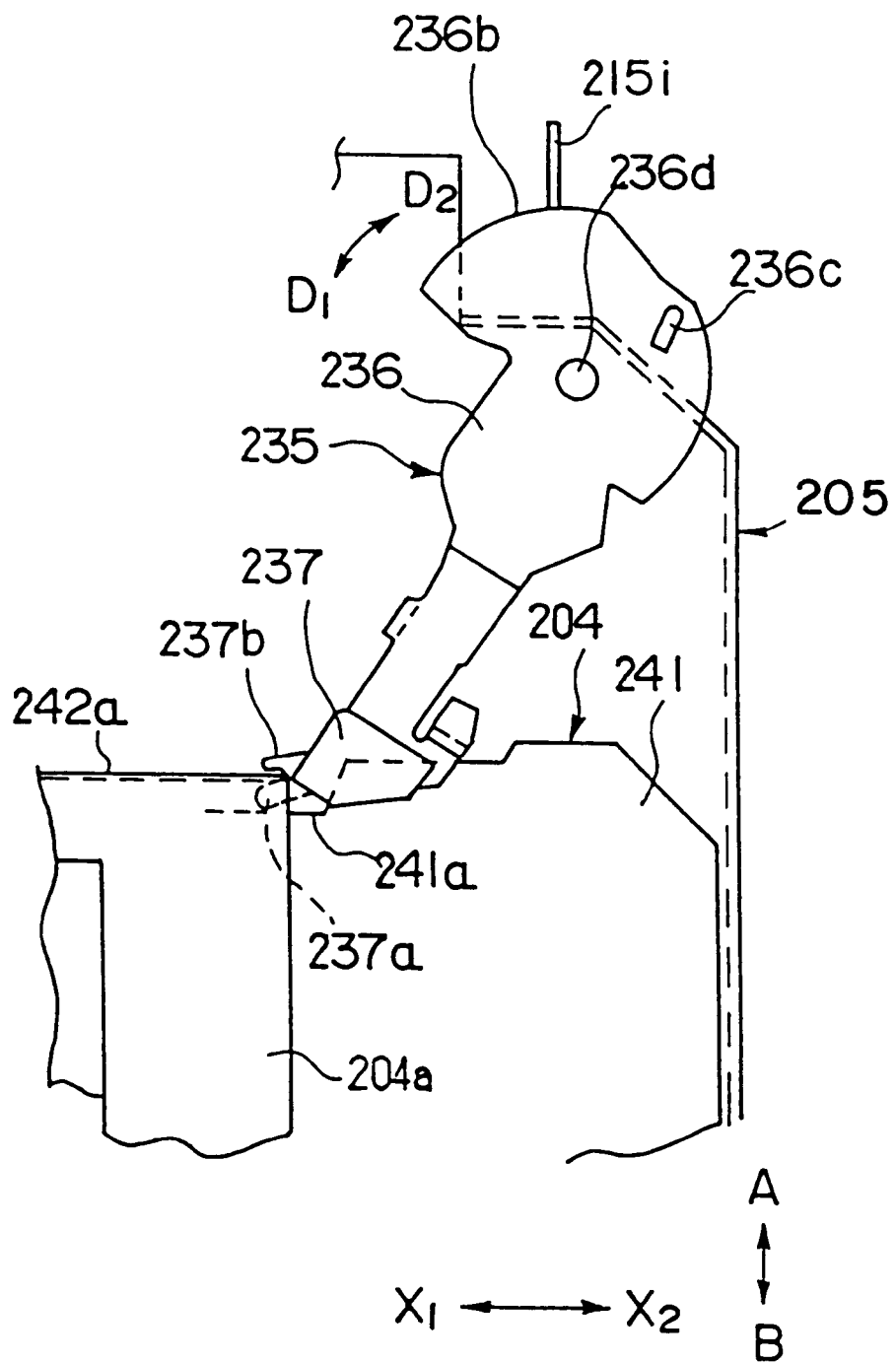
Figure 34:
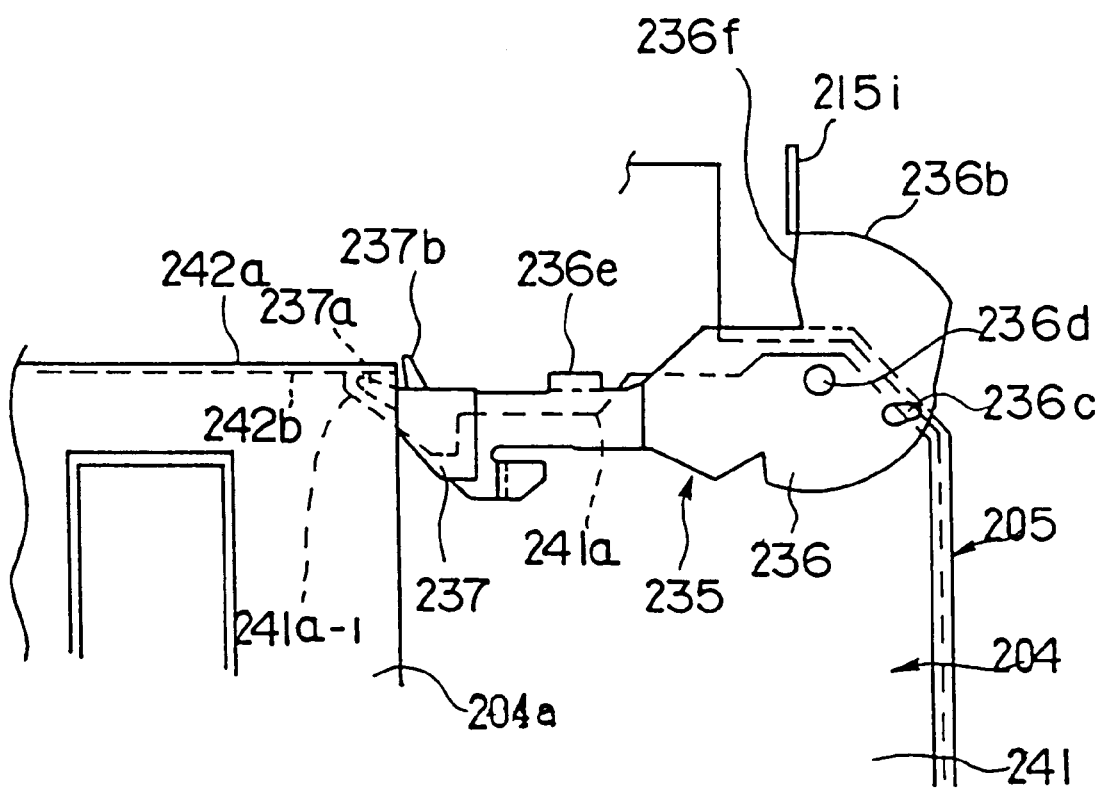
Figure 35:
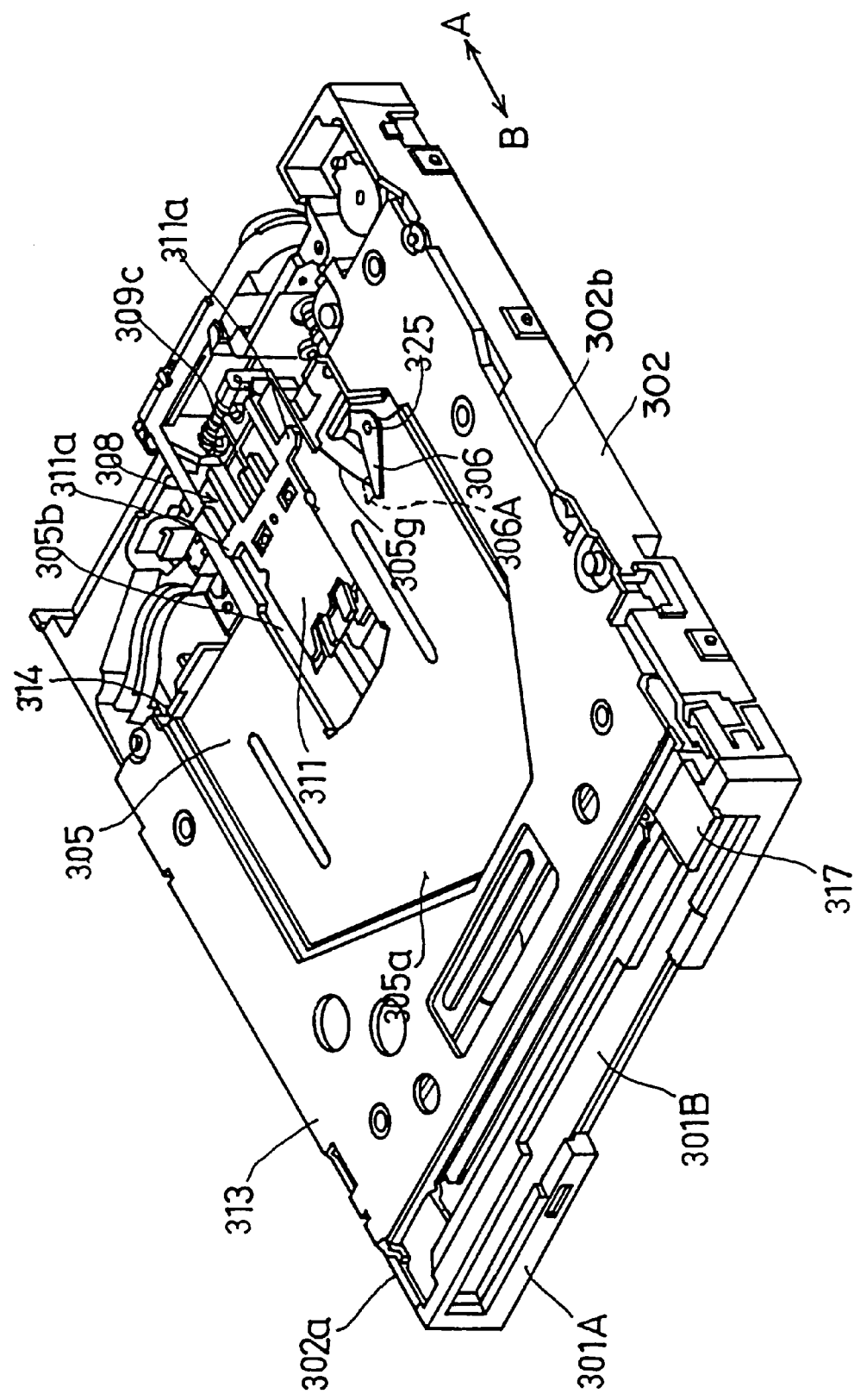
Figure 36:
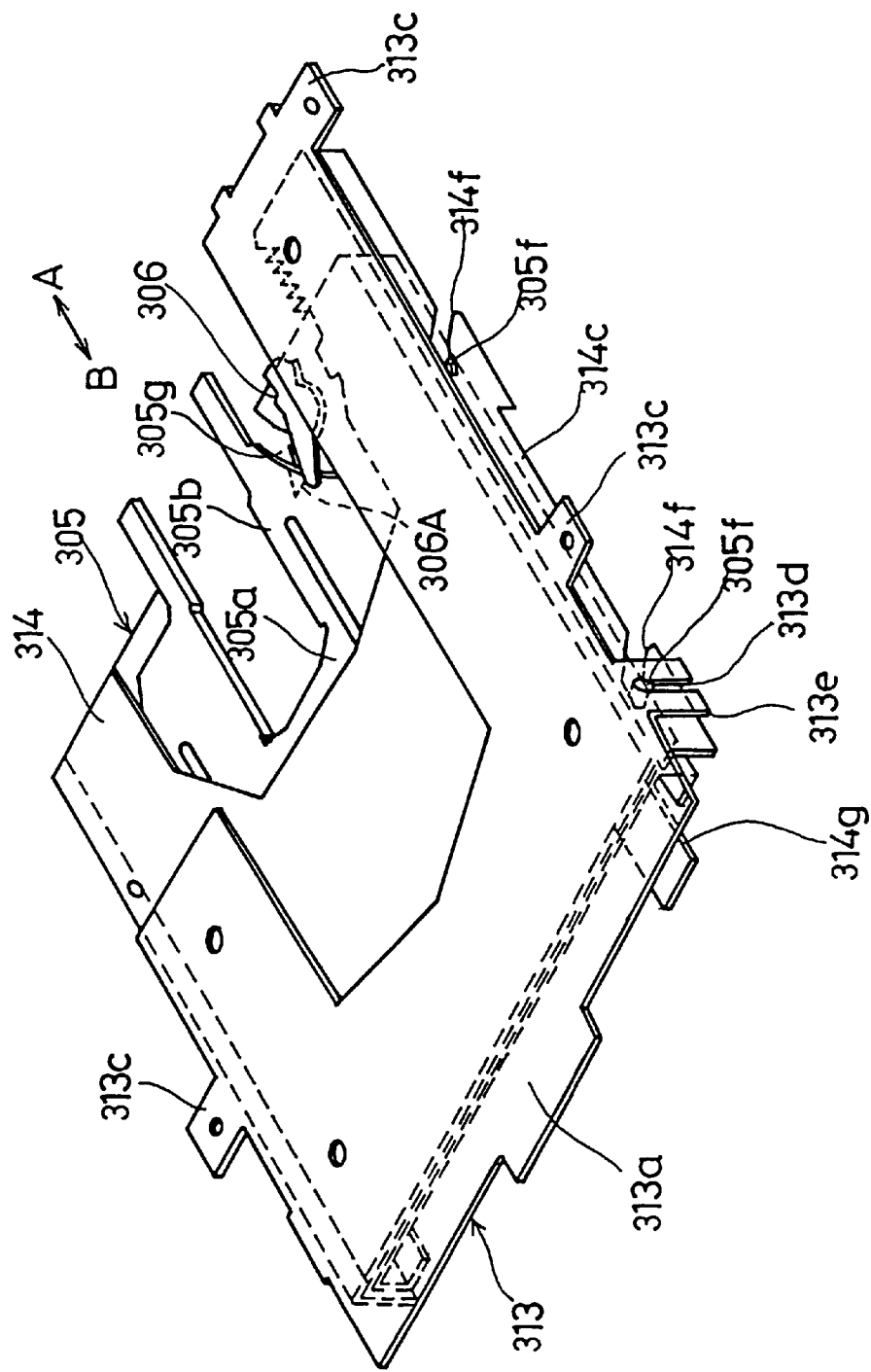
Figure 37:
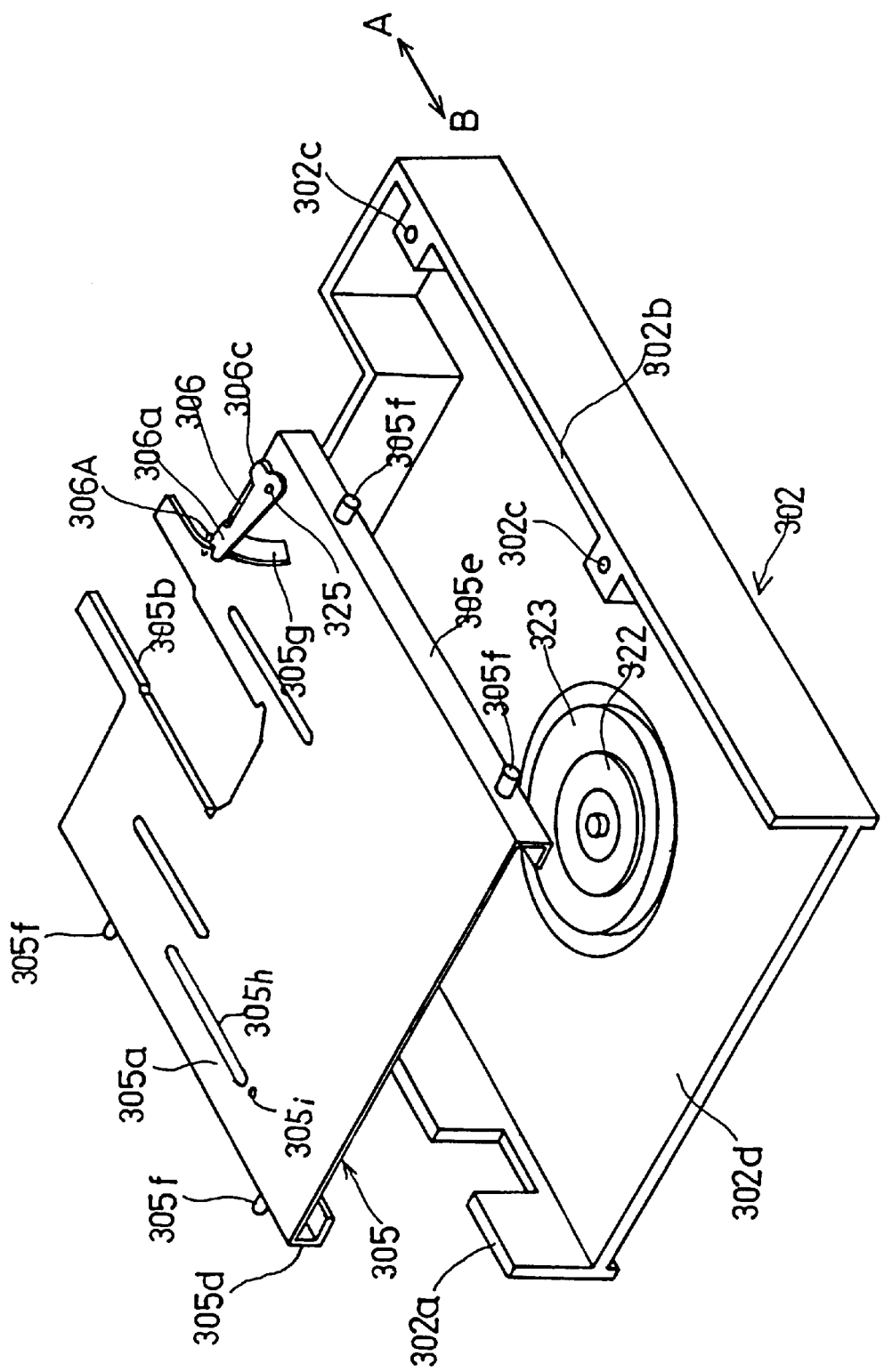
Figure 38:
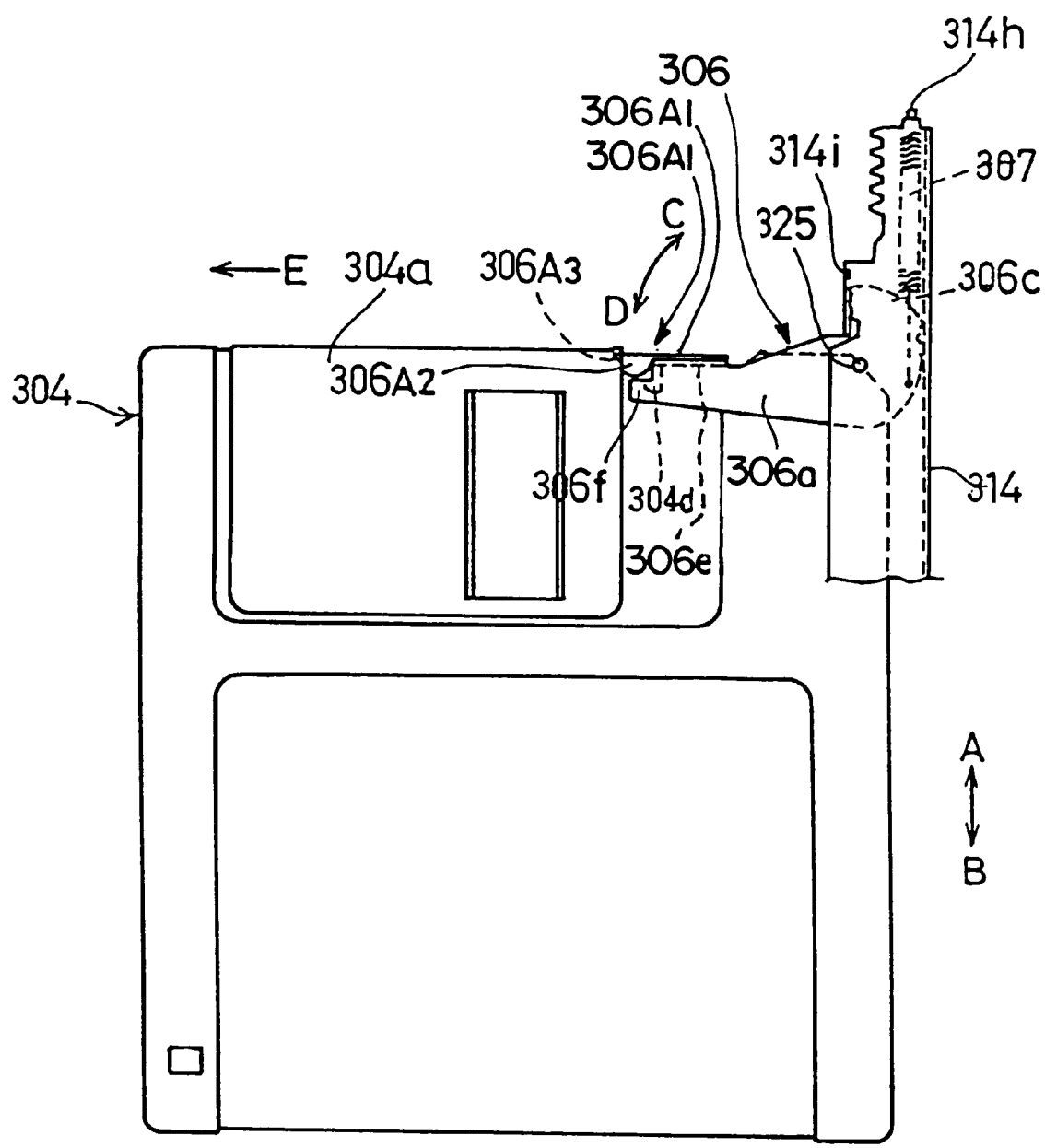
Figure 40A:
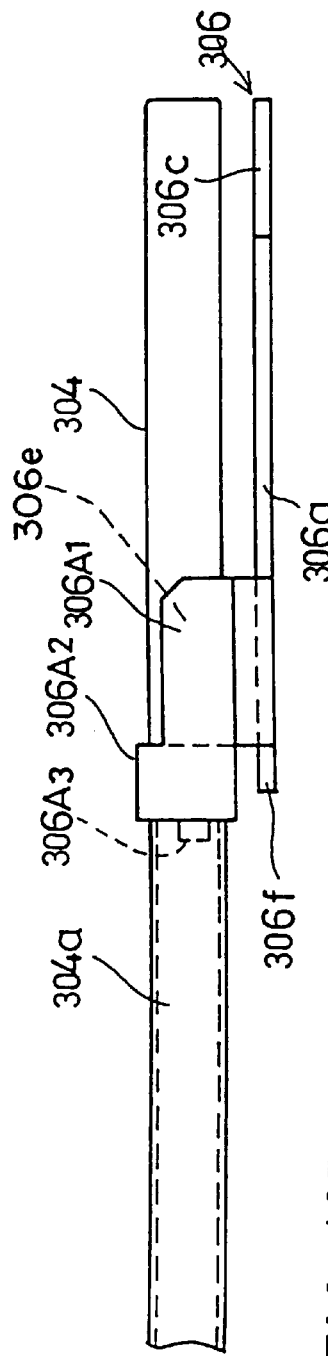
Figure 40B:
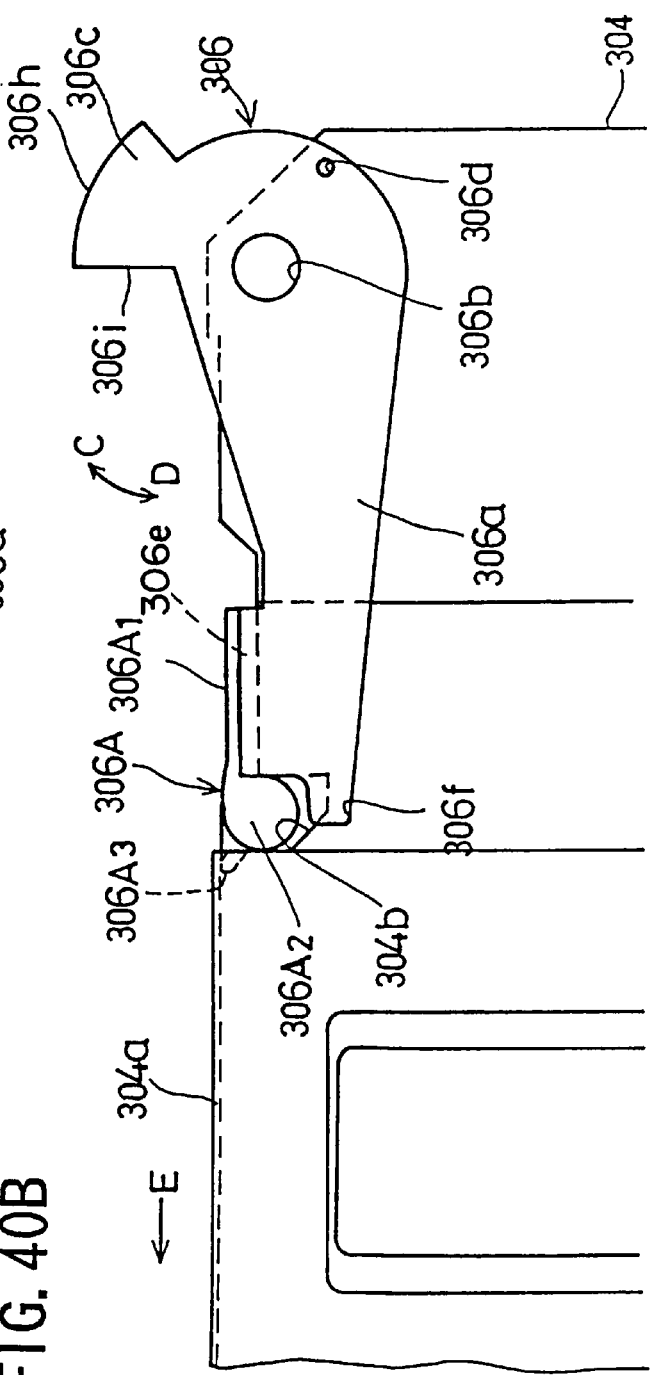
Figure 41:
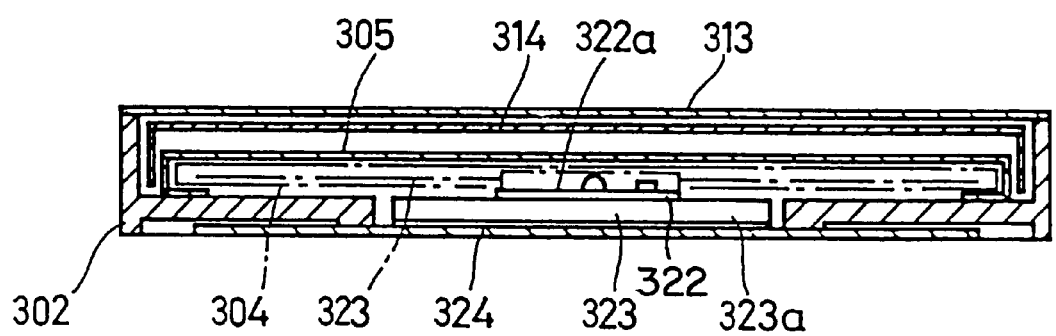
Figure 44:
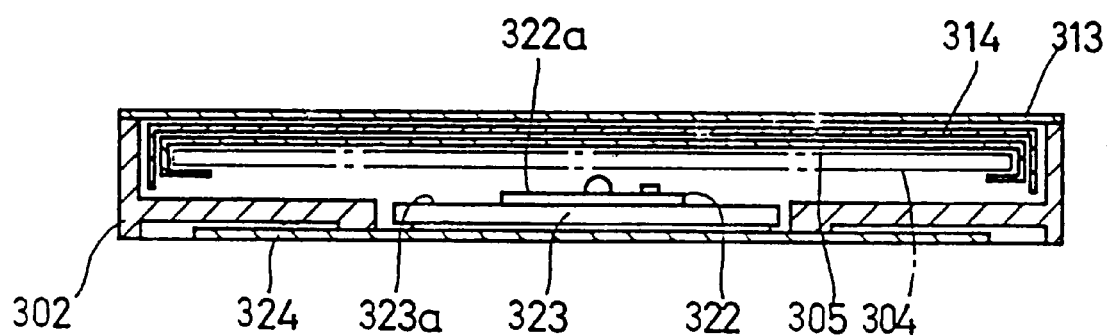
Figure 42:
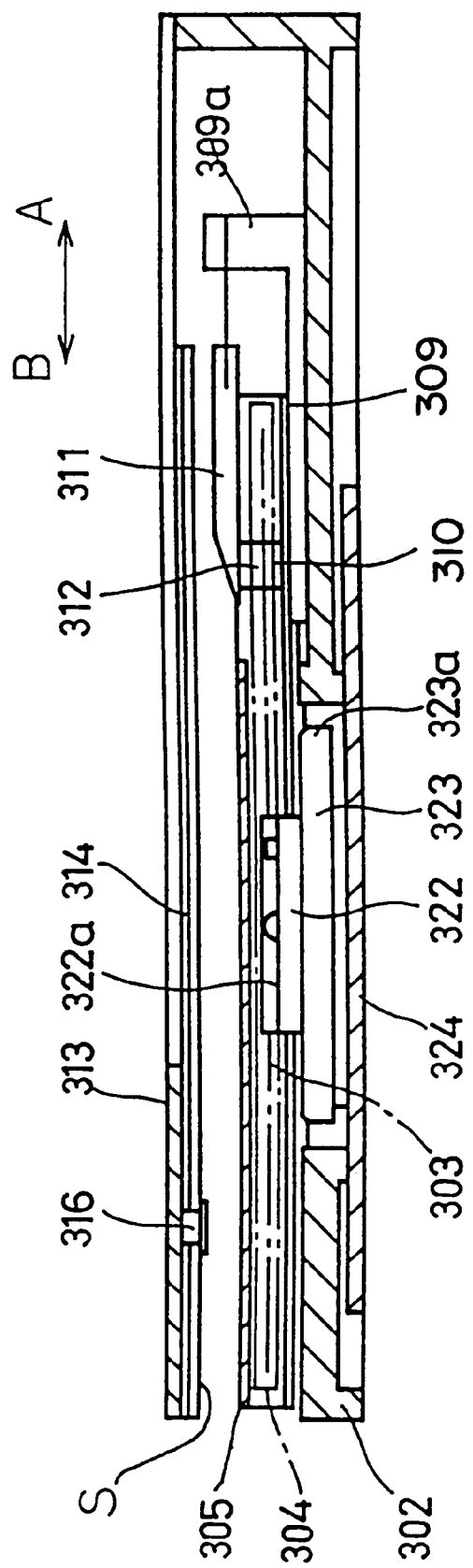
Figure 43:
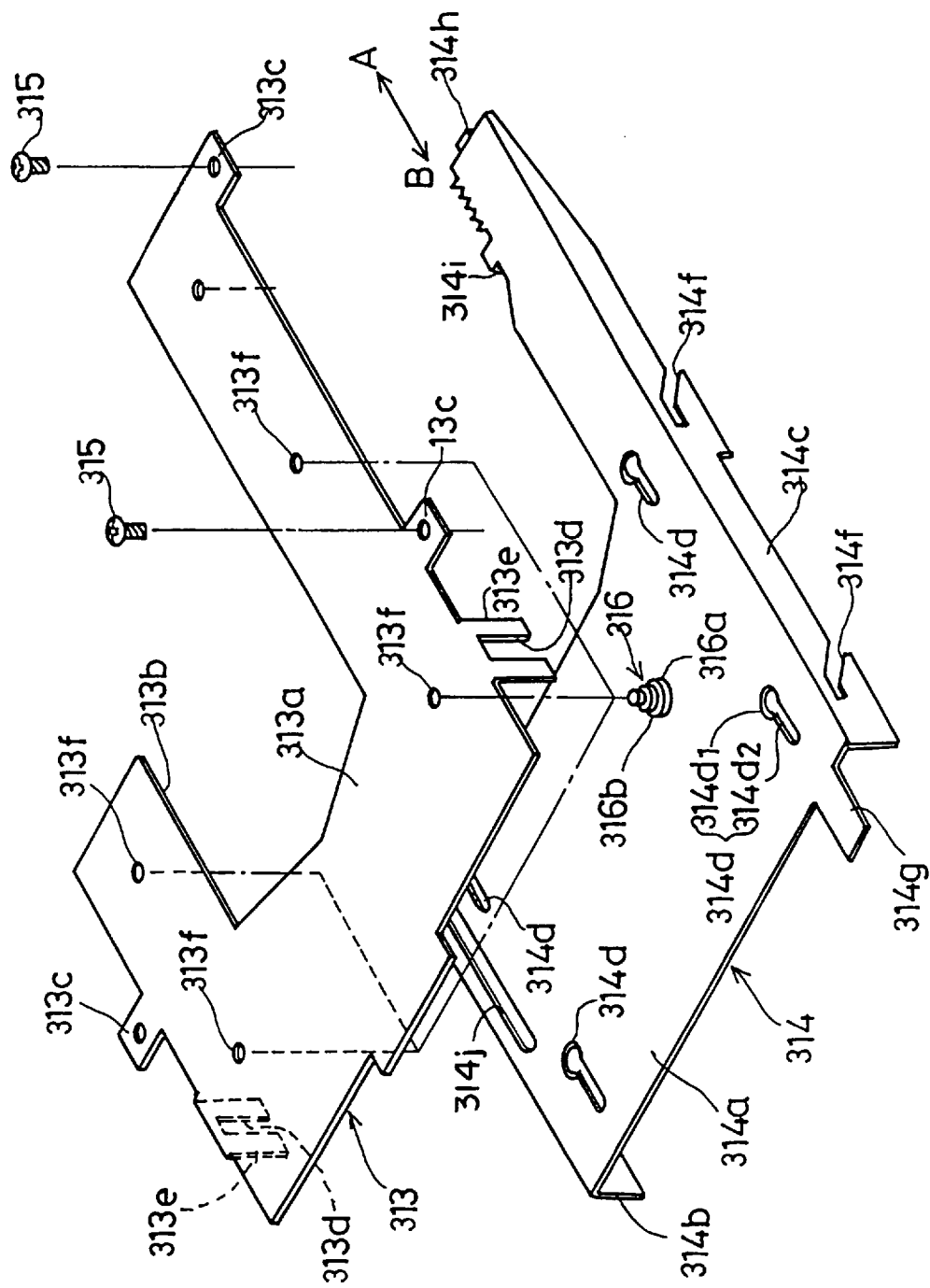
Figure 45:
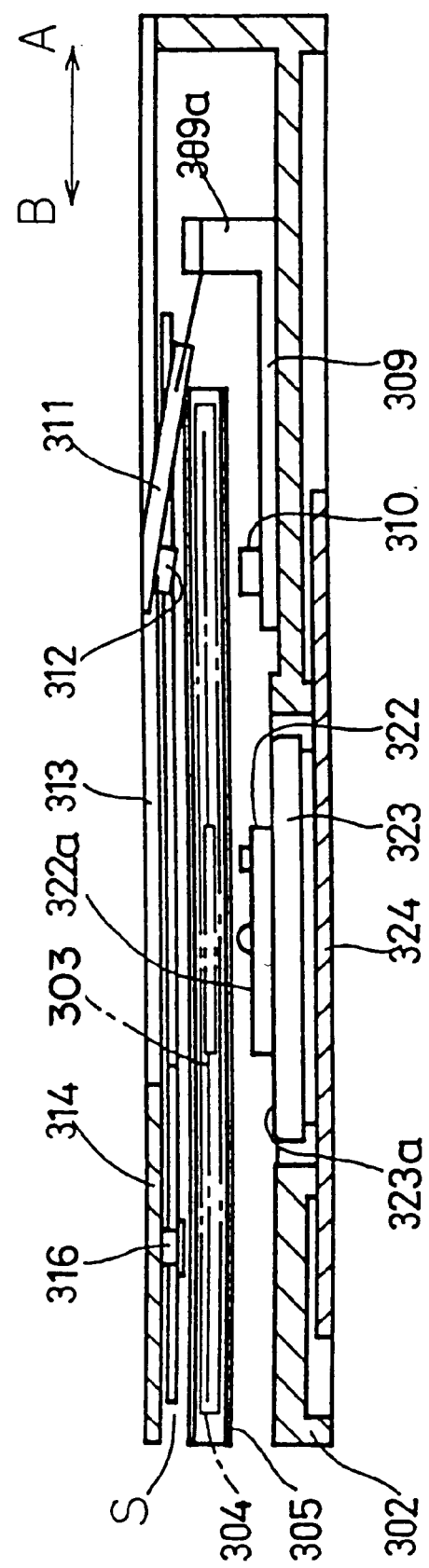
Figure 46A:
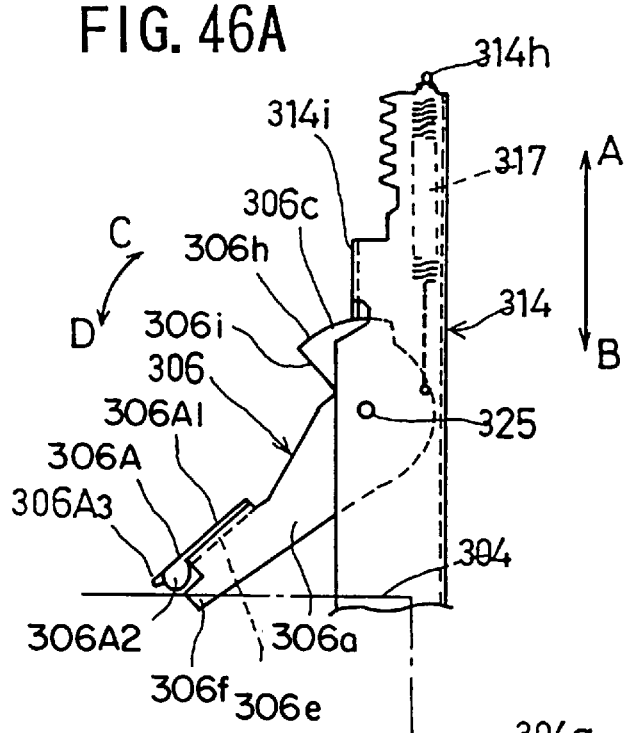
Figure 46B:
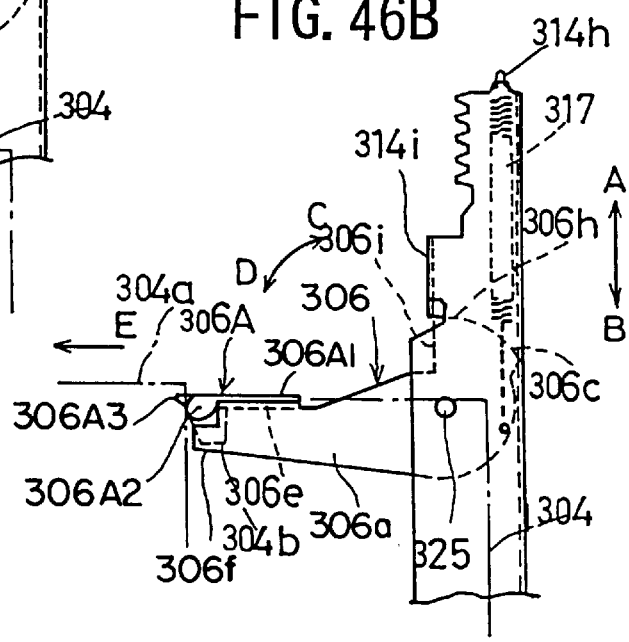
Figure 46C:
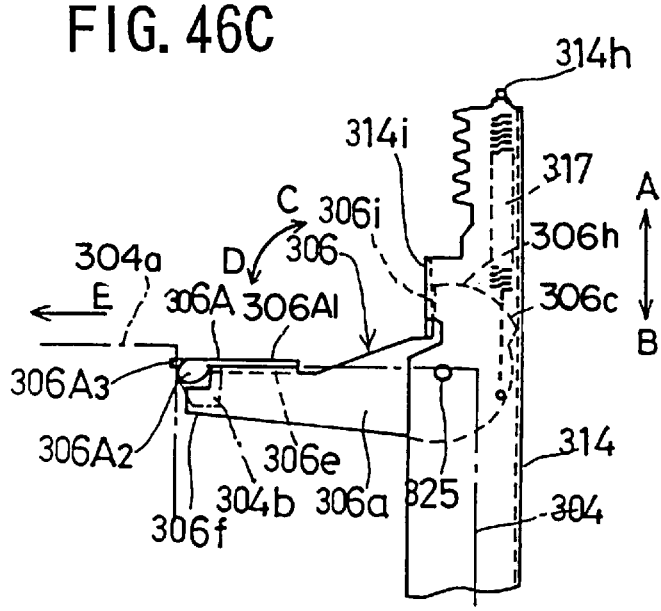
Figure 47:
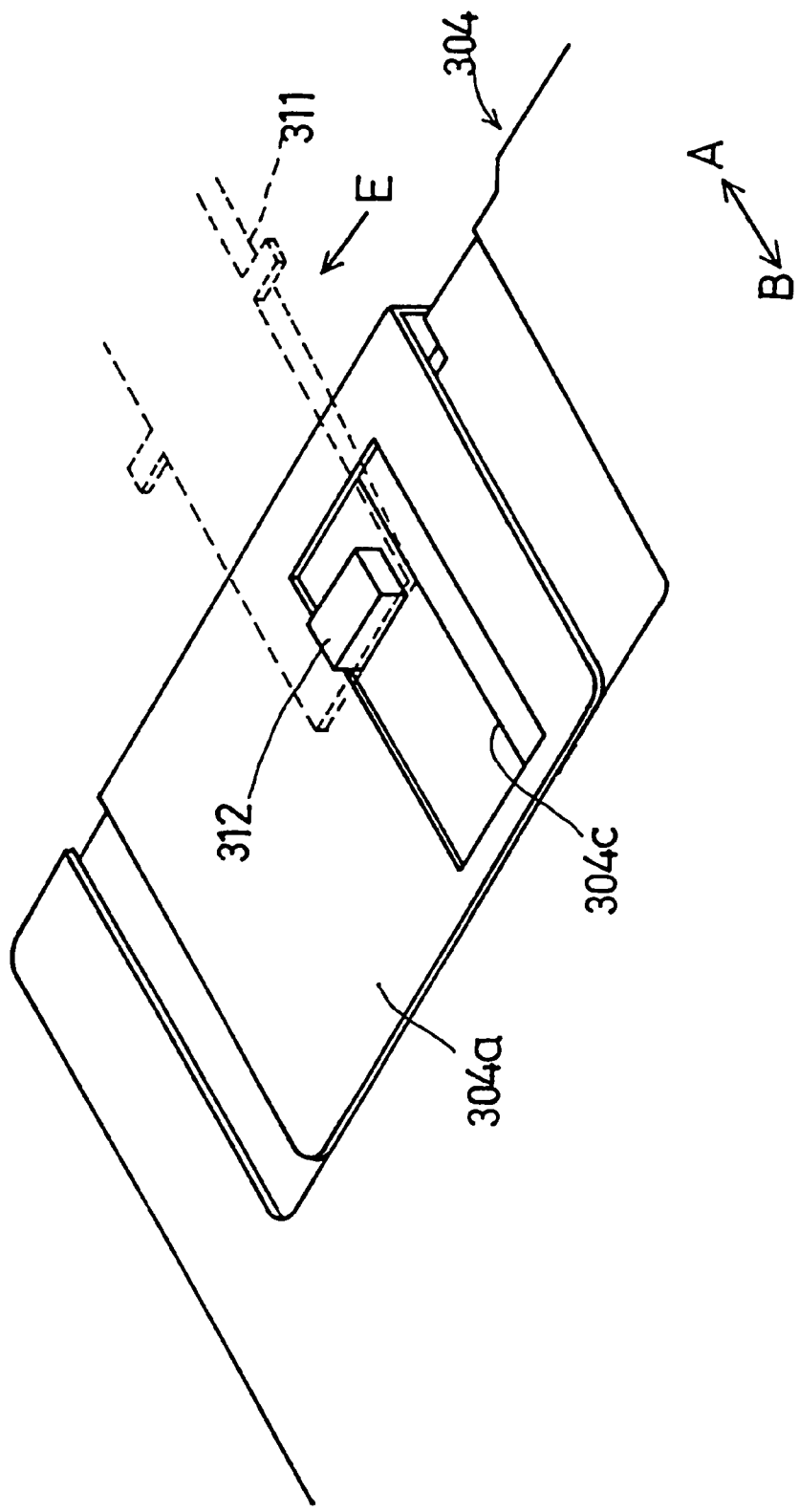
Figure 48:
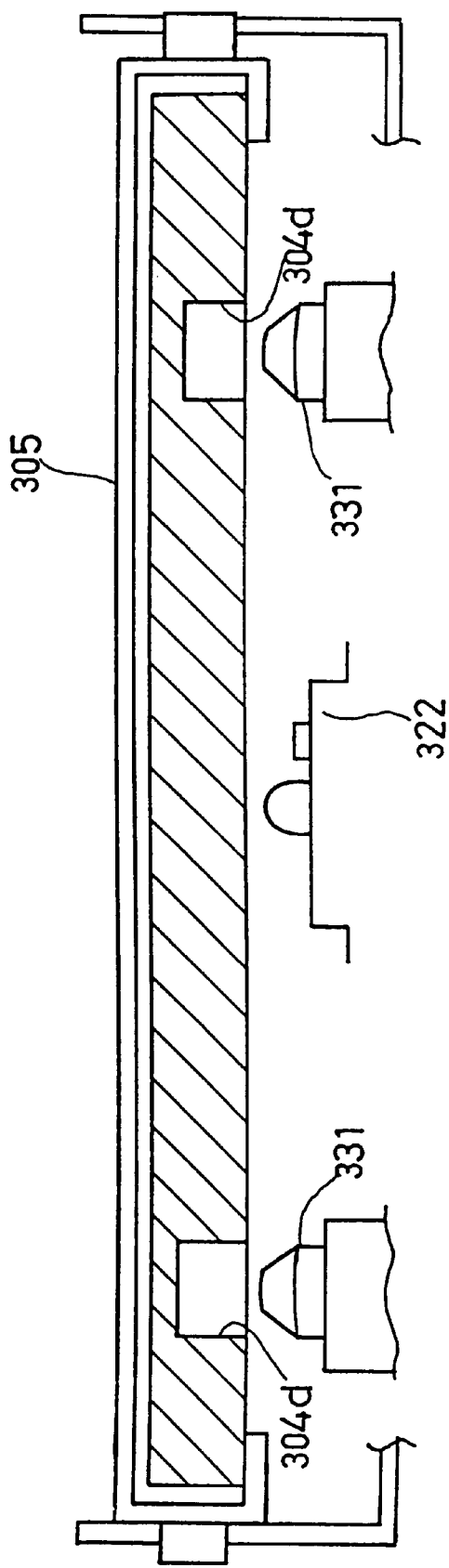
Figure 49A:
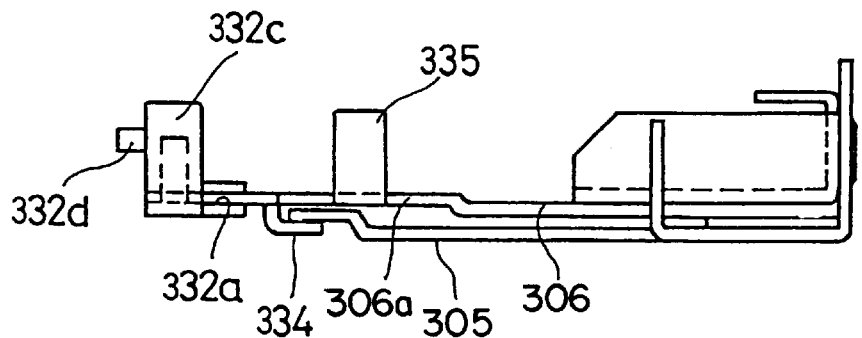
Figure 49B:
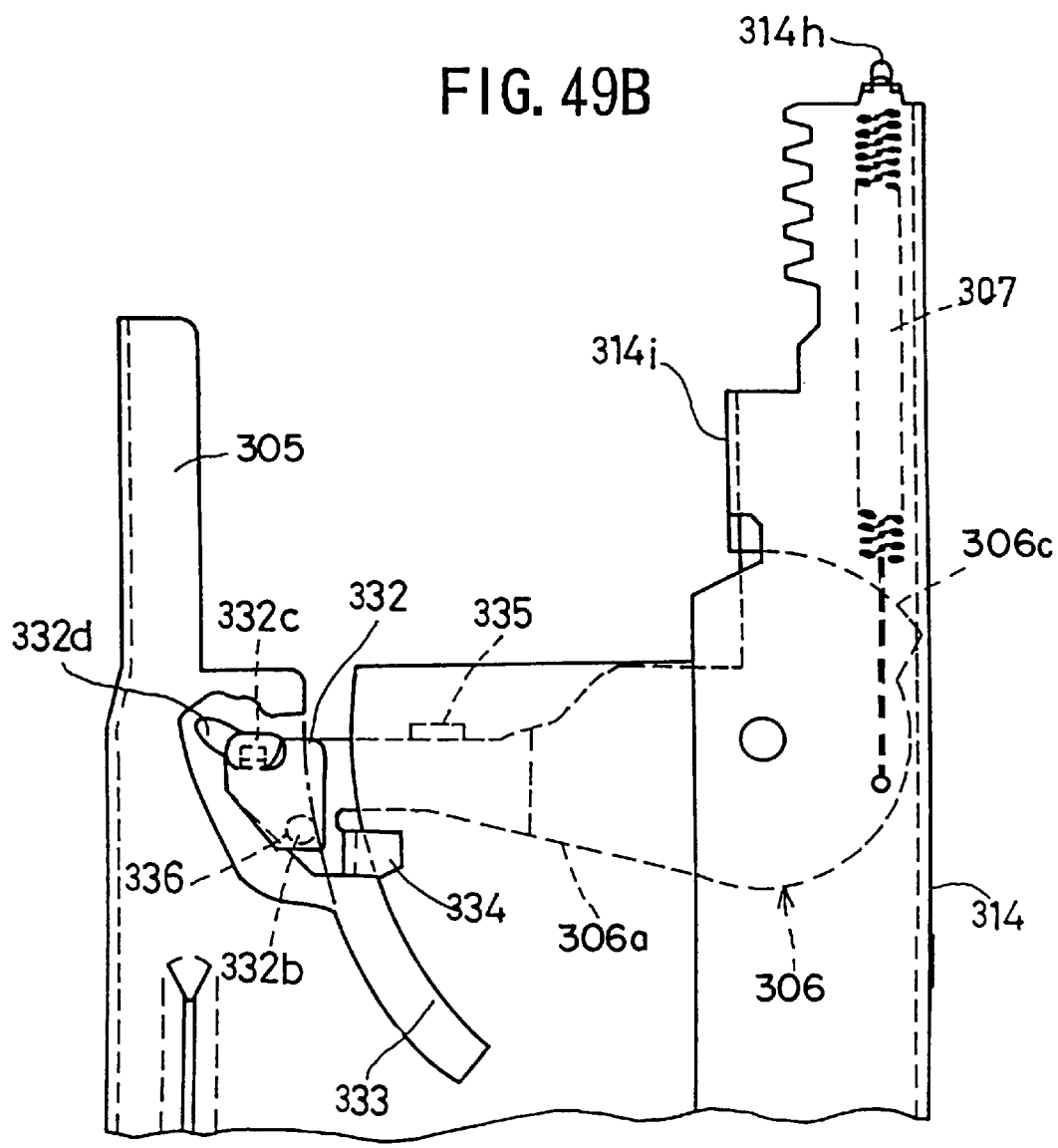
Figure 50A:
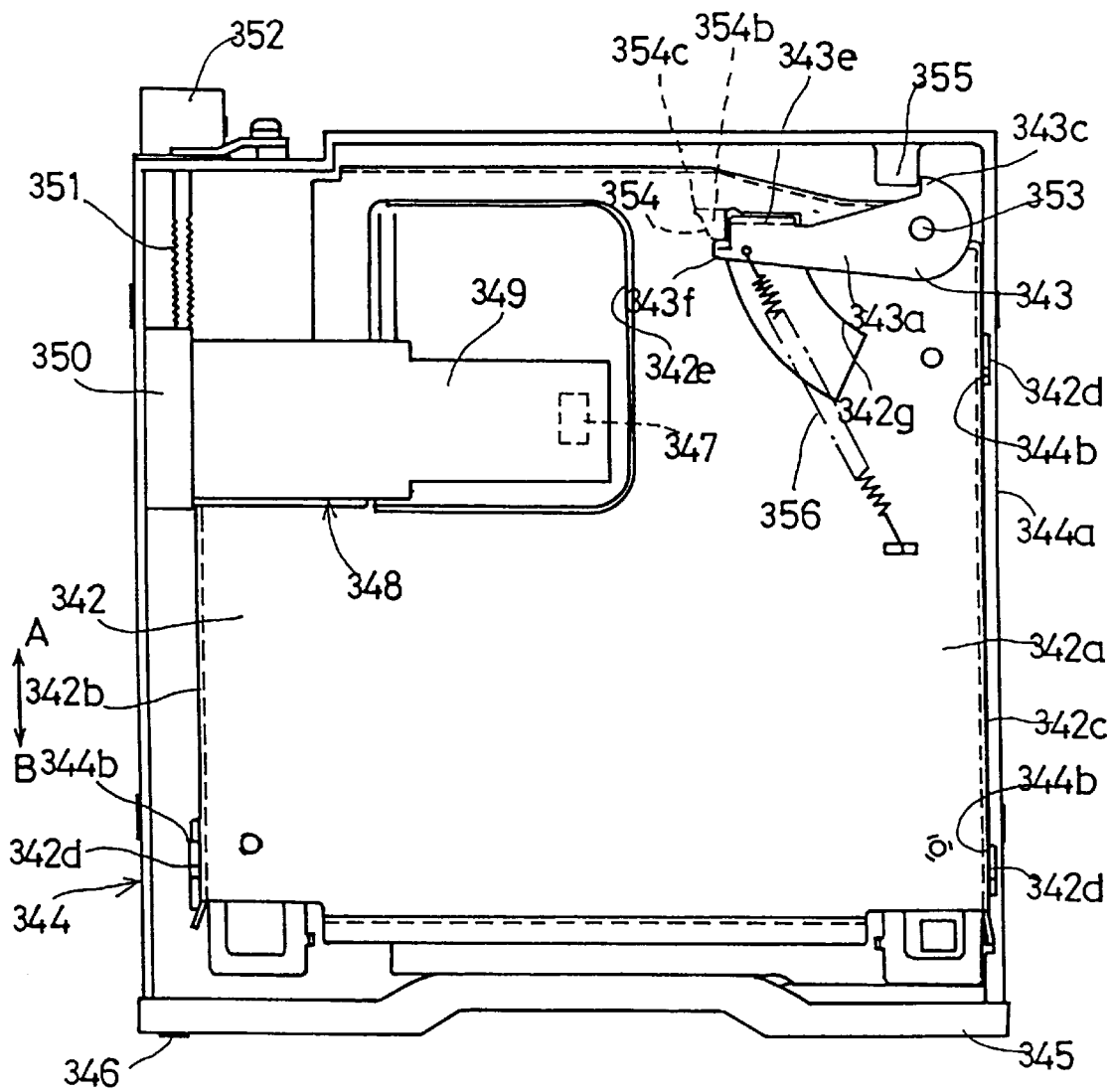
Figure 50B:
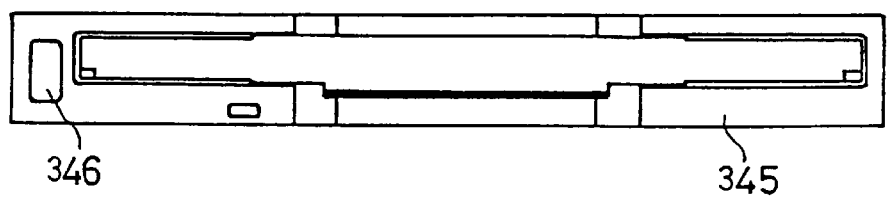
Figure 52A:
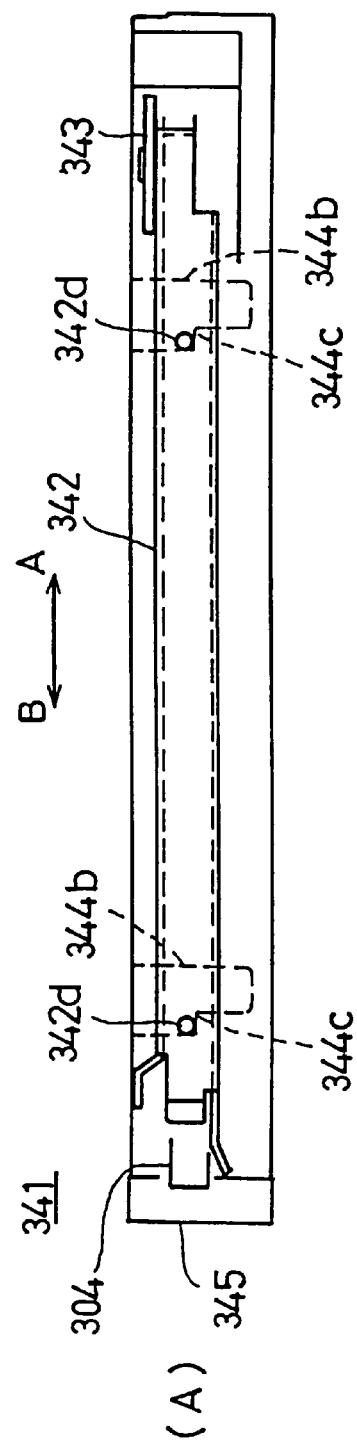
Figure 52B:
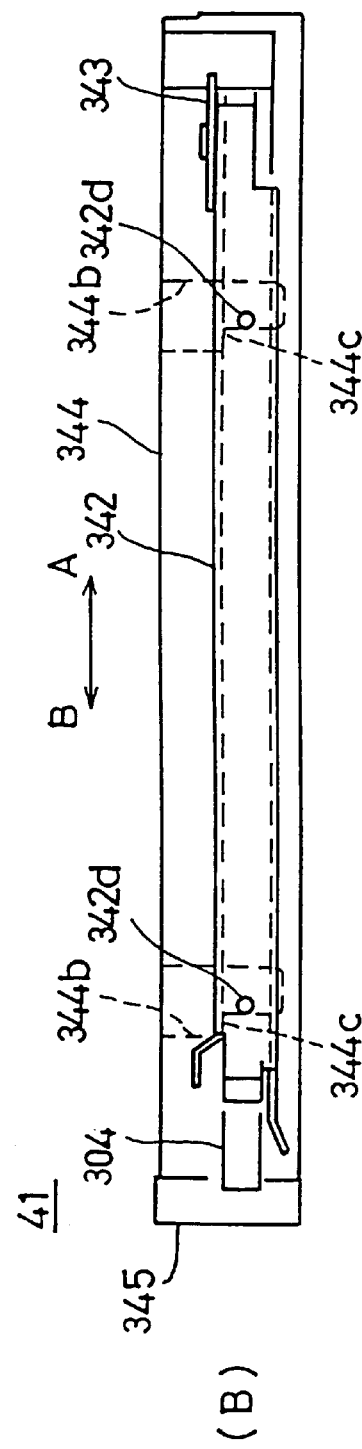
Figure 53A:
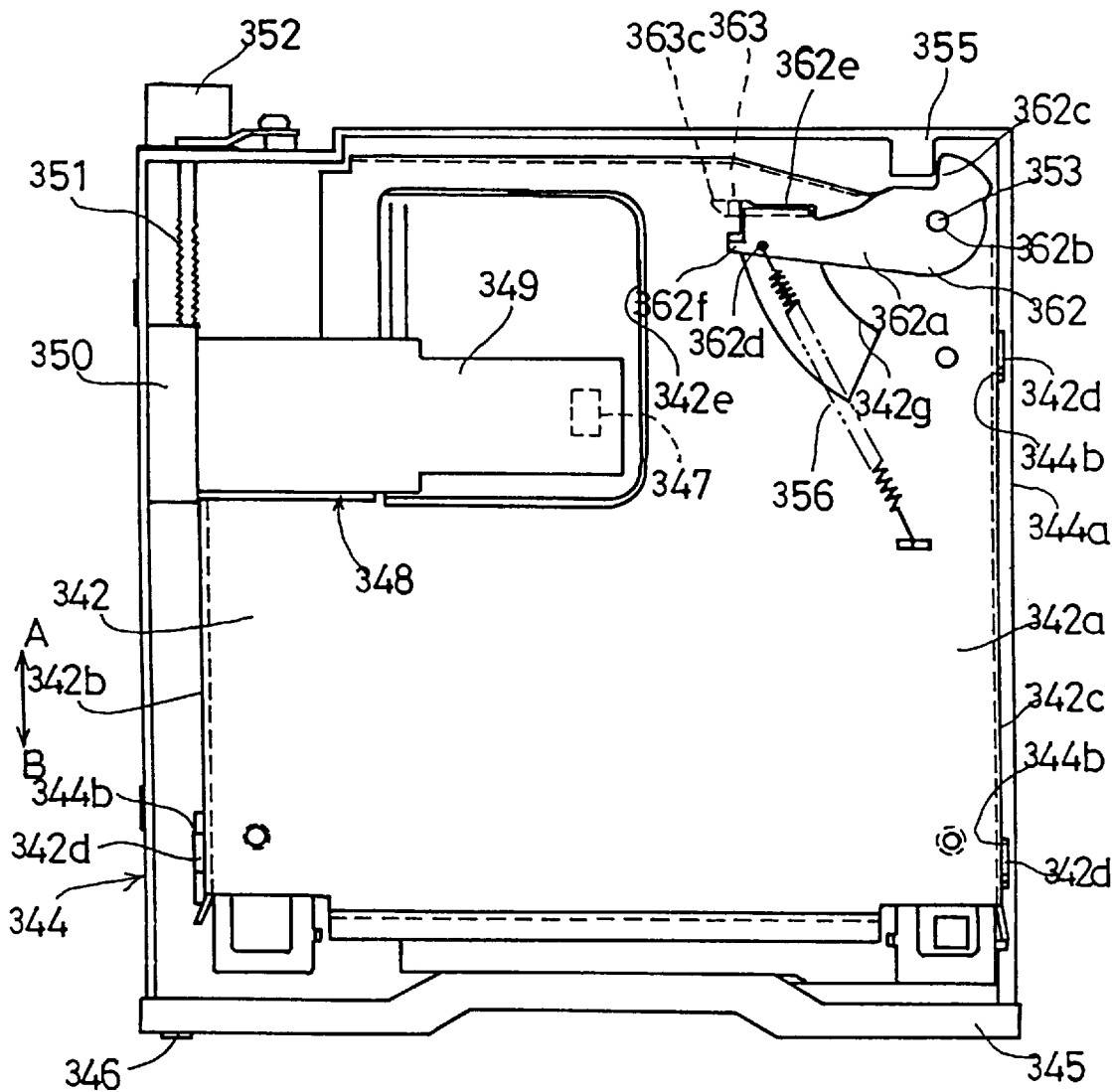
Figure 53B:
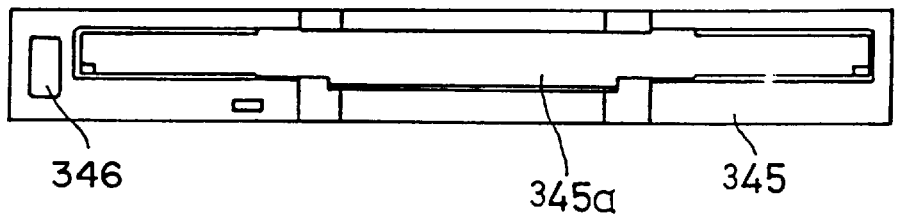
Figure 54A:
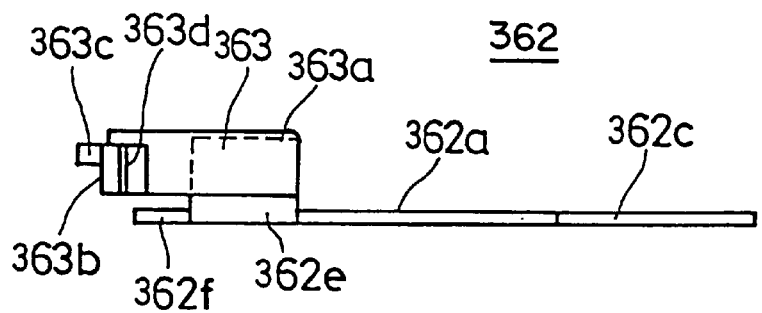
Figure 54B:
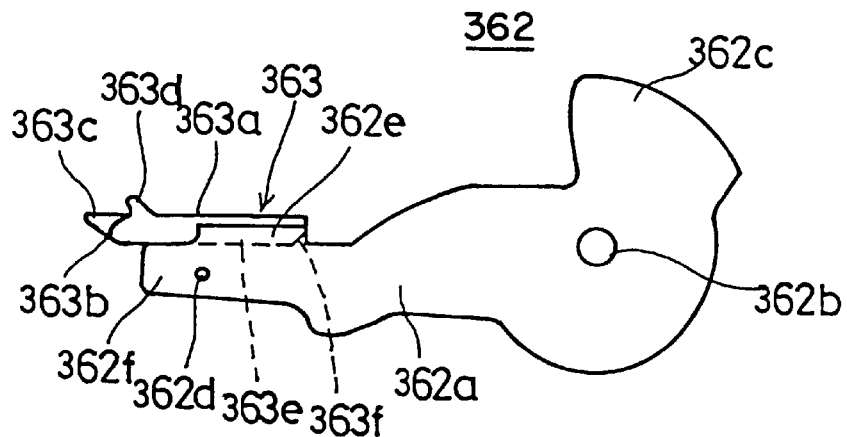
Figure 55:
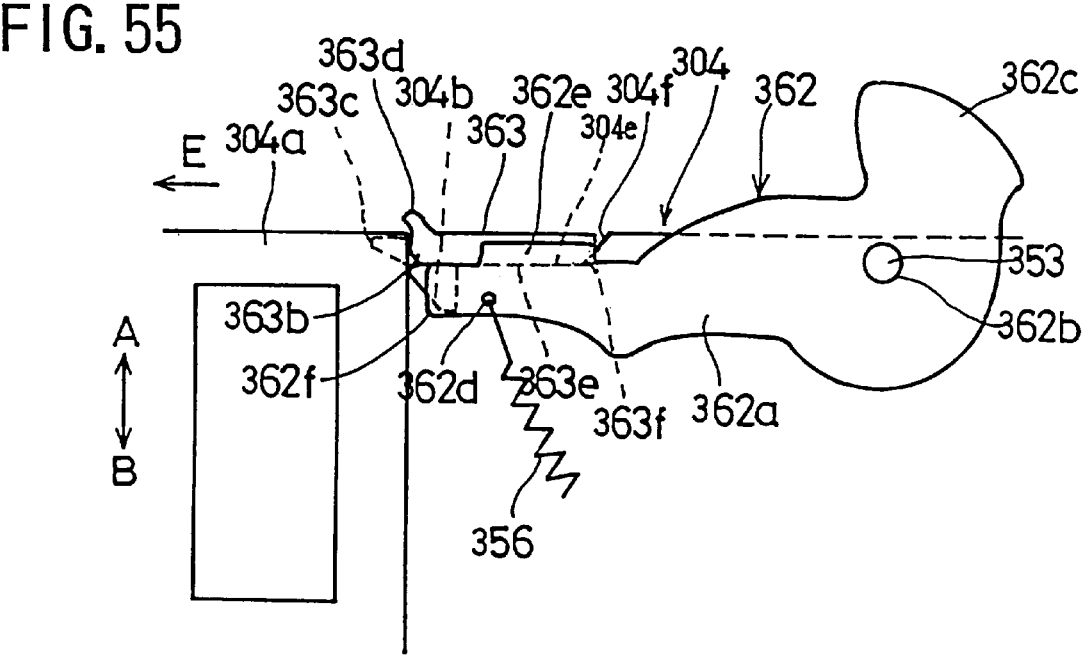
Figure 56:
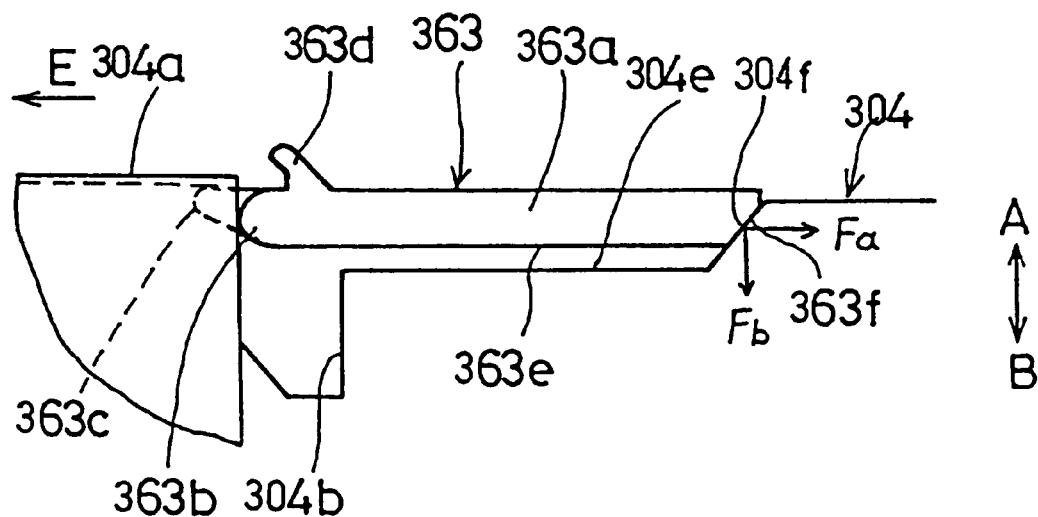
Figure 57:
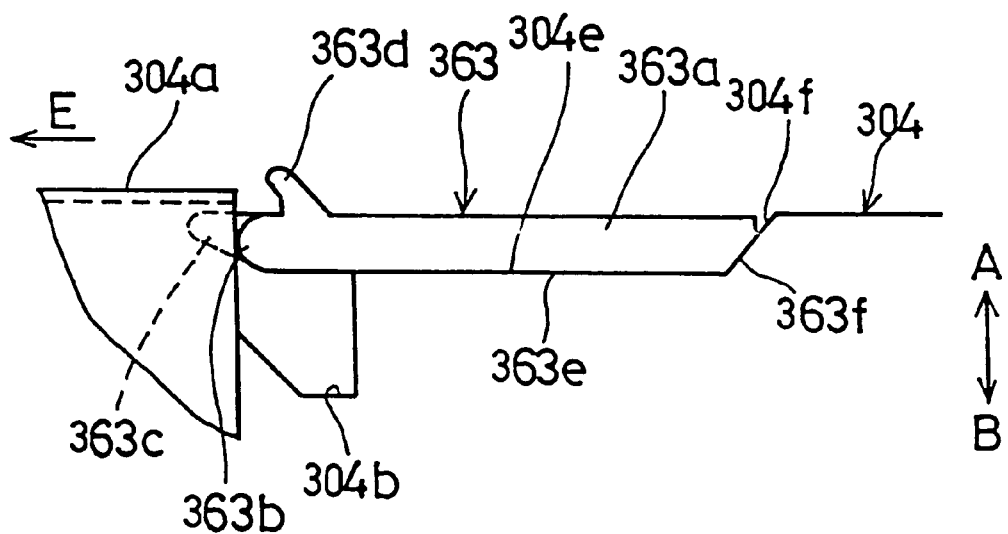

FIGS. 26A, 26B, 26C, 26D and 26E explain the operation of members in a magnetic disk cartridge mounting operation of the second embodiment;

FIG. 27 is a top view of a magnetic disk device according to a third embodiment;

FIG. 28 is a top view of a latch lever of the third embodiment;

FIG. 29 is a side view of the latch lever taken in the line G of FIG. 28;

FIG. 30 is a bottom view of the latch lever of the third embodiment;

FIG. 31 is an enlarged top view showing an engagement member of the third embodiment;

FIG. 32 is a enlarged side view showing the engagement member of the third embodiment;

FIG. 33 shows a state in which an engaging pawl starts to open a shutter in the third embodiment;

FIG. 34 shows the latch lever and the cartridge when the shutter has been open all the way in the third embodiment;

FIG. 35 is a perspective view of a magnetic disk device according to a fourth embodiment;

FIG. 36 is a perspective view showing how a holder, a slider and a cover member are assembled in the fourth embodiment;

FIG. 37 is an exploded perspective view of the holder and a frame of the fourth embodiment;

FIG. 38 is a top view of a disk cartridge and a latch lever of the fourth embodiment;

FIGS. 39A, 39B and 39C are top views of the holder and the slider of the fourth embodiment;

FIGS. 40A and 40B are top views showing the latch lever of the fourth embodiment on an enlarged scale;

FIG. 41 is a cross sectional view showing the front of the disk device according to the fourth embodiment in a state where the disk has been mounted;

FIG. 42 is a cross sectional view showing the side of the magnetic disk device according to the fourth embodiment in a state where the disk has been mounted;

FIG. 43 is an exploded perspective view showing the cover member and the slider of the fourth embodiment;

FIG. 44 is a cross sectional view showing the front of the disk device according to the fourth embodiment in a state where the cartridge is inserted;

FIG. 45 is a cross sectional view showing the side of the disk device according to the fourth embodiment in a state where the cartridge is inserted;

FIGS. 46A, 46B and 46C are top views explaining the operation of the latch lever of the fourth embodiment;

FIG. 47 is a perspective view showing how a magnetic head is gripped by a shutter in the fourth embodiment;

FIG. 48 is a cross sectional view showing alignment of depressions in the disk cartridge with positioning bosses in the fourth embodiment;

FIGS. 49A and 49B explain a latch lever of a fifth embodiment;

FIGS. 50A and 50B explain a disk device according to a sixth embodiment;

FIGS. 51A and 51B explain a latch lever of the sixth embodiment;

FIGS. 52A and 52B are side views explaining the operation of a holder of the sixth embodiment;

FIGS. 53A and 53B explain a disk device according to a seventh embodiment;

FIGS. 54A and 54B explain a latch lever of a seventh embodiment;

FIG. 55 is a top view showing how a shutter is opened by the latch lever in the seventh embodiment;

FIG. 56 is an enlarged top view showing how a disk cartridge of the seventh embodiment is inserted while being laterally tilted; and FIG. 57 is a top view explaining the action of the disk cartridge returning to a level position in the seventh embodiment.

DESCRIPTION OF THE PREFERRED EMBODIMENTS

A description will first be given of a magnetic disk device according to a first embodiment.

Figure 7:
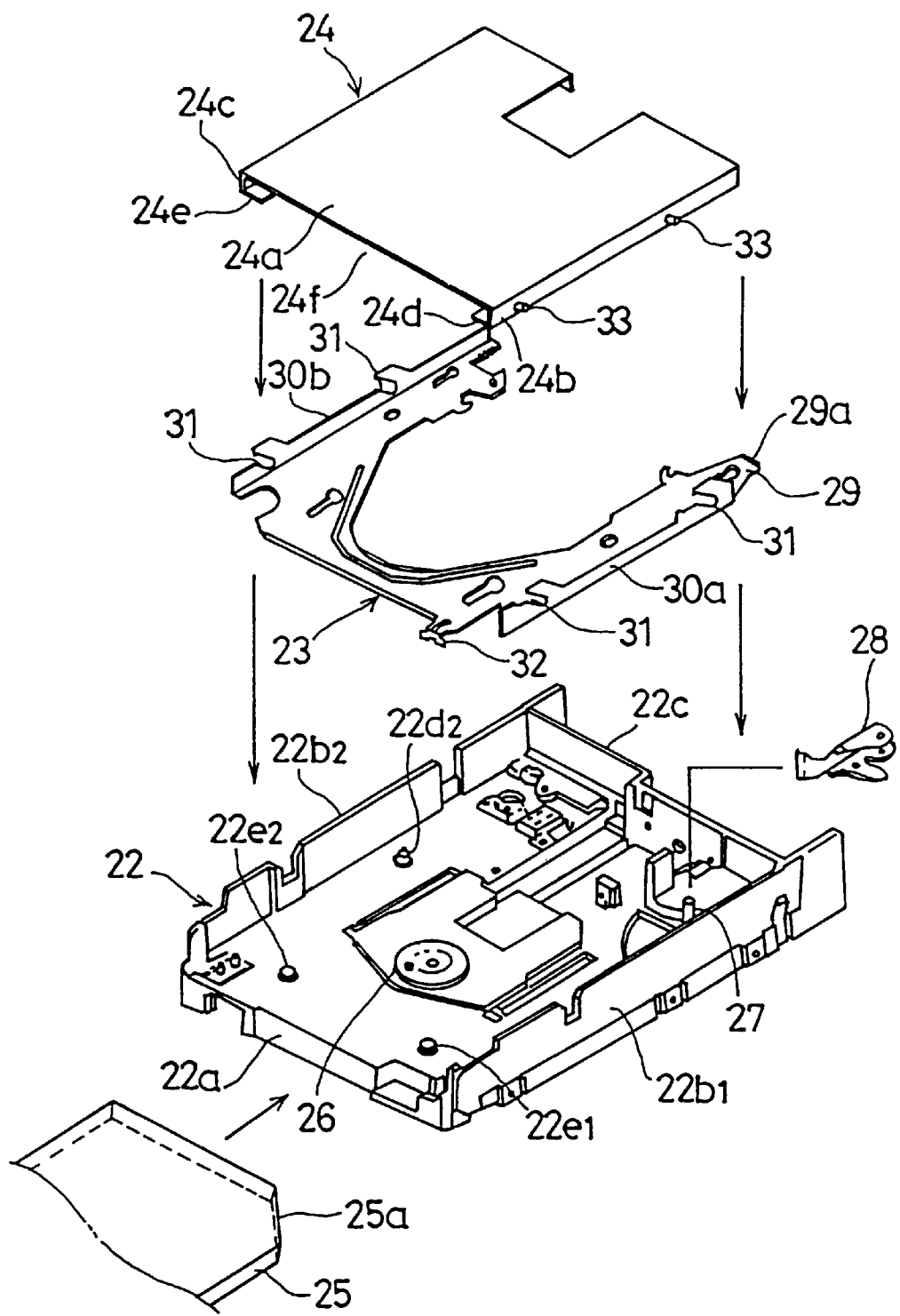
FIG. 7 is an exploded perspective view of a magnetic disk device according to a first embodiment of the present invention.

FIG. 7 shows a construction of the first embodiment. Referring to FIG. 7, a disk device 21 is constructed such that a slider 23 and a holder 24 are mounted on a chassis 22.

The chassis 22 is formed, for example, of a die cast aluminum. Side plates 22b1 and 22b2, and a rear plate 22c are provided to rise from a base 22a, the side plates 22b1 and 22b2 being opposite to each other. The base 22a is provided with a driving motor (spindle motor) 26 for rotating a disk (recording medium) accommodated in a disk cartridge 25.

The base 22a is also provided with a head carriage (not shown) equipped with a head, and a carriage motor for driving the head carriage is provided in the rear plate 22c. A pin 27 is fitted to the base 22a, and a latch lever (latch member) 28 (described in detail with reference to FIGS. 8A and 8B) is fitted to the pin 27.

Conically shaped positioning pins 22d1 and 22d2 (the pin 22d1 is not shown) engageable with positioning engaging depressions (described later) formed in the disk cartridge 25 are formed in the base 22a. Further, pins 22e1 and 22e2 are formed in the base 22.

The slider 23 is mounted on the base 22a. The slider is formed into a U shape, an engagement part 29 having a raised engaging pawl 29a engageable with the latch lever 28 being formed at one end of the slider 23 (the description of the engagement part 29 is given with reference to FIGS. 8A and 8B). Side plates 30a and 30b are provided to stand at both lateral ends of the slider 23, the side plates 30a and 30b being integral with the slider 23. A pair of slanting grooves 31 corresponding to projections (described later) of the holder 24 are provided at predetermined positions of each of the side plates 30a and 30b, the slanting grooves 31 of the side plates 30a and 30b being parallel with each other. A bulge 32 for ejection operation is formed in the slider 23 near the side plate 30a to face a cartridge insertion opening.

The holder 24 is formed of a sheet metal bent and worked by press forming. A top piece 24a, side pieces 24b and 24c, and bottom pieces 24d and 24e are formed in the holder 24 so as to form a cartridge insertion space 24f into which the disk cartridge 25 is inserted. A pair of hollow bulges 33 corresponding to and engageable with the slanting grooves 31 formed in the side plates 30a and 30b of the slider 23 are formed to bulge in the side pieces 24b and 24c by press forming (burring etc.). With this arrangement, the sliding motion of the slider 23 causes the bulges 33 engaged with the slanting grooves 31 to raise or lower the holder 24.

Figure 8A:
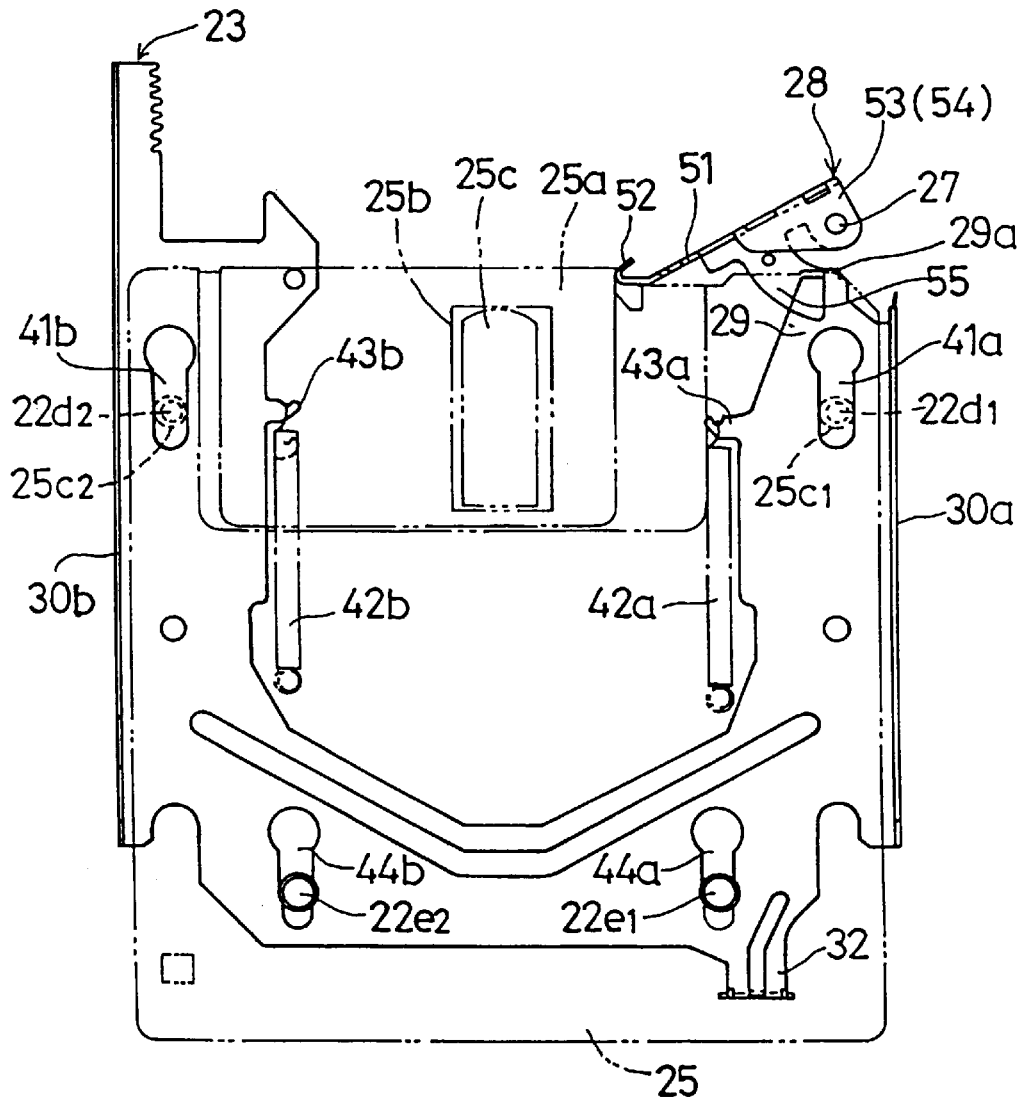
FIGS. 8A and 8B show a latch lever of the first embodiment.
Figure 8B:
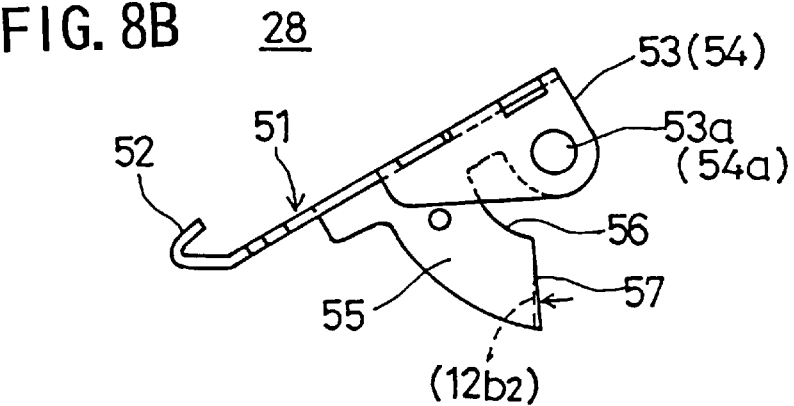

FIGS. 8A and 8B explain the latch lever of FIG. 7. FIG. 8A is a top view showing a relationship between the inserted disk cartridge 25, the slider 23 and the latch lever 28. FIG. 8B is a top view of the latch lever 28.

Referring to FIG. 8A, the disk cartridge 25 has a shutter 25a. When the shutter 25a is open, a head window 25c is exposed through an opening 25b of the shutter 25a. Engaging depressions 25c1 and 25c2 engageable with the positioning pins 22d1 and 22d2 are formed in the disk cartridge 25.

Long holes 41a and 41b for allowing the respective positioning pins 22d1 and 22d2 to be exposed are formed at lateral ends of the slider 23. Further, latching pawls 43a and 43b for latching springs 42a and 42b are formed in the slider 23. The slider 23 is also formed with long holes 44a and 44b respectively engageable with the pins 22e1 and 22e2 formed in the chassis 22a. Engagement of the positioning pins 22d1 and 22e1 with the respective long holes 41a and 44a guides the movement of the slider 23 and prevents the slider 23 from being detached from the chassis 22. Engagement of the positioning pins 22d2 and 22e2 with the respective long holes 41b and 44b prevents the slider 23 from being detached from the chassis 22.

As shown in FIGS. 8A and 8B, the latch lever 28 is constructed such that a hook shaped contact piece 52 is formed at one end of a rotating body 51 so as to be integral with the rotating body 51. Mutually opposite supporting parts 53 and 54 are integrally formed in the rotating body 51 as a top piece (53) and a bottom piece (54) of the latch lever 28, respectively. Holes 53a and 54a through which the pin 27 is allowed to pass are also provided. A curved engagement part 55 is integrally provided adjacent to the bottom supporting part 54.

A curved inner edge portion of the engagement part 55 is formed as an engaging edge 56 engageable with the engaging pawl 29a of the engagement part 29 of the slider 23 to latch the slider 23. A releasing part 57 is provided to be contiguous with the engaging edge 56, the slider 23 being released from its latching engagement with the engaging edge 56 when the engaging pawl 29a slides along the releasing part 57. The releasing part 57 extends obliquely with respect to the direction in which the pawl 29a moves, the releasing part 57 approaching the near side of the slider 23, so that, when the engaging pawl 29a moves along the releasing part 57, a force indicated by an arrow in FIG. 8B is exerted.

Figure 1:
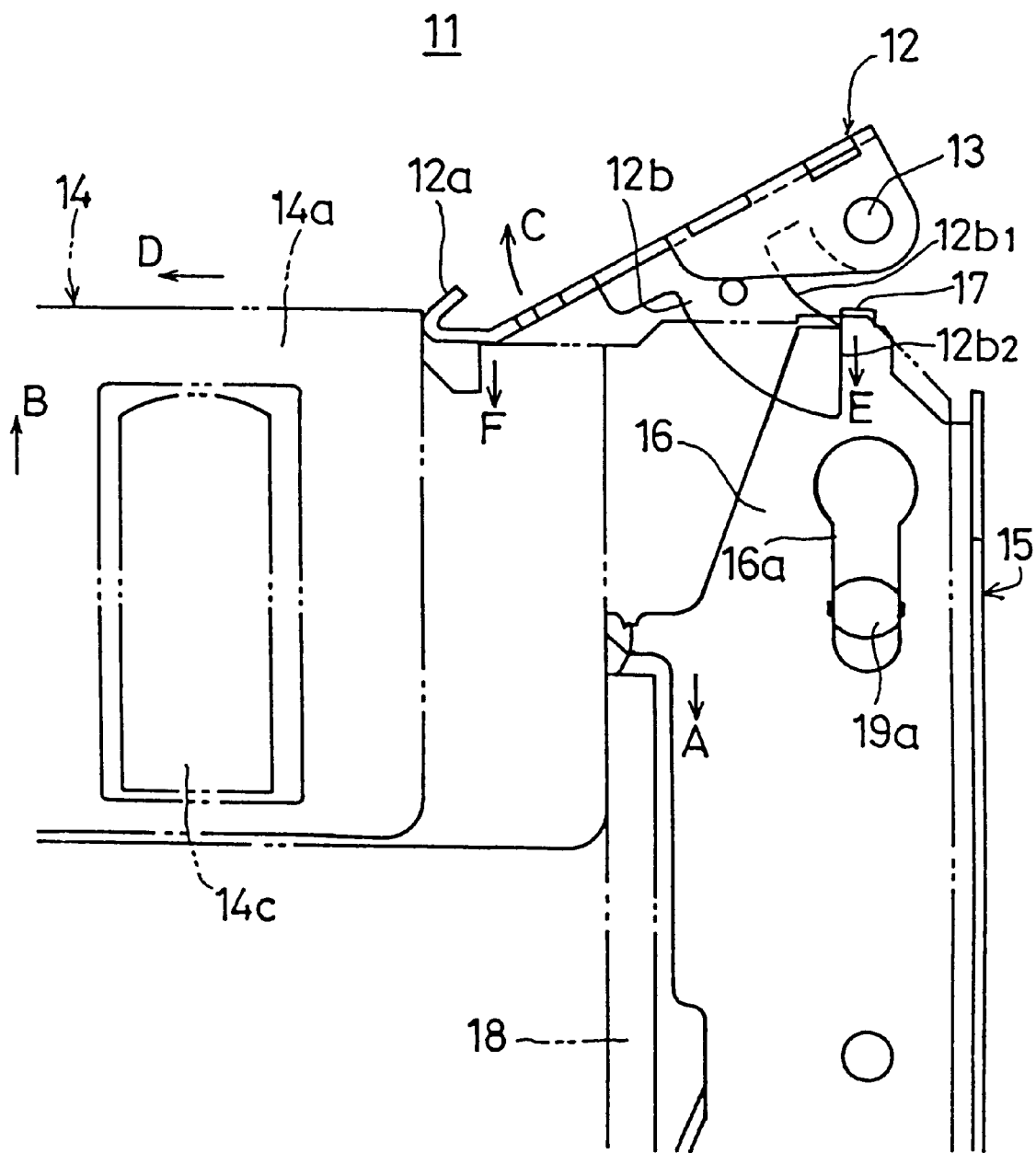
FIG. 1 is a diagram explaining a latching operation of a latch lever of a conventional disk device.
Figure 2B:
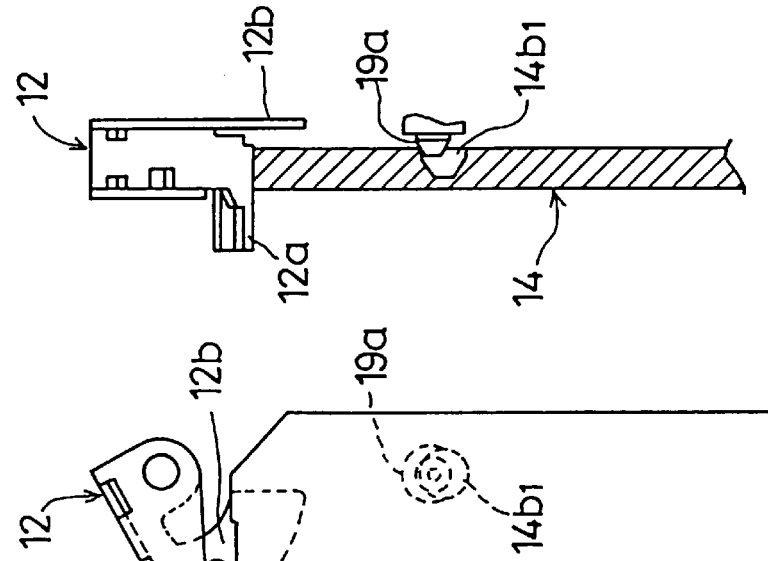
FIGS. 2A and 2B are diagrams explaining a relationship between the latch lever and a disk cartridge of FIG. 1.
Figure 2A:
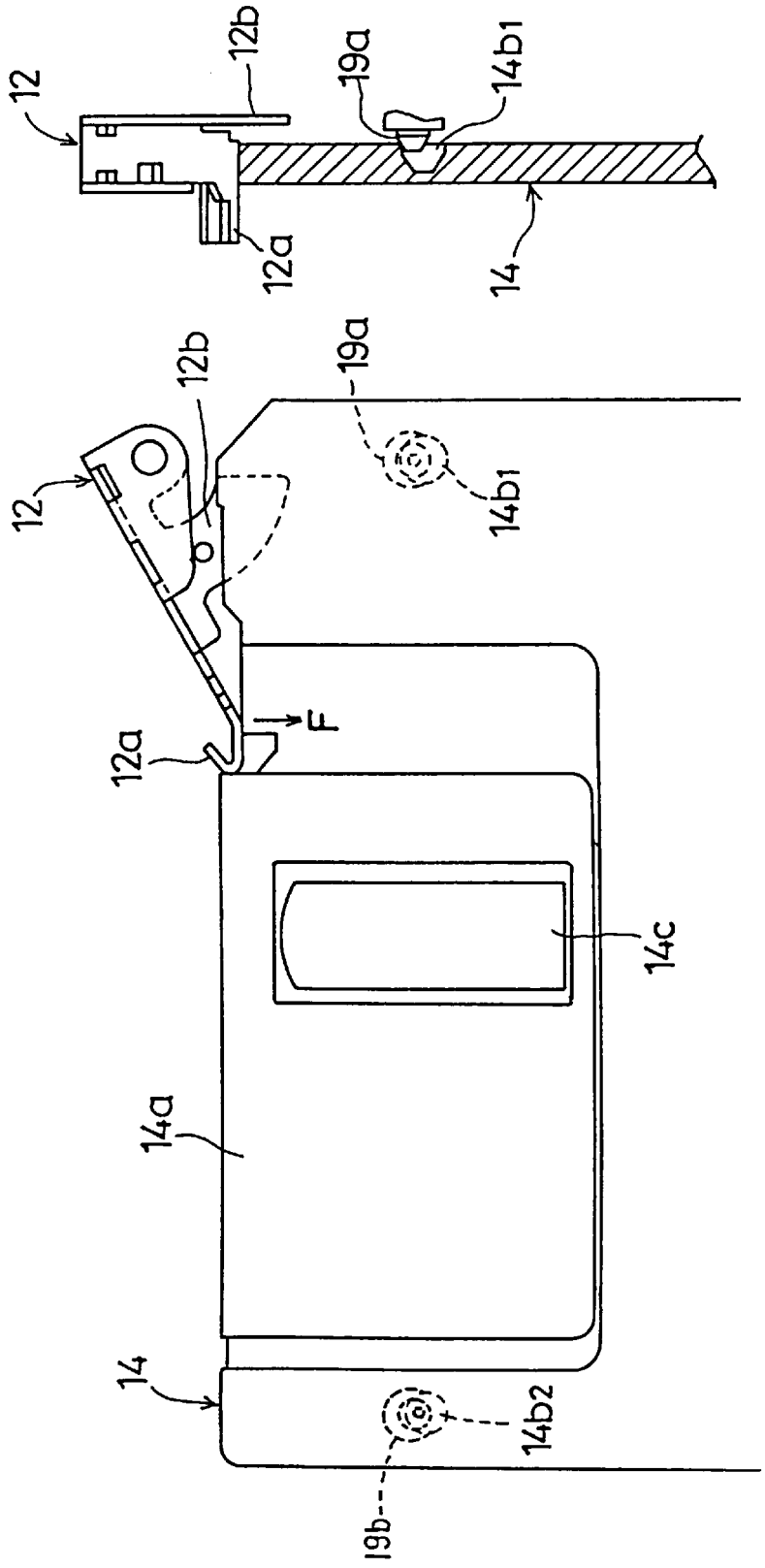
Figure 3:
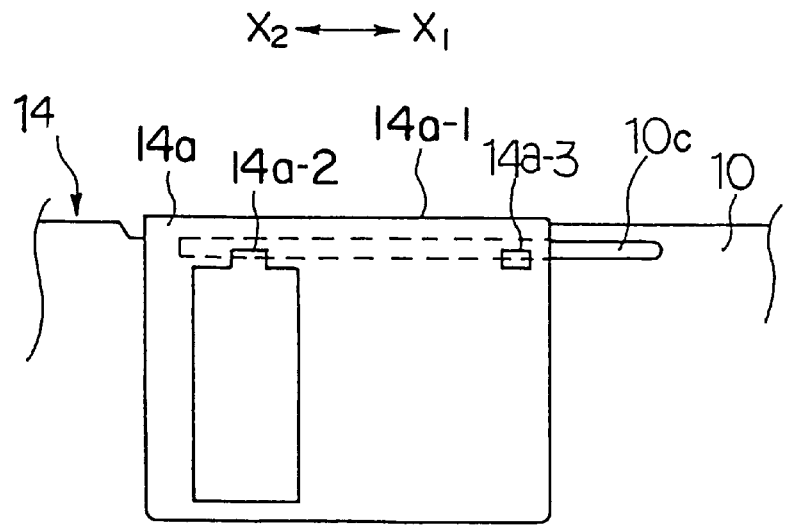
FIG. 3 is an enlarged top view showing a shutter of the magnetic disk cartridge.
Figure 4:
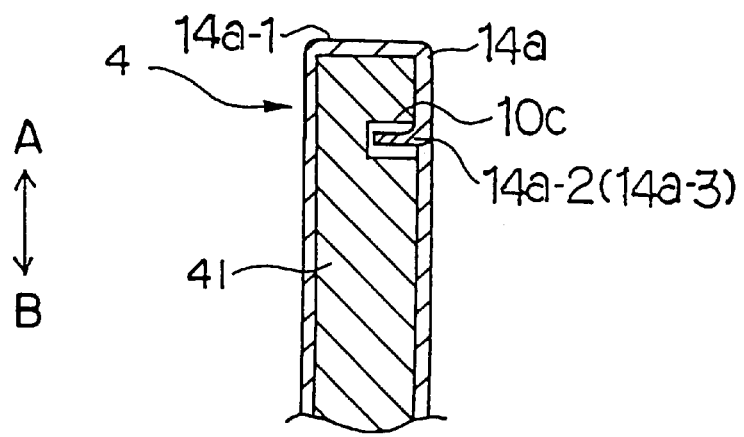
FIG. 4 is an enlarged cross sectional view showing the shutter of the magnetic disk cartridge.

A broken line 12b2 of FIG. 8B indicates the straight part 12b2 of the conventional art shown in FIG. 1 that extends in the same direction that the engaging pawl 29a moves. This will illustrates how the force indicated by the arrow is exerted on the latch lever 28 when the engaging pawl 29a moves in this embodiment.

The contact piece 52 of the latch lever 28 is urged toward the top of FIG. 8A by means of a spring (not shown).

Figure 10:
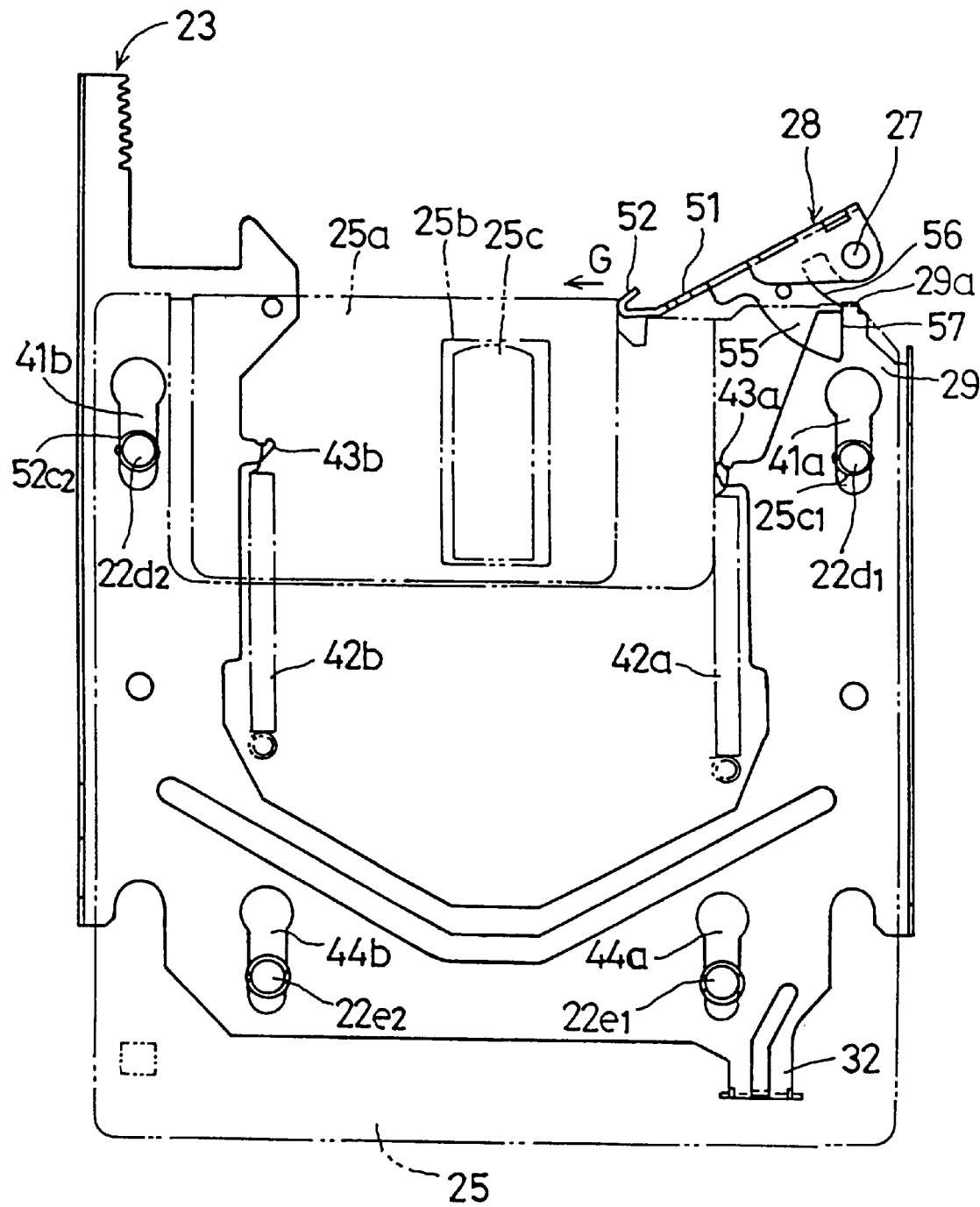
Figure 11:
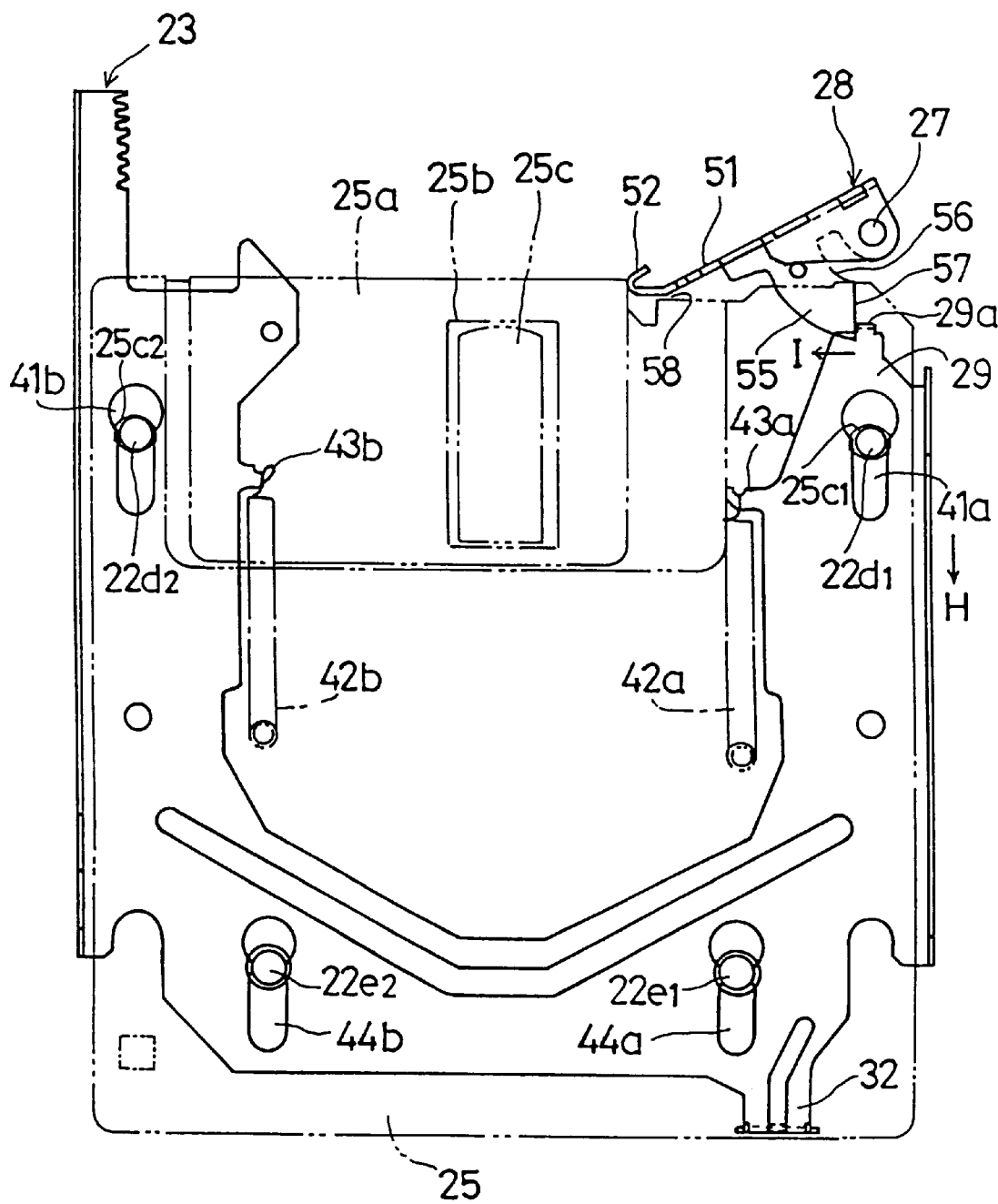

FIGS. 9–11 show the latching operation of the latch lever 28 of FIGS. 8A and 8B. For convenience's sake, illustration of the operation of inserting the disk cartridge 25 from an insertion opening of the disk device 21 into the holder 24 is omitted.

Referring to FIG. 9, the contact piece 52 of the latch lever 28 is at its end position near the disk cartridge insertion opening of the disk device, before the disk cartridge 25 is inserted. In this state, the contact piece 52 lies in the longitudinal direction. The engaging pawl 29a of the engagement part 29 is engaged with the engaging edge 56 of the engagement part 55 of the latch lever 28 so that the slider 23 is latched. Thus, the slider 23 resides at its end position near the back end of the disk device, thus maintaining the springs 42a and 42b expanded.

When the disk cartridge 25 is inserted, the contact piece 52 of the latch lever 28 comes into contact with the end of the main body of the disk cartridge 25.

As shown in FIG. 10, when the disk cartridge 25 is further thrust into the device, the end of the main body of the disk cartridge 25 thrusts the contact piece 52 of the latch lever 28 so as to rotate the latch lever 28 around the pin 27. Thereupon, the contact piece 52 causes the shutter 25a of the disk cartridge 25 to slide in the G direction indicated by an arrow, and the engaging pawl 29a of the engagement part 29 of the slider 23 slides outward along the engaging edge 56 of the engagement part 55 of the latch lever 28. When the engaging pawl 29a reaches the releasing part 57 of the engagement part 55, the slider 23 is released from the latching engagement. In this state, the contact piece 52 of the latch lever 28 opens the shutter 25a so that the head window 25c is exposed through the opening 25b.

Also, the engaging depressions 25c1 and 25c2 of the disk cartridge 25 are located above the respective positioning pins 22d1 and 22d2 of the chassis 22.

Subsequently, as shown in FIG. 11, when the engaging pawl 29a of the engagement part 29 of the slider 23 reaches a point at which the engaging edge 56 and the releasing part 57 of the latch lever 28 meet, the slider 23 slides in the H direction indicated by an arrow due to a recoil strength of the springs 42a and 42b. Further, the engaging pawl 29a slides straight along the releasing part 57 of the engagement part 55.

Since the releasing part 57 extends obliquely with respect to the direction in which the pawl 29a moves, the releasing part 57 approaching the side of the slider 23, the latch lever 28 receives a force from the engaging pawl 29a in the I direction indicated by an arrow. As a result, the contact piece 52 of the latch lever 28 is removed from the end of the main body of the disk cartridge 25, thus forming a gap 58. The contact piece 52 maintains its contact with the shutter 25a.

As the slider 23 slides, the disk cartridge 25 (holder 24) is lowered toward the chassis 22 guided by the grooves 31 of the side plates 30a and 30b. Positioning of the cartridge is completed such that the positioning pins 22d1 and 22d2 are engaged with the engaging depressions 25c1 and 25c2 of the disk cartridge 25.

To summarize the feature of the first embodiment, because of the gap 58 created between the contact piece 52 of the latch lever 28 and the end of the main body of the disk cartridge 25 when the disk cartridge 25 is lowered, the disk cartridge 25 is not, unlike the conventional technology, urged by the latch lever 28 toward the insertion opening. Accordingly, the engaging depressions 25c1 and 25c2 of the disk cartridge 25 are not forced against the slope of the respective positioning pins 22d1 and 22d2. Thus, the engagement of the depressions 25c1 and 25c2 with the respective pins 22d1 and 22d2 can be properly performed so that the disk cartridge 25 is securely positioned. In other words, loading of the disk device can be performed in a stable manner. In this way, abrasion occurring around the, engaging depressions 25c1 and 25c2 of the disk cartridge 25 can be reduced.

Figure 5A:
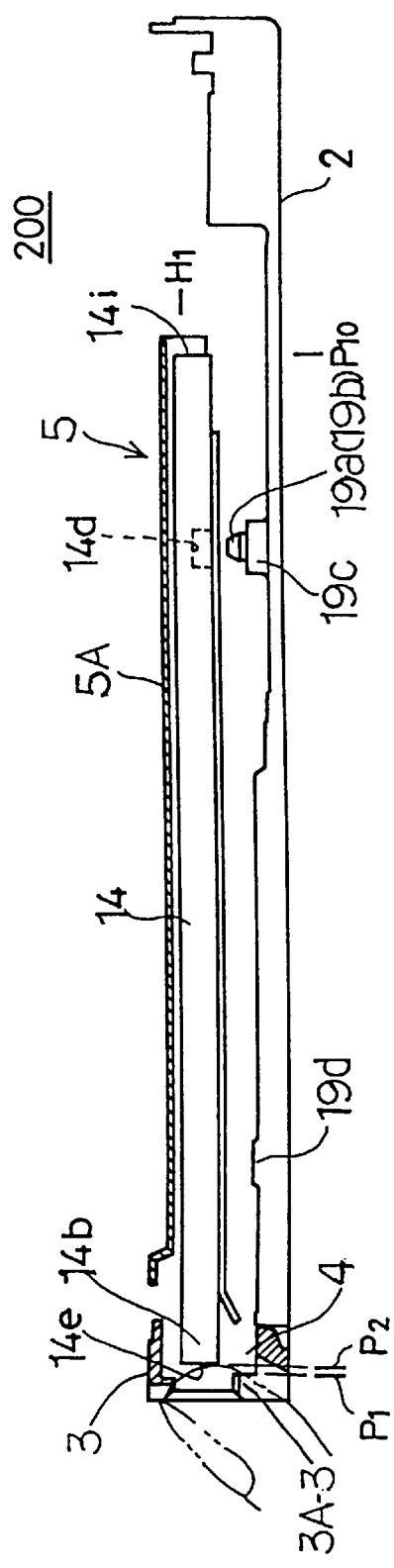
FIGS. 5A and 5B are cross sectional views of a conventional thin magnetic disk device.
Figure 5B:
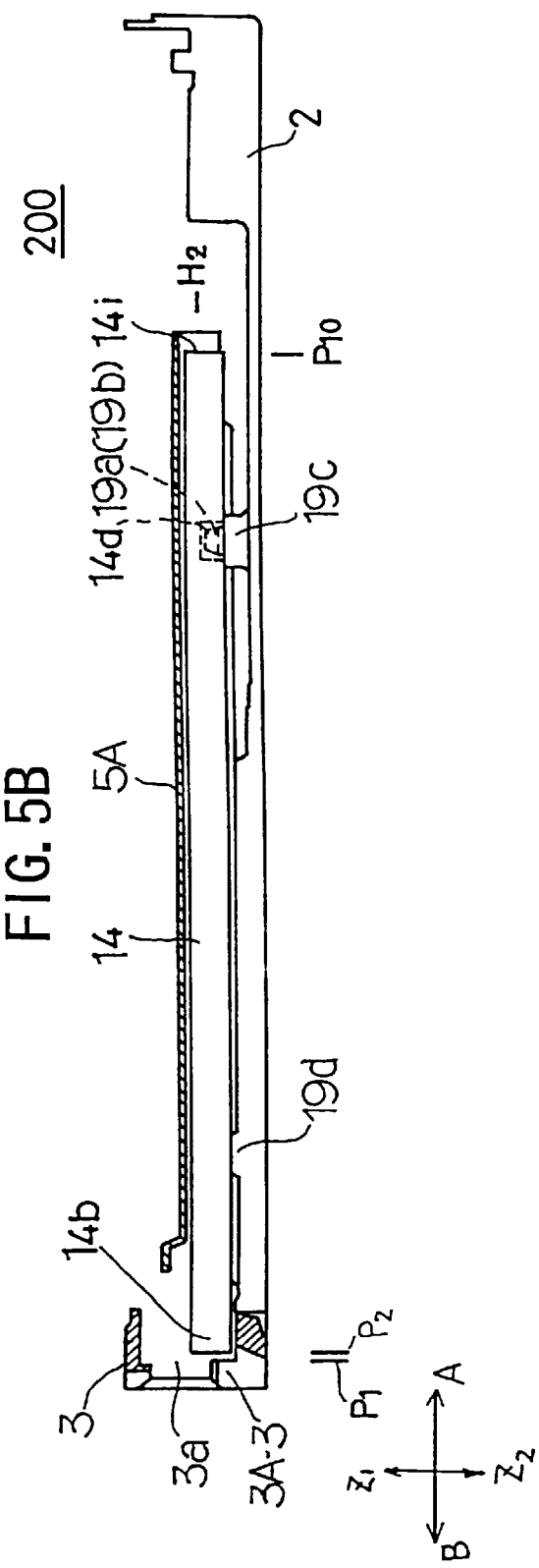
Figure 6:
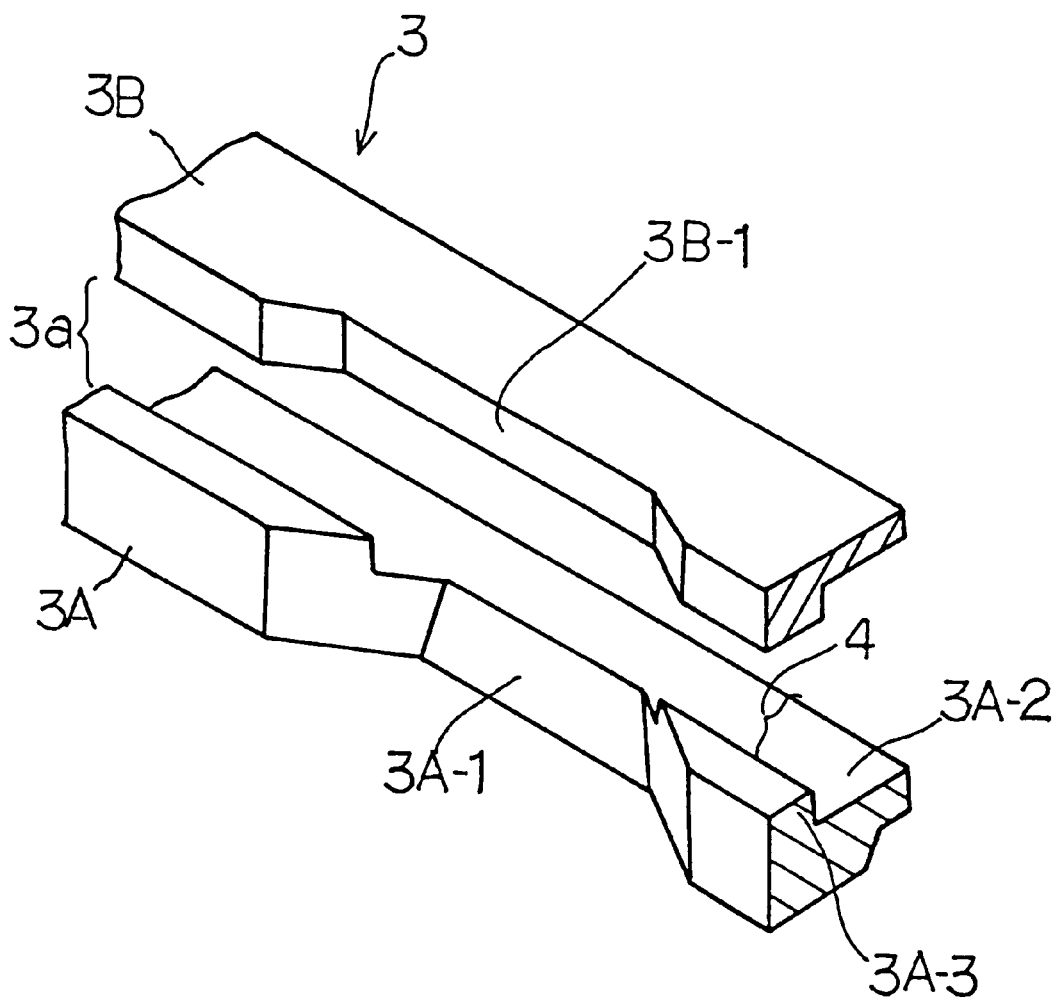
FIG. 6 is an enlarged perspective view showing a part of a front bezel.

A description will now be given of a second embodiment of the present invention. The second embodiment is designed to eliminate problems with the conventional technology described with reference to FIGS. 5A, 5B and 6.

FIGS. 12 through 15 show a magnetic disk device according to a second embodiment of the present invention.

A magnetic disk device 201 shown in FIGS. 12 through 15 is constructed such that a holder 205 into which a magnetic disk cartridge 204 is inserted, a slider 215, and a shield cover 216 are assembled to one another in a frame 202.

The holder 205 is allowed to ascend and descend in response to the disk cartridge 204 mounting or ejecting operation. A top plate 205a of the holder 205 is provided with an opening 205b through which a magnetic head unit 208 is introduced. A latch lever 206 which is rotated so as to open a shutter 204a of the disk cartridge 204 in response to the cartridge insertion operation and latches the slider 215 is rotatably fitted to the top plate 205a of the holder 205.

An end of the latch lever 206 is provided with a latching pawl 206a which, sliding along the front end of the disk cartridge 204, is engaged with the shutter 204a so as to slide the shutter 204a open. The latch lever 206 also functions as an ejection member for urging the disk cartridge 204 in an ejecting direction (B direction). An end part of the latch lever including the latching pawl 206a is introduced into the holder 205 via an arc shaped hole 205c of the holder 205.

The latch lever 206 is supported by a pivot 205f provided on the top plate 205a of the holder 205 and has an arc shaped cam 206b around the pivot 205f, the pivot 205f being engaged with a pivot hole 206d. A spring engagement hole 206c is provided at a position near the pivot hole 206d displaced toward the head of the cam 206b.

The cam 206b latches the slider 215 as described later. As the disk cartridge 204 is inserted into the holder 205, the cam 206b is rotated so as to release the slider 15 from the latching engagement.

A coil spring 207 for urging the latch lever 206 has its one end engaged with the spring engagement hole 206c of the latch lever 206 and has its other end engaged with a spring latching part 215l of the slider 215. Thus, the latch lever 206 is urged counterclockwise (in the direction in which the shutter is closed) by a force of the coil spring 207, and the slider 215 is urged in the B direction by the force of the coil spring 207.

Since the coil spring 207 is provided to urge the latch lever 206 and the slider 215, the number of parts provided is smaller than in the conventional device in which an urging member is provided for each of the relevant members. Also, when the slider 215 is at a position shown in FIG. 15 at which position an ejection operation has been carried out, the force of the coil spring 207 is at its weakest. Hence, resistance occurring while the cam 206b slides in a latching part 215i of the slider 215 while the latch lever 206 is rotated in response to the insertion of the disk cartridge 204 is relatively small. Thus, the latch lever 206 can be rotated in a smooth manner.

Figure 15:
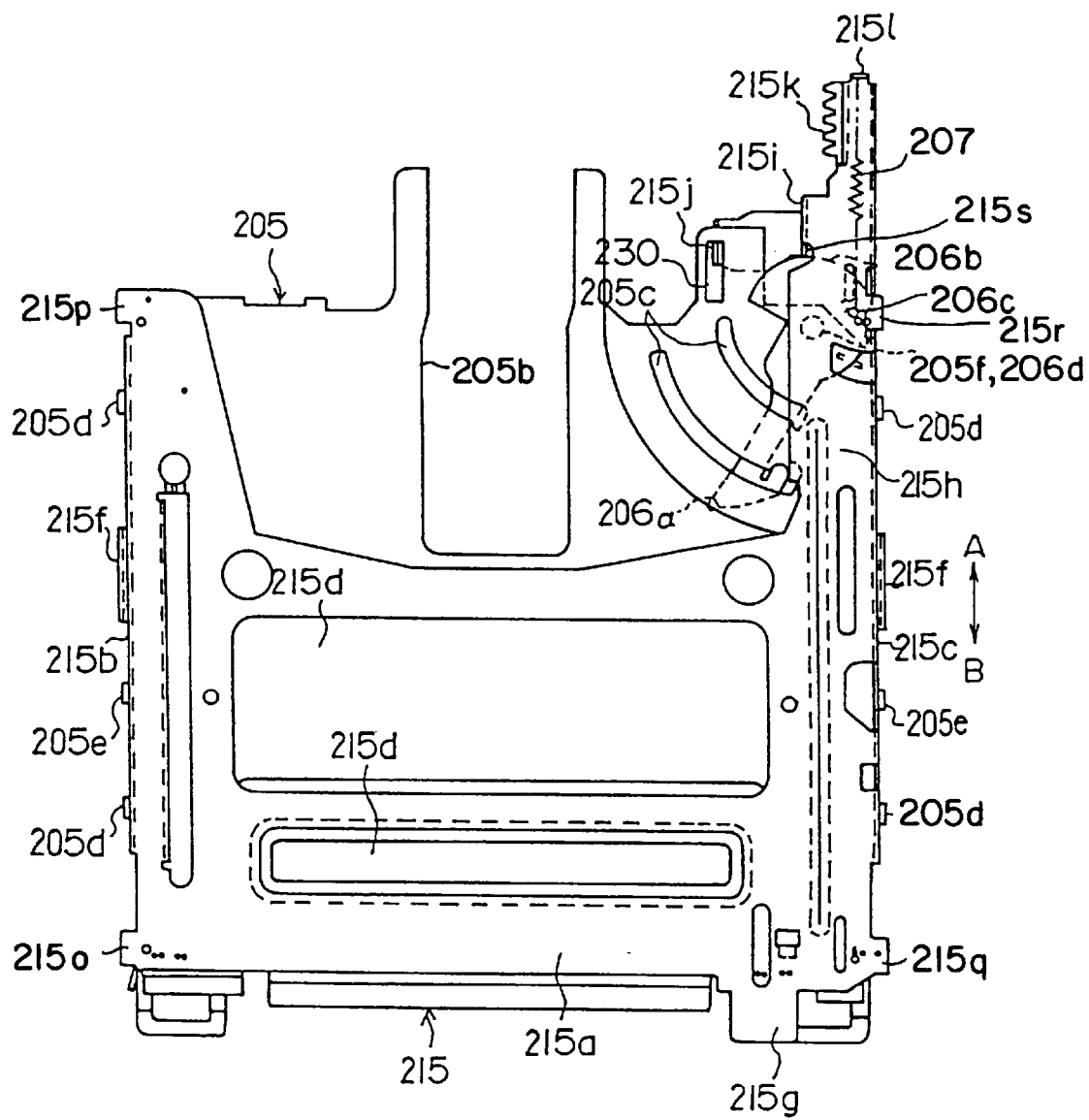
FIG. 15 is a top view showing the holder and the slider of the second embodiment in a state before a disk cartridge is inserted.
Figure 17:
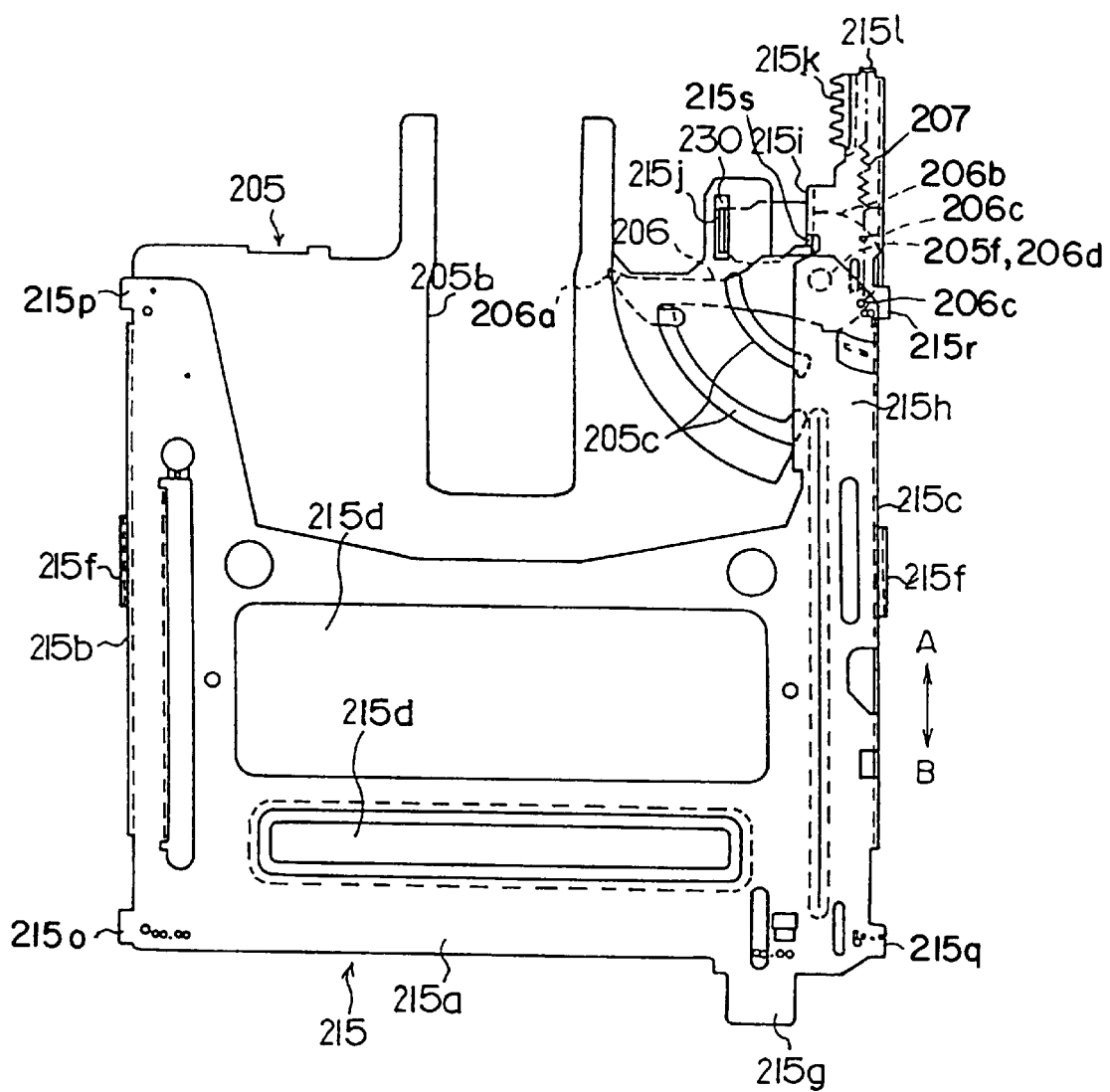
FIG. 17 is a top view showing the holder and the slider of the second embodiment in a state after a disk cartridge is inserted.

When the slider 15 slides in the A direction in an ejection operation, the latch lever 206 is rotated from its position shown in FIG. 17 to an ejection position shown in FIG. 15. That is, the cam 206b is released from its latching engagement with the latching part 215i when the spring force of the coil spring 207 is at its strongest. Consequently, the latch lever 206 is rotated forcibly due to the spring force of the coil spring 207, thus ejecting the disk cartridge 204 in a stable manner.

The magnetic head unit 208 comprises: a carriage 209 provided to be movable in the radial direction of the disk (A-B direction); a lower magnetic head 210 provided on the upper major surface of the carriage 209; an arm 211 rotatably supported by a base end 209a of the carriage 290; and a upper magnetic head 212 provided on the lower major surface of the end of the arm 211.

The carriage 209 is screw coupled to a lead screw 214 driven by a stepping motor 213 and slides in the A-B direction in the frame 202 in response to the rotation of the lead screw 214, thereby moving the magnetic head 210 and 212 in the tracking direction of the magnetic disk (not shown).

The arm 211 is urged downward by a pressing force of a torsion bar (not shown) provided at the base end 209a of the carriage 209. Contact parts 211a extend from the side of the arm 211 and comes into contact with the top plate 205a of the holder 205. That is, before the disk cartridge is inserted, the arm 211 is urged upward due to the rise of the holder 205, thus causing the upper magnetic head 212 and the lower magnetic head 210 to be separated from each other.

The slider 215 is provided between the top plate 205a of the holder 205 and the shield cover 216. The slider 215 has: a top plate 215a provided to face the top plate 205a of the holder 205; and side parts 215b and 215c formed by bending respective lateral edges of the top plate 215a downward (the side part 214b is hidden from view in FIG. 12). The top plates 215a is provided with holes 215d for reduction of weight.

Each of the side parts 215b and 215c of the slider 215 are provided with slanting grooves 215e with which projecting pins 205d projecting from both sides of the holder 205 are engaged, and a guide hole 215f for guiding the sliding motion of the slider 215 in the A-B direction. The guide hole 215f is formed into a rectangular shape extending in the sliding direction (A-B direction) of the slider 215 and is engaged with an engaging bulge 202d provided in an external depression 202c of sides 202a and 202b of the frame 202, as described later.

Accordingly, since the guide hole 215f of the slider 215 is slidably engaged with the engaging bulge 202d, the slider 215 is prevented from ascending and is allowed to slide only in the A-B direction.

Contact parts 215o–215r slidably in contact with the top of the respective sides 202a and 202b of the frame 202 project from the respective lateral edges of the top plate 215a of the slider 215. Thus, the slider 215 is prevented from descending due to the contact parts 215o–215r being in contact with the top of the respective sides 202a and 202b of the frame 202 so that the slider 215 is allowed to move only in the A-B direction.

Hence, it is not necessary to provide a supporting member for supporting the slider 215 to be movable in the A-B direction. As a result, the device can be made thinner, and the number of parts can be reduced correspondingly.

An engagement part 205e projecting from the center of each side of the holder 205 is engaged with a groove 202e provided in the inner face of the each of the sides 202a and 202b of the frame 202. Thus, when the slider 215 slides in the B direction, the engagement part 205e of the holder 205 is prevented from moving in the A-B direction by the vertically extending groove 202e so that the projecting pins 205d are guided by the respective slanting groove 215e to reach the disk-mounting position.

A fitting part 215g to which an eject button 217 is fitted projects from the front end of the top plate 215a. An arm 215h extending from the top plate 215a of the slider 215 in the A direction is provided with the latching part 215i for latching the U shaped slider 215, a holder supporting part 215j provided at the end of the latching part 215i, and a rack 215k engageable with a damper 218 for damping the sliding motion of the slider 215.

Figure 20:
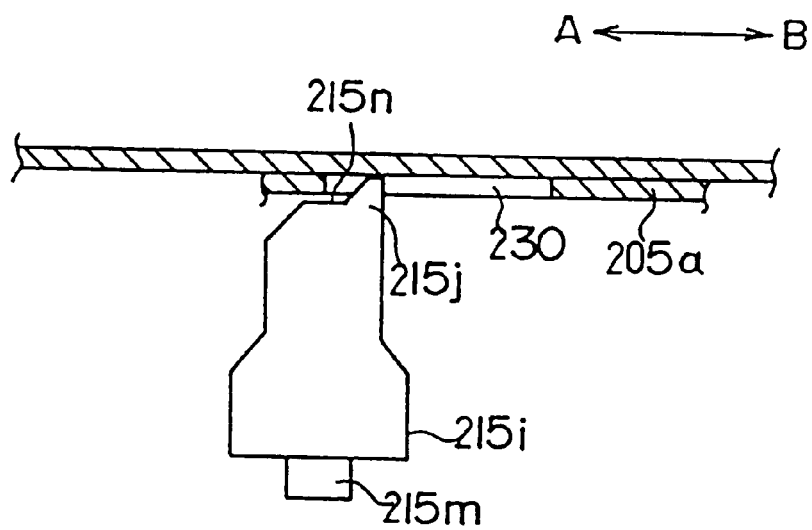
FIG. 20 is a side view of a holder supporting part for supporting a holder in the second embodiment.

As shown in FIG. 20, the holder supporting part 215j of the slider 215 defines the height of the holder 205 such that the end of the holder supporting part 215j is engaged with a long hole 230 provided in the top plate 205a of the holder 205, and a stepped part 215n of the holder supporting part 215j comes into contact with the top plate 205a of the holder 205. Therefore, before the disk cartridge 204 is inserted into the holder 205, the top plate 205a of the holder 205 is supported by the stepped part 215n of the holder supporting part 215j and prevented from displaced downward. Accordingly, even when there is a variance in the degree of precision with which the top plate 205a of the holder 205 is worked or even when an external oscillation is exerted thereto, the top plate 205a is prevented from being displaced downward.

An extension spring 219 for extending the slider 215 in the B direction has its one end latched to the slider 215 and has its other end latched to a latching part (not shown) projecting from the top plate 205a of the holder 205. The slider 215 is displaced in the B direction by a force of the extension spring 219 and the aforementioned spring 207 when the disk cartridge is inserted. In the ejection operation, the slider 215 slides in the A direction in response to the pressing of the eject button 217.

Figure 13:
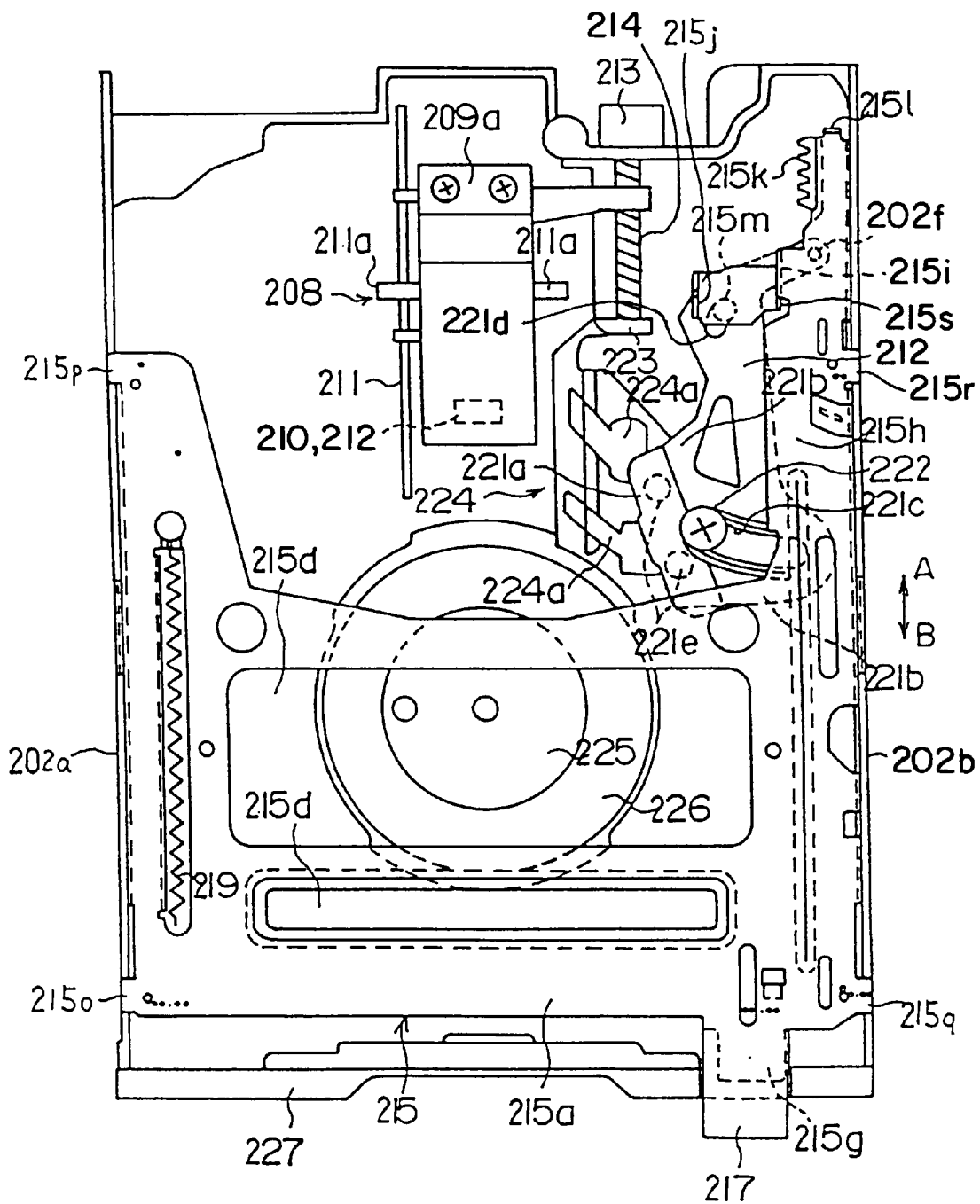
FIG. 13 is a top view of the device of FIG. 12, with a holder and a shield cover removed.

A contact preventing member 221 ensures that the disk cartridge 204 is positioned at a predetermined height when the disk cartridge 204 is inserted into the holder 205, thus preventing the end of the disk cartridge 204 from coming into contact with the lower magnetic head 210. As shown in FIG. 13, the contact preventing member 221 is rotatably supported by a pin 202f on the frame 202.

The contact preventing member 221 comprises: a guide part 221a which guides the disk cartridge 204 to a height at which the disk cartridge 204 is kept clear of the lower magnetic head 210, by resting on a projection 224 provided beside the head unit 208 of the frame 202; an arm 221b for supporting the guide part 221a as the guide part 221a ascends and descends the projection 224; an arc shaped guide hole 221c which, engaged with a screw 222 screw coupled to the frame 202, guides the rotating motion of the contact preventing member 221; an arc shaped engaging hole 221d engaged with an engaging pin 215m projecting downward from the latching part 215i of the slider 215.

The contact preventing member 221 is formed of a plastic by monoblock forming and has elasticity so that the arm 221b is capable of being elastically deformed. The surface of the guide part 221a has a small friction. Since the engaging hole 221d of the contact preventing member 221 is directly engaged with the engaging pin 215m of the slider 215, the contact preventing member 221 is rotated when the slider 215 slides in the A-B direction.

Since no other connecting member exists between the contact preventing member 221 and the slider 215, a space for enabling unhindered rotating motion of the contact preventing member 221 is provided. This advantage provides a larger degree of flexibility in designing the device. Moreover, since the number of parts is reduced as compared to the conventional device, work processes for assembling the device of the present invention can be carried out more efficiently than with the conventional device.

Further, this space makes it possible to displace a bearing 223 for bearing the end of the lead screw 214 of the stepping motor 213 in the B direction and to make the stroke of the head unit 208 longer accordingly. This feature provides a latitude in which the magnetic heads 210 and 212 are capable of moving in the tracking direction of the magnetic disk (not shown).

The guide part 221a has a pair of hemispherical projections 221e (indicated by broken lines in FIG. 13) provided at its bottom. A pair of slopes 224a on which the pair of projections 221e slide are provided in the projection 224 on the frame 202, at respective positions aligned with the track of the rotating motion of the guide part 221a.

Figure 19:
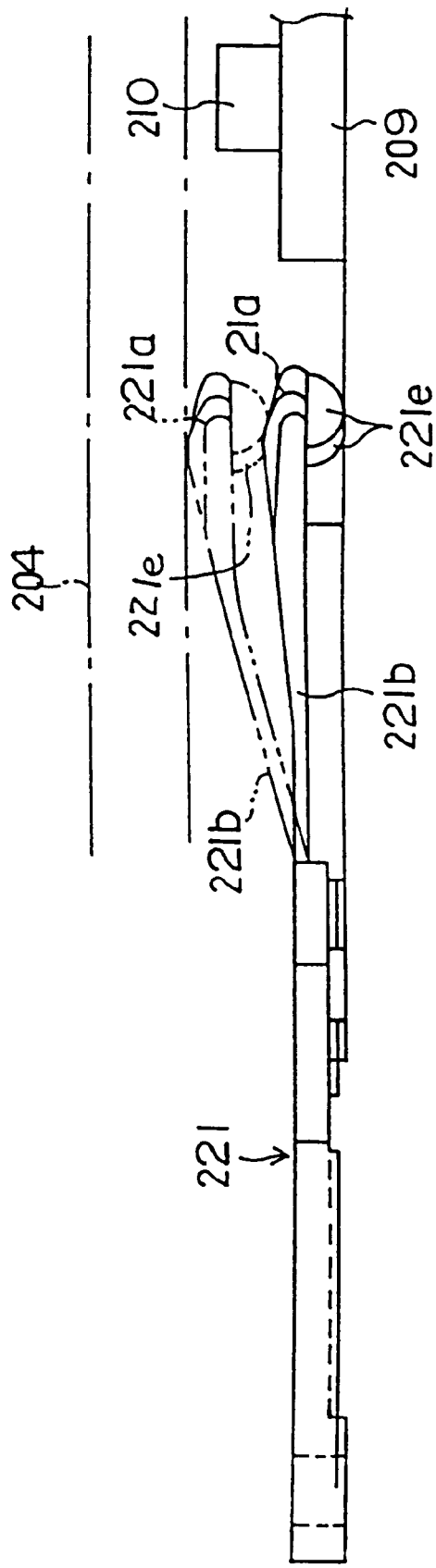
FIG. 19 is a rear view showing the operation of a contact preventing member in the second embodiment.

Thus, as indicated by a chain doubled-dashed line of FIG. 19, when the slider 215 slides in the A direction in response to the ejection operation, the guide part 221a ascends to a position at which the guide part 221a ensures that the disk cartridge 204 is kept clear of the lower magnetic head 210, by the pair of projections 221e sliding on the pair of slopes 224a. Since the pair of projections 221e slide on the pair of slopes 224a, the guide part 221a is prevented from inclining and is maintained level as it rises.

Since the guide hole is prevented from being displaced up and down in an unstable manner by means of the screw 222, the elastically deformable arm 221b functions as a spring member. As a result, the guide part 221a is pressed against the pair of slopes 202h at all times so that the guide part 221a does not block the insertion of the disk cartridge 204 by becoming clear of the pair of slopes 202h while sliding on the pair of slopes 224a.

The magnetic disk inside the disk cartridge 204 is mounted on a turntable 225 rotated at a constant speed by being driven to rotate by a motor 226.

A front bezel 227 is mounted to the front end of the frame 202 and the shield cover 216. An opening 227a through which the cartridge 204 is inserted into or removed from the device is provided in the front bezel 227, and a lid 228 for blocking and unblocking the opening 227a is rotatably provided behind the opening 227a.

The lid 228 is urged to block the opening 227a by a spring force of a torsion spring 229. When the disk cartridge 204 is inserted, the lid 228 is rotated to unblock the opening 227a. The front of the shield cover 216 is provided with projections 216a for preventing the lid 228 from being bent as the lid 228 is pressed by the disk cartridge 204.

A description will now be given of the operation of the magnetic disk apparatus 201 having the above construction.

Figure 14:
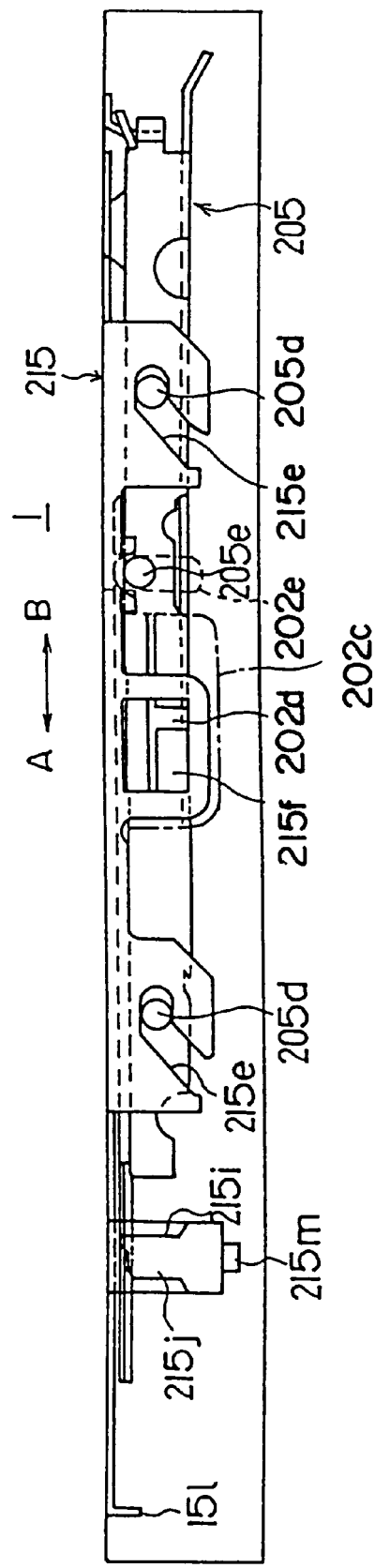
FIG. 14 is a side view explaining the operation of the holder, a slider and a frame of the second embodiment.
Figure 16:
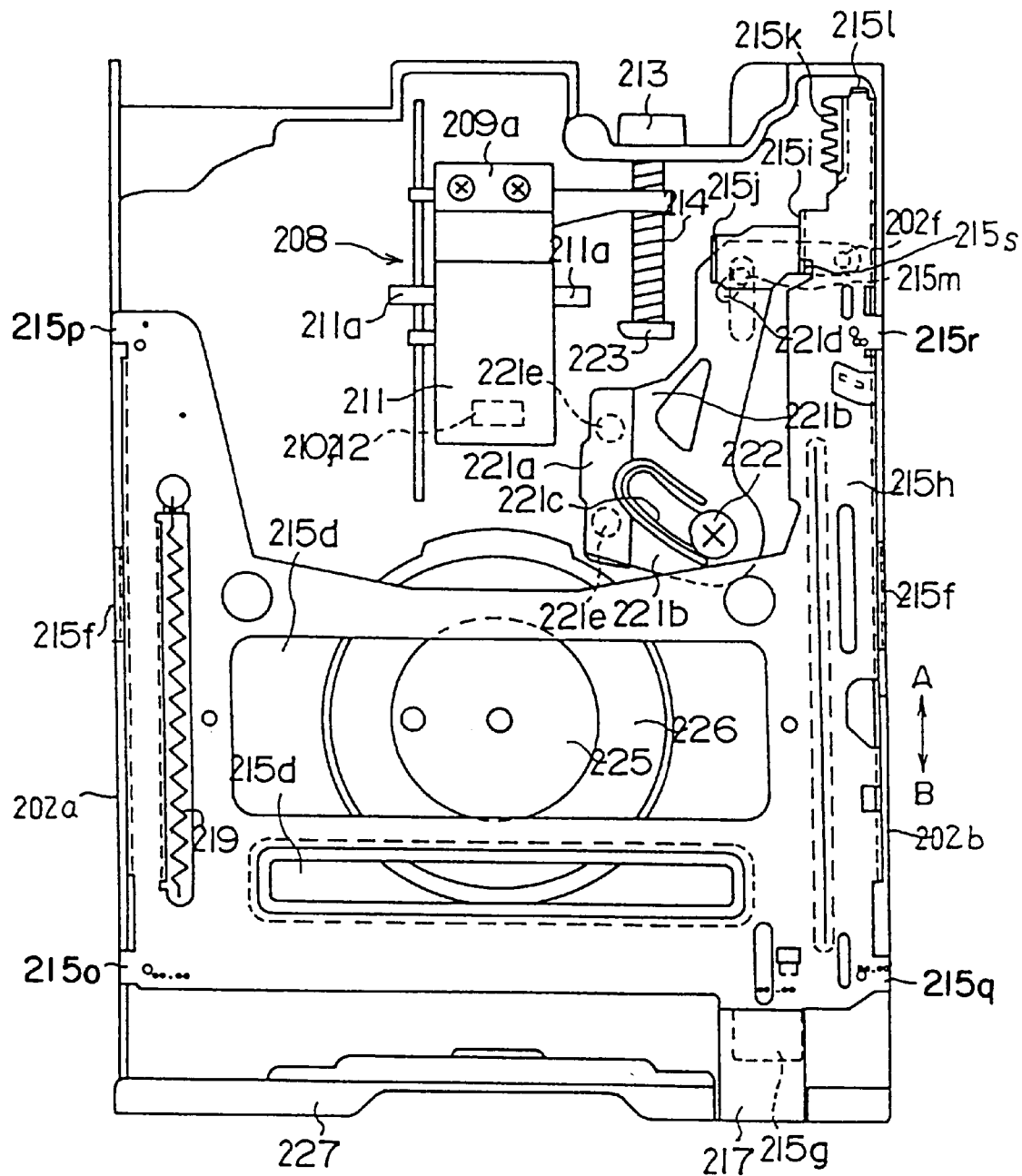
FIG. 16 is a top view of the device according to the second embodiment in a state before a disk cartridge is inserted, with the holder and the shield cover being removed.

Before the disk cartridge 204 is inserted, the magnetic disk device 201 is in the state shown in FIGS. 14 through 16. That is, the slider 215 is latched in a position displaced in the A direction. Together with the holder 205, the arm 211 having the upper magnetic head 212 ascends to a position at which the cartridge insertion is enabled. As shown in FIG. 15, the latch lever 206 is rotated to a position at which the ejection of the disk cartridge is done, and, as shown in FIG. 16, the contact preventing member 221 is rotated to a position at which the contact preventing member 221 does not define the height of the disk cartridge 204.

When the disk cartridge 204 is inserted into the holder 205 through the opening 227a of the front bezel 227, the front end of the disk cartridge 204 slides in the A direction and comes into contact with the latching pawl 206a of the latch lever 206. Since, as indicated by a chain double-dashed line of FIG. 19, the guide part 221a of the contact preventing member 221 ascends the slopes 224a of the projection 224 provided on the frame 202 so that the guide part 221a is raised to a predetermined height, and the front end of the disk cartridge 204 slides on the guide part 221a of the contact preventing member 221. Thus, as the disk cartridge 204 is inserted, it is guided to a height at which the front end thereof does not come into contact with the lower magnetic head 210.

When the disk cartridge 204 is further thrust in the A direction, the latch lever 206 is rotated clockwise as shown in FIG. 17 so that the shutter 204a of the disk cartridge 204 is slid open.

Also, the cam 206b of the latch lever 206 is removed from the latching part 215i of the slider 215 so that the slider 215 is released from the latching engagement with the latch lever 206. As a result, the slider 215 slides in the B direction due to the spring force of the springs 207 and 219. Since the guide hole 215f of the slider 215 is slidably held within the depression 202c of the frame 202, the vertical motion of the slider 215 is restrained by the engaging bulge 202d in the depression 202c. The slider 215 is prevented from descending by the contact parts 215o–215r coming into contact with the top of the respective sides 202a and 202b of the frame 2. Thus, the slider 215 is capable of moving only in the A-B direction.

Since the engaging pin 215m of the slider 215 is directly engaged with the engaging hole 221d, the contact preventing member 221 is rotated counterclockwise when the slider 215 is rotated in the B direction. That is, immediately before the holder 205 is lowered, the contact preventing member 221 is rotated around the pin 202f so as to leave the position (first position) indicated in FIG. 16 at which position contact between the disk cartridge 204 and the lower magnetic head 210 is disabled, and to reach a position (second position) at which the contact is enabled, as indicated in FIG. 13.

Thus, the contact preventing member 221 recedes to the second position before the disk cartridge 204 is lowered and mounted in a predetermined position. That is, the guide part 221a slides down the slopes 224a and reach the lower end position in the frame 202. Therefore, disabling of the rotation motion of the contact preventing member 221 resulting from the guide part 221a being sandwiched between the disk cartridge 204 and the projection 224 of the frame 202 is avoided.

Since the projecting pins 205d projecting from the respective sides of the holder 205 are engaged with the respective slanting grooves 215e provided in the sides 215b and 215c of the slider 215, the projecting pins 205d are urged to slide downward in the respective slanting grooves 215e as the slider 215 slides in the B direction.

Figure 21:
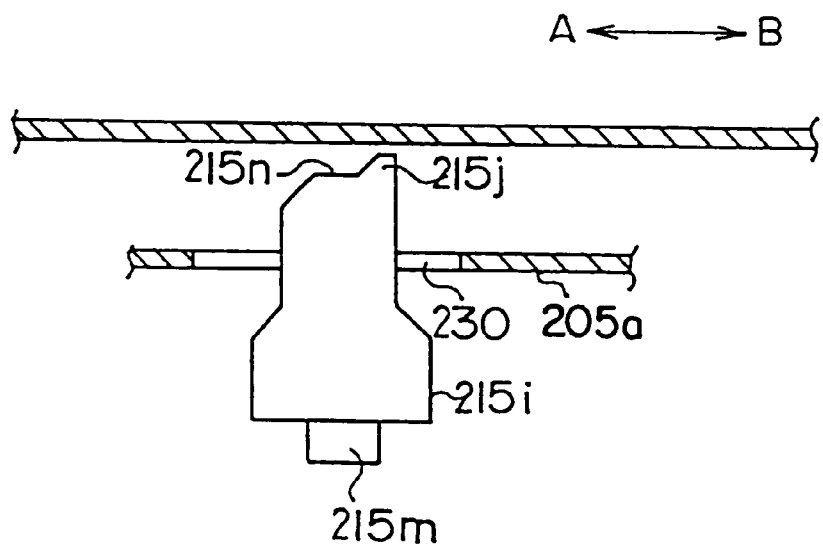
FIG. 21 is a side view explaining the operation in which the holder is lowered to a disk-mounting position in the second embodiment.

Simultaneously, the holder supporting part 215j of the slider 215 moves from a position indicated in FIG. 20 to a position indicated in FIG. 21, with the result that the long hole 230 provided in the holder 205 is directly opposite the stepped part 215n of the holder supporting part 215j, so that the stepped part 215n no longer defines the height of the holder 205.

Figure 18:
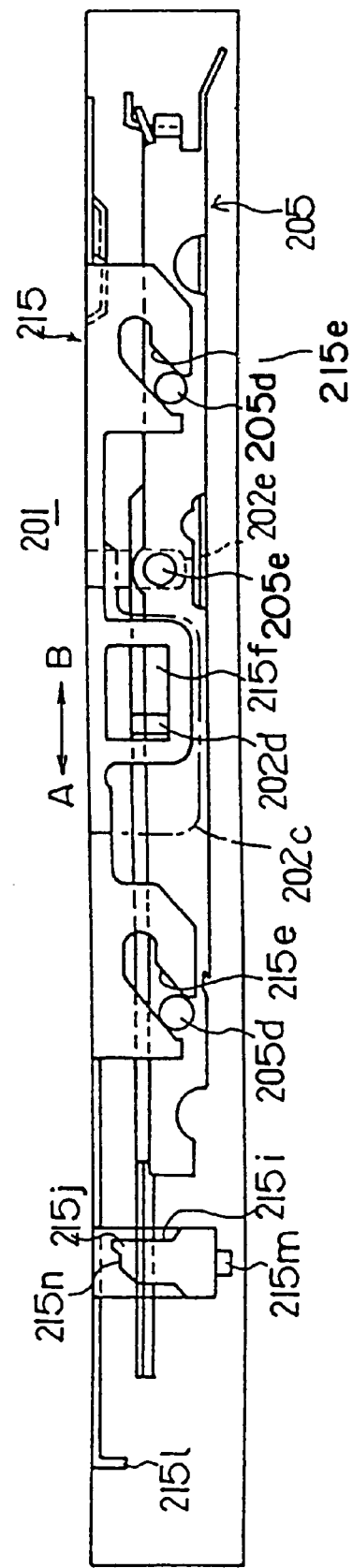
FIG. 18 is a side view of the device according to the second embodiment in a state after a disk is mounted.

The holder 205 is then lowered from a cartridge insertion/ejection position indicated in FIG. 14 to a disk-mounting position indicated in FIG. 18, and the magnetic disk inside the disk cartridge 204 is mounted on the turntable 222. As the holder 205 is lowered, the arm 211 is rotated downward by a pressing force of the torsion spring so that the upper magnetic head 212 is lowered.

Since the shutter 204a of the disk cartridge 204 is latched to the latching pawl 206a of the latch lever 206 and slid open as the disk cartridge 204 is inserted into the holder 205, a magnetic disk 203 is mounted on the turntable 225, and the magnetic heads 212 and 210 are enabled to come into contact with the recording surface of the magnetic disk.

When the motor 226 drives the turntable 225 into rotation, the magnetic disk is rotated with the turntable 225, the magnetic heads 210 and 212 performing magnetic recording/reproduction.

A description will now be given of the ejection operation of the magnetic disk device 201 having the above construction.

In order for the magnetic disk mounted as described above to be ejected together with the disk cartridge 204, the eject button 217 is pressed in the A direction. In response to this pressing operation, the slider 215 slides in the A-B direction while being prevented from detaching from the frame 202 such that the guide hole 215f is slidably held in the depression 202c provided in the sides of the frame 202, the engaging bulge 202d restraining the vertical movement of the slider 215, and such that the contact parts 215o–215r come into contact with the top of the respective sides 202a and 202b of the frame 202 and prevent the slider 215 from descending.

Thus, when the slider 215 slides in the A direction as described above, the holder 205 ascends to the cartridge insertion/ejection position as a result of an action contrary to the action initiated by the disk cartridge insertion.

Since the engaging hole 221d of the contact preventing member 221 is directly engaged with the engaging pin 215m of the slider 215, the contact preventing member 221 is rotated clockwise (see FIG. 16) around the pin 202f as the slider 215 slides in the A direction. Therefore, the guide part 221a of the contact preventing member 221 reaches a position at which, as indicated by the broken line of FIG. 19, the pair of projections 221e mount on the slope 224a of the projection 224 on the frame 202, and at which the guide part 221a prevents the disk cartridge 204 from coming into contact with the lower magnetic head 210.

The movement of the slider 215 in the A direction also causes the coil spring 207 extended between the latch lever 206 and the slider 215 to be expanded so as to increase the spring force of the coil spring 207. The cam 206b is released from its latching engagement with the latching part 215i when the spring force of the coil spring 207 is at its strongest. Therefore, the latch lever 206 is rotated forcibly by the spring force of the coil spring 207, thus enabling the disk cartridge to be ejected in a stable manner.

Since the holder supporting part 215j of the slider 215 leaves the position indicated in FIG. 21 and returns to the position indicated in FIG. 20, the stepped part 215n of the holder supporting part 215j is removed from the long hole 230 provided in the holder 205 so as to support the top plate 205a of the holder 205 and defines the height of the top plate 205a.

In this way, after the disk cartridge 204 is ejected from the holder 205, the top plate 205a of the holder 205 is supported by the stepped part 215n of the holder supporting part 215j and prevented from being displaced downward. Accordingly, even when there is a variance in the degree of precision with which the top plate 205a of the holder 205 is worked or even when an external oscillation is exerted thereto, the top plate 205a is prevented from being displaced downward, and the level at which the disk cartridge 204 is inserted is maintained.

A description will now be given of an essential part of the second embodiment.

Figure 12:
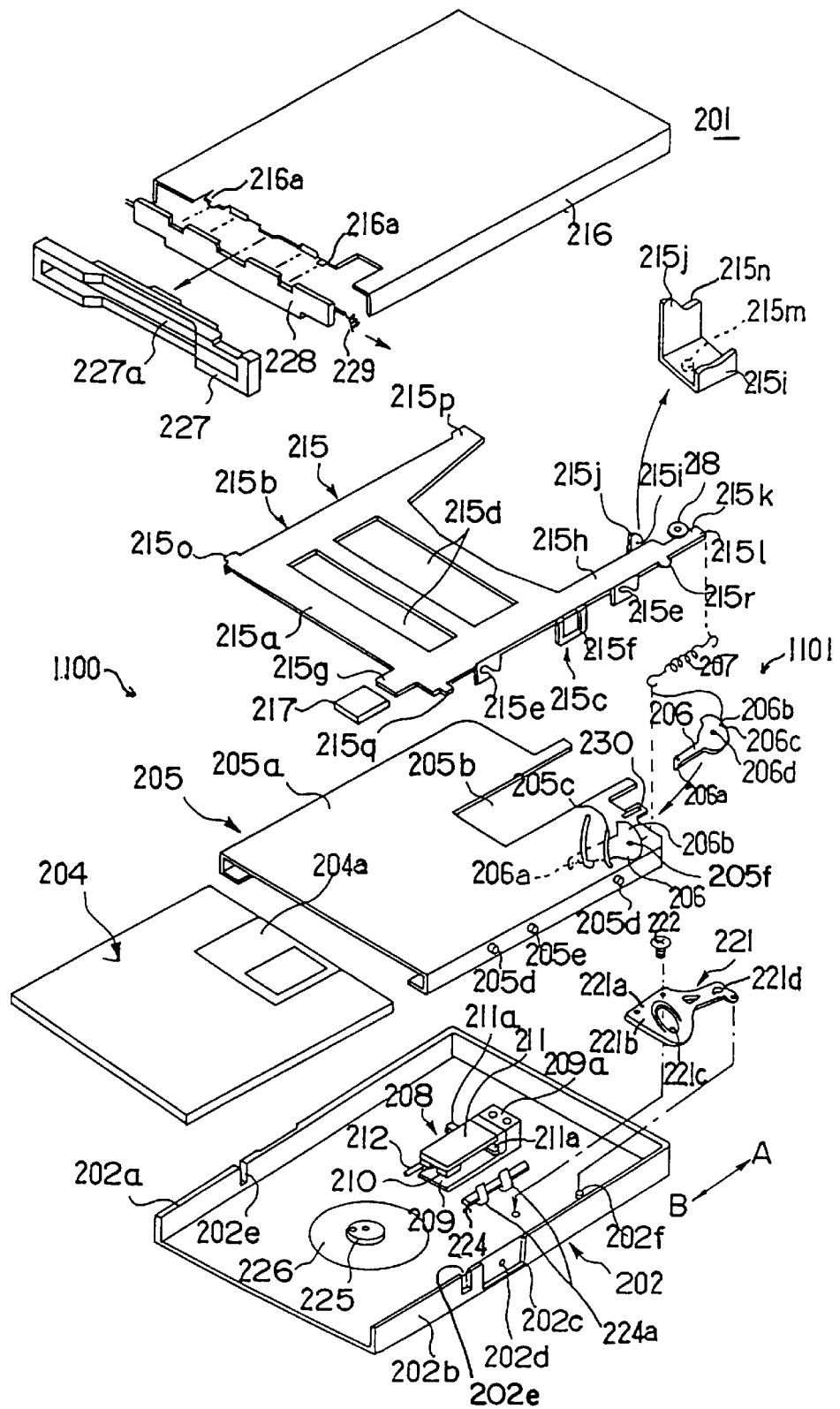
FIG. 12 is an exploded perspective view of a magnetic disk device according to a second embodiment of the present invention.

Referring to FIG. 12, the magnetic disk device 201 has a magnetic disk cartridge mounting mechanism 1100 and a magnetic disk cartridge leading-in mechanism 1101.

The mounting mechanism 1100 comprises a holder 205 and a slider 215.

The leading-in mechanism 1101 comprises the latch lever 206 and a driving piece 215s of the slider 215. The driving piece 215s is formed in a portion of the latching part 215i.

Figure 23:
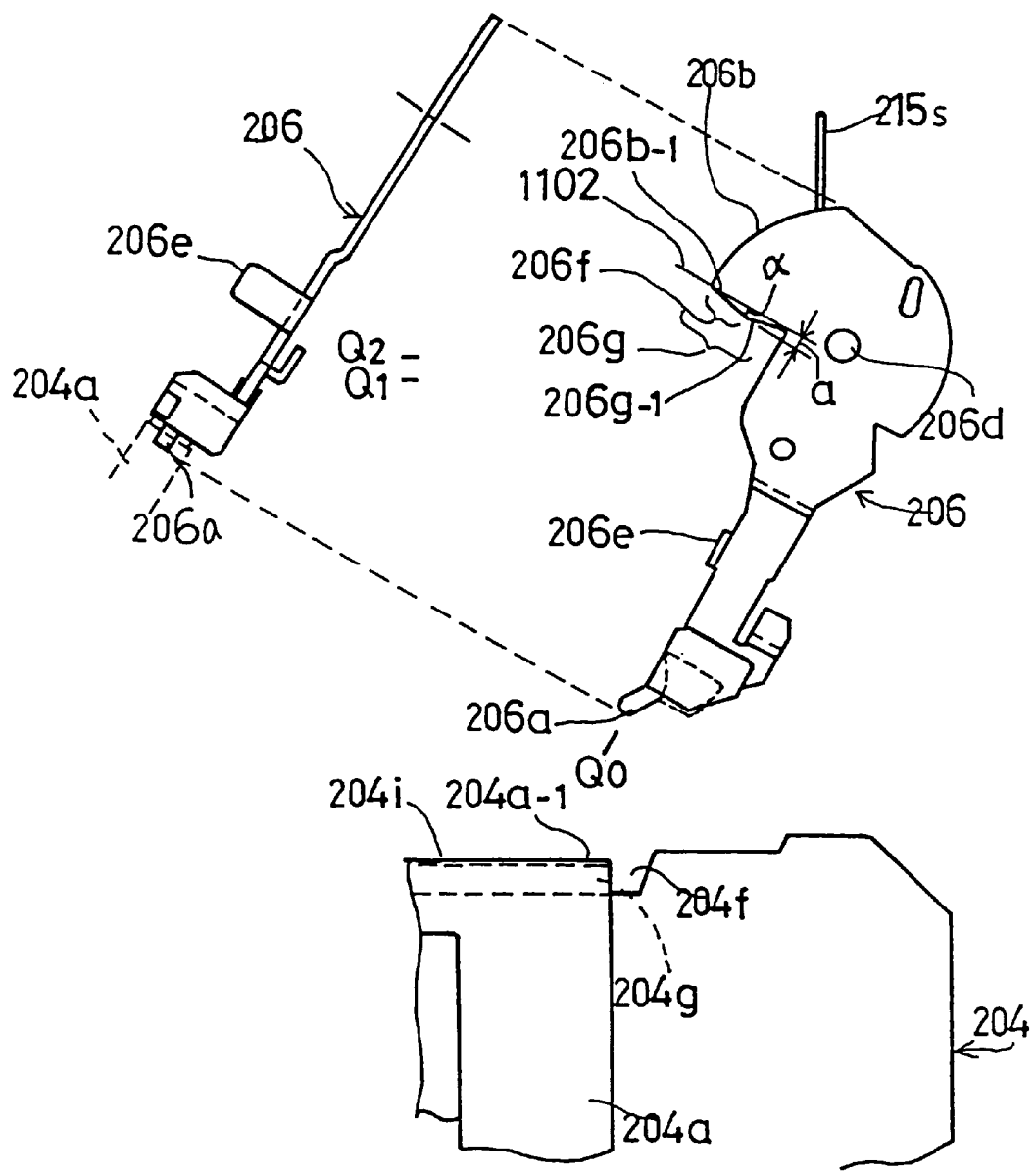
FIG. 23 shows a relationship between the magnetic disk cartridge and the latch lever in the second embodiment when the magnetic disk cartridge is inserted.

As shown in FIG. 23, the latch lever generally has the shape of a letter L, and has the latching pawl 206a at its end. The latch lever 206 also has a tongue piece 206e in its middle, and has the cam 206b and a cam 206f toward its base.

Figure 25:
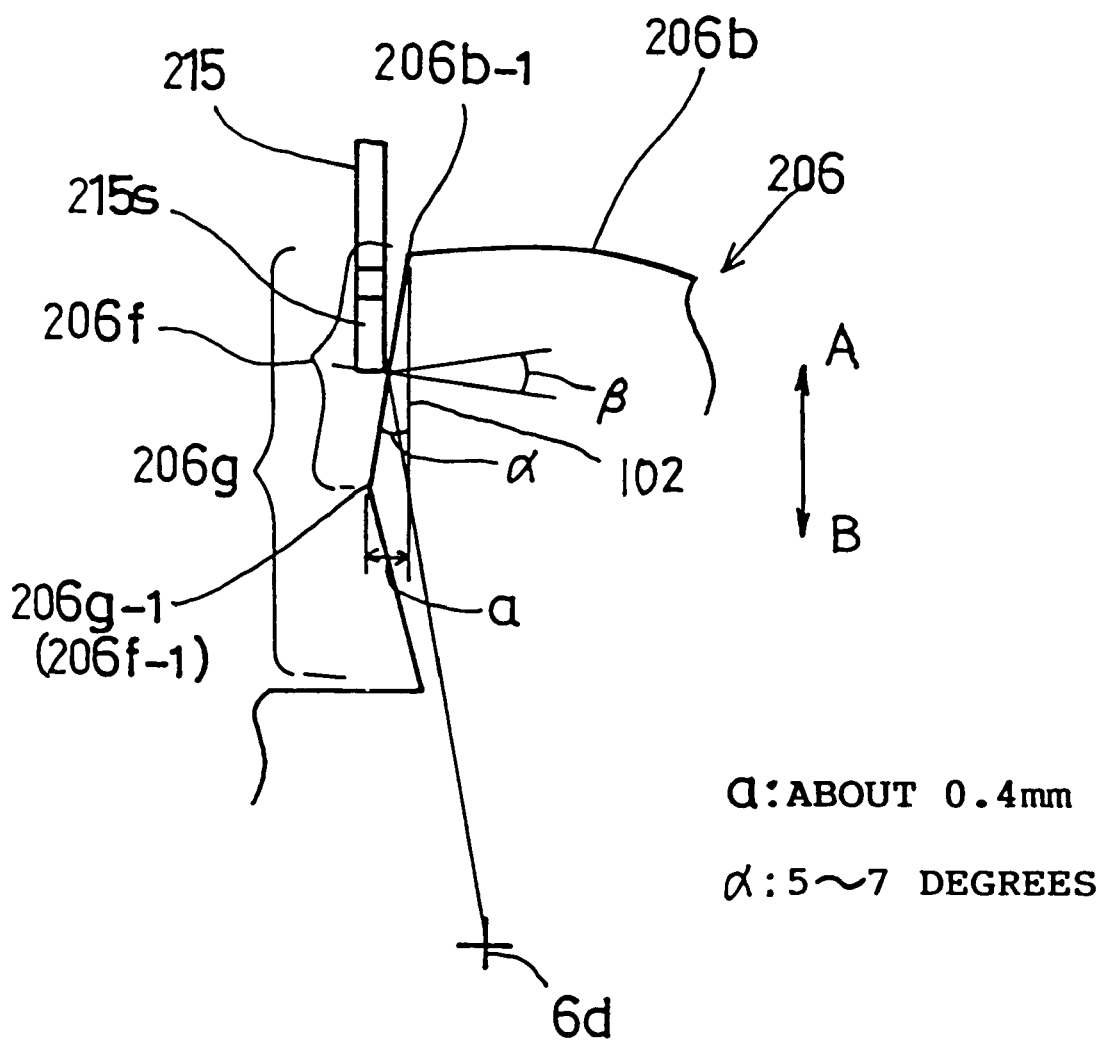
FIG. 25 shows how a driving piece presses a cam in the second embodiment on an enlarged scale.

As is also shown in FIG. 25, the latch lever 206 has an edge 206g extending from an end 206b-1 of the arc shaped 206b toward the pivot hole 206d.

When viewed from the cam 206b, the edge 206g generally has the shape of a triangle projecting into the view. The oblique side extending from an apex 206g-1 to the end 206b-1 of the triangle constitutes the cam 206f.

An end 206f-1 of the cam 206f projects by a dimension a (about 0.4 mm) toward the engaging pawl 206a with respect to the end 206b-1.

A consideration will now be given of the position of the latch lever 206 when, as shown in FIG. 24A, the driving piece 215s of the slider 215 reaches the end 206b-1 of the arc shaped cam 206b (the engaging pawl 206a is at a position Q1).

In the above described state, the cam 206f is inclined clockwise by a small degree α (for example, about 5–7 degrees) with respect to a line 1102 extending in the A-B direction (see FIG. 23).

Figure 22A:
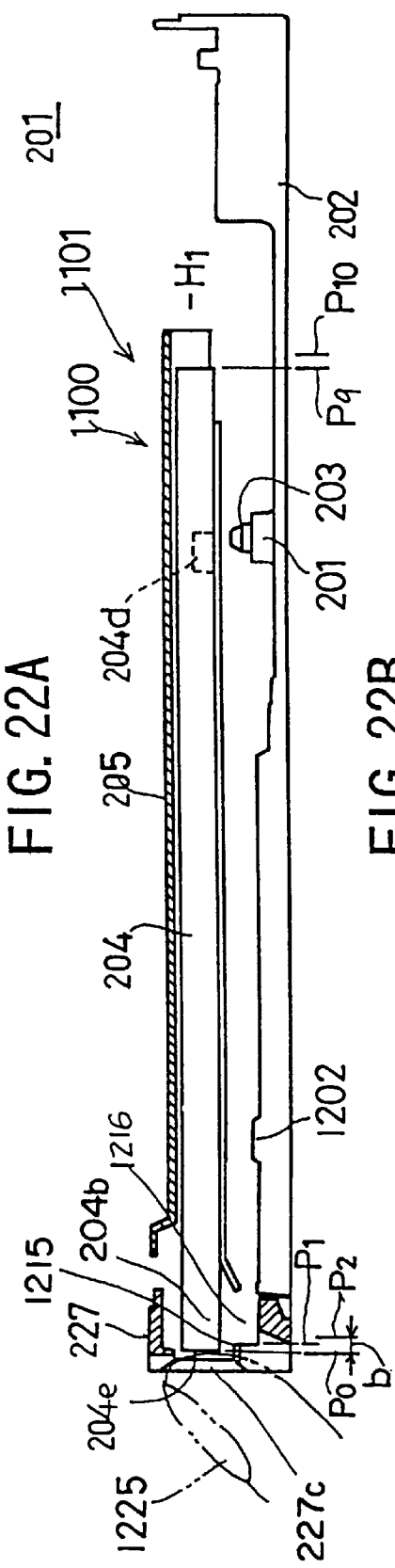
FIGS. 22A, 22B and 22C show how the magnetic disk cartridge is led in and mounted in the second embodiment.

The relative position of the cam 206b of the latch lever 206 and the driving piece 215s is determined in the following manner; when the latch lever 206 is rotated clockwise as a result of the insertion of the magnetic disk cartridge 204 to reach the position indicated in FIG. 24A (where the engaging pawl 206a reaches the position Q1), that is, when an rear end face 204e and a front end 204i of the magnetic disk cartridge 204 have reached positions P0 and the position P9, respectively, as shown in FIG. 22A, the arc shaped cam 206b of the latch lever 206 is detached from the driving piece 215s, the position P0 being slightly displaced toward the front with respect to the position P1, and the position P9 being slightly displaced toward the front with respect to the position P10.

The driving piece 215s and the cam 206f constitutes a cooperating mechanism in the claims.

A description will now be given of the operation of mounting the disk cartridge 204, particularly focusing on the operation for leading in the disk cartridge 204.

Figure 26A:
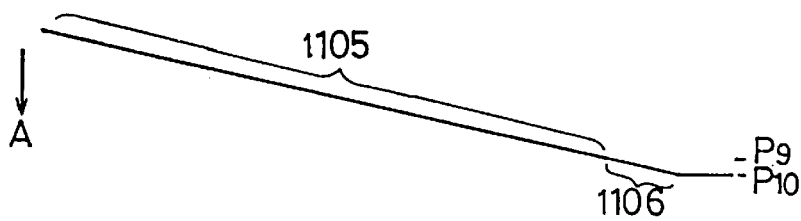

(1) As shown in FIG. 22A, an operator inserts the magnetic disk cartridge 204 and secures the disk cartridge 204 in the device by pressing the rear end face 204e with a finger 1225 (see a portion 1105 of FIG. 26A). Before the insertion, the latch lever 206 is at the position indicated in FIG. 23, the end of the latch lever being located at a position Q0. As can be learned in FIG. 23, when the disk cartridge 204 is inserted, the engaging pawl 206a is accommodated in a depression 204f.

Figure 26B:
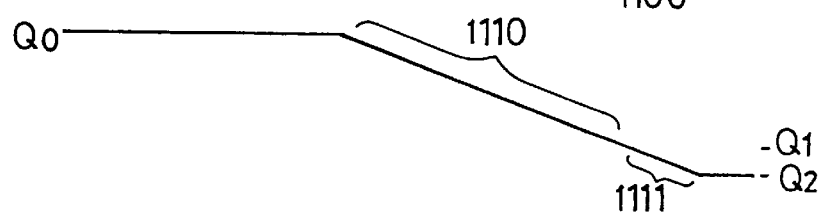
Figure 26C:
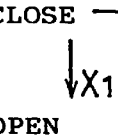

When the disk cartridge 204 is further inserted, the latch lever 206 is pressed by the magnetic disk cartridge 204 against a force exerted by the coil spring 207 so as to be rotated clockwise (see a portion 1110 in FIG. 26B). When the latch lever 206 is rotated clockwise, the latching pawl 206a enters a space 204g behind an end 204a-1 of the shutter 204a. The shutter 204a is pressed by the end of the latch lever 206a so as to move in the X1 direction and is opened (see FIG. 26C). As shown in FIG. 24A, even after the shutter 204a is opened, the engaging pawl 206a is in the space 204g.

(2) When the magnetic disk cartridge 204 is pressed until it reaches the position indicated in FIGS. 22A and 24A (where the rear end face 204e is located at the position P0, the front end 204i is located at the position P9, and a positioning depression 204d is slightly displaced in the B direction with respect to a positioning pin 1203), the cam 206b is disengaged from the driving piece 215s, and the slider 215 is released from the latching engagement with the cam 206b. The slider 215 then slides in the B direction due to the spring force of the spring 219, and the magnetic disk cartridge mounting mechanism 1100 is activated due to the spring force.

When the mounting mechanism 1100 is activated, an operation of pressing the magnetic disk cartridge 204 is no longer necessary.

It is to be noted that the position P0, at which the mounting mechanism 1100 is activated in the second embodiment, is more displaced by a dimension b (about 1.2 mm) toward the front than the conventional position P2. Therefore, the finger 1225 need not be pressed hard against the bezel 227. That is, the operation of securing the magnetic disk cartridge 204 in the device is easier than in the case of the conventional device.

Figure 26D:
Figure 26E:

The slider 215 slides a distance c in the B direction (see FIG. 26D). As a result of the sliding motion of the slider 215, the following two operations are carried out. First, the magnetic disk cartridge leading-in mechanism 1101 is activated. That is, in a process in which the slider 215 moves a distance d that is a first half of the distance c, the driving piece 215s, moving in the B direction, presses the cam 206f in the X2 direction.

As shown in FIG. 25, an angle β at which the driving piece 215s presses the cam 206f is relatively small. Since, at this stage, the spring 219 is expanded to a relatively large degree, and a force F1 exerted by the spring 219 on the slider 215 moving in the X2 direction is relatively strong. Therefore, the cam 206f is smoothly pressed in the X2 direction so that the latch lever 206 is further rotated clockwise by about 3 degrees with respect to its position indicated in FIG. 24A so as to reach a position indicated in FIG. 24B (see a portion 1111 of FIG. 26B). Referring to FIG. 24B, the engaging pawl 206a moves from the position Q1 to a position Q2. The latch lever 206 is rotated while the latching pawl 206a latches the end 204a-1 of the shutter 204 so as to introduce the magnetic disk cartridge 204 into the holder 205.

Figure 22B:
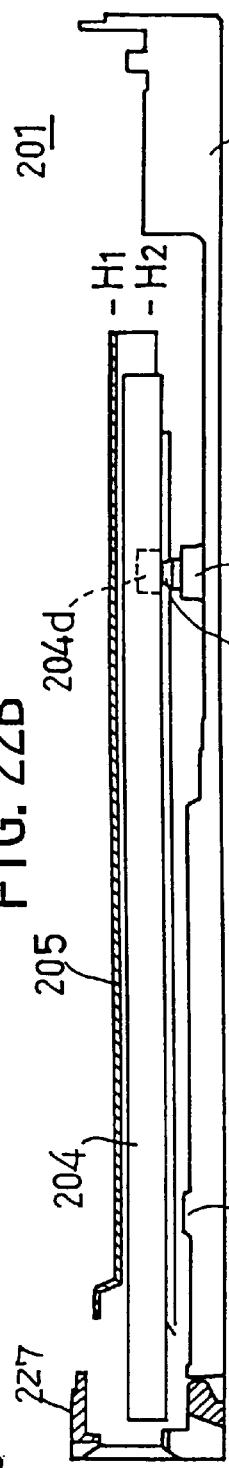

The magnetic disk cartridge 204 is introduced in the A direction by a dimension e (about 1.2 mm). As shown in FIG. 22B, the positioning depression 224d is opposite the positioning pin 1203, the rear end face 224e reaches the position P1, and the front end 204i reaches the position P10 (see a portion 1106 in FIG. 26A).

When the driving piece 215s passes the cam 206f, the clockwise rotation of the latch lever 206 is stopped, and the operation of the magnetic disk cartridge leading-in mechanism 1101 is completed. That is, in the second half of the sliding motion of the slider 215, the driving piece 215s does not affect the cam 206f so that the mechanism 1101 is not activated.

In an alternative approach, the mechanism 1100 may be activated over the entire distance c that the slider 215 slides. However, in this alternative approach, the force exerted by the spring 219 becomes weak at the end of the sliding motion of the slider 215, thus inviting a chance that the mechanism 1100 is not properly activated. Since, in the second embodiment, the first half of the distance that the slider 215 slides is utilized to activate the mechanism 1100, that is, the relatively strong force of the spring 219 is taken advantage of, it is unlikely that the operation of the mechanism 1101 is stopped halfway. Thus, the mechanism 1100 is activated properly and completely.

Figure 22C:
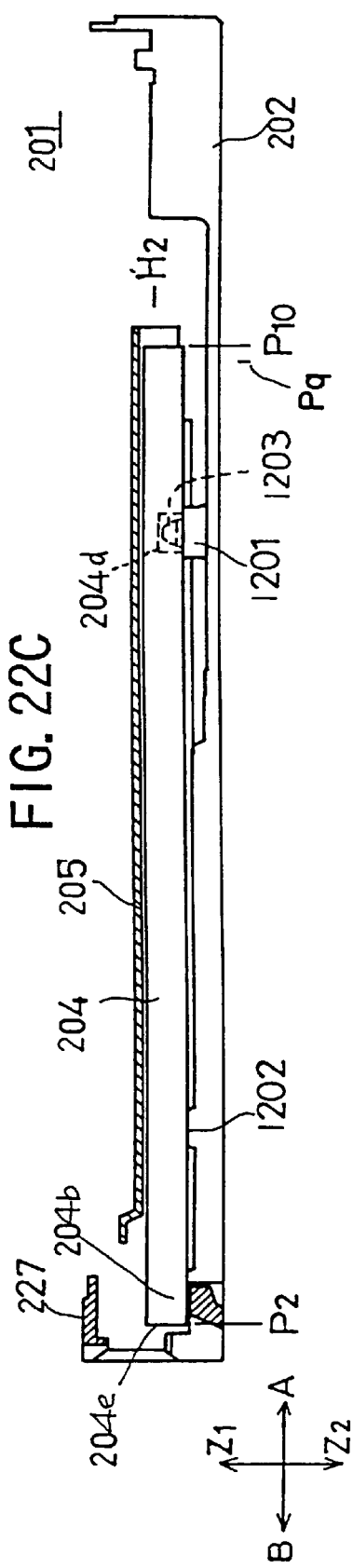

Second, the magnetic disk cartridge mounting mechanism 1100 is activated. That is, in a process in which the slider 215 slides the distance c, the slanting groove 215e guides the projecting pin 205d so that the holder 205 is lowered in the Z2 direction from a height H1 to the height H2 (see FIG. 26E). As a result of this, the magnetic disk device 201 is put into a state shown in FIG. 22C via states shown in FIG. 22A and FIG. 22B. In the state shown in FIG. 22C, the magnetic disk cartridge 204 is properly mounted.

Responsive to the ejection operation of pressing the eject button 217 in the A direction, the mounting mechanism 1100 and the leading-in mechanism 1101 are performed backward and in reversed sequences with respect to the way they are performed in the mounting operation.

As for the leading-in mechanism 1101, the latch lever 206 is rotated counterclockwise, and the magnetic disk cartridge 204 moves slightly in the B direction within the holder 205. However, this action takes place in the latter stage of the ejection operation, in which stage the holder 205 starts its ascending motion, the positioning depression 204d is slipped out of the positioning pin 1203, and the rear end face 204b is located higher than a projecting step 1215. The operation for ejecting the magnetic disk cartridge 204 goes through states shown in FIGS. 22C, 22B and 22A, in the stated order.

Since the engaging pawl 206a enters behind the end 204a-1 of the shutter 204a, it is unlikely that the shutter 204a is unlatched from the latching pawl 206a even when a large external force is exerted from outside the magnetic disk device 201. Hence, there is no danger of the shutter 204a being closed accidentally to damage the magnetic head 210 or the magnetic head 212.

A description will now be given of a variation of the second embodiment.

(1) It is to be noted that the second embodiment is not limited to the aforementioned construction in which the shutter opening/closing lever and the latch lever are integral with each other. The second embodiment can be realized even when the latch lever and the shutter opening/closing lever are provided separately. This is possible by providing a mechanism for activating the levers in cooperation with a means for mounting a body accommodating a recording medium.

(2) The magnetic disk cartridge leading-in mechanism may be in cooperation with the lowering of the holder 205.

(3) The magnetic disk cartridge leading-in mechanism may be constituted to lead the magnetic disk cartridge in by engaging a part of the magnetic disk cartridge other than the shutter.

(4) The distance that the magnetic disk cartridge travels as it is led in may be increased by providing a horizontally elongated groove at the end of the slanting groove 215e of the slider 215. The operation of leading the magnetic disk cartridge in may be completed before the holder 205 starts to be lowered.

(5) The second embodiment may also be applied to an automatic mounting unit for mounting the disk cartridge automatically such that a motor is activated when the magnetic disk cartridge is inserted halfway. The second embodiment acts to define a position at which the magnetic disk cartridge reaches as it is led in by means of the motor and thus serves to configure the automatic mounting unit to be more reliable than the conventional unit.

A description will now be given of a magnetic disk device according to a third embodiment of the present invention.

FIG. 27 shows a magnetic disk device 301 according to the third embodiment of the present invention. FIG. 27 corresponds to FIG. 15 showing the second embodiment. In the third embodiment, a latch lever 235 is used in place of the latch lever 206 used in the second embodiment. The latch lever 235 is constructed such that an engaging pawl 237b embodying a restraining member is added to the latch lever 206. The third embodiment resolves the problems discussed with reference to FIGS. 5A and 5B, and FIG. 3 and 4.

FIG. 28 is a top view of the latch lever 235; FIG. 29 a side view taken in the direction G of FIG. 28; and FIG. 30 a rear view of the latch lever 235. The latch lever comprises a lever main body 236 and an engagement member 237 provided at an end 236a of the lever main body 236. FIG. 31 and 32 are enlarged top view and side view, respectively, of the area near the engagement member 237.

The lever main body 236 is a plate member formed to have an arm at its end and comprises, at its base, an arc shaped cam 236b and a straight cam 236f, a pivot hole 236d and a spring latching hole 236c being provided in the base. A tongue piece 236e is formed to extend in the H1–H2 direction. The lever main body 236 is formed by press-working a metal.

The engagement member 237 is formed to be integral with the end 236a of the lever main body 236. The engagement member 237 is a member formed, for example, of a plastic. The engagement member 237 is formed at the end 236a of the lever main body 236 by insert molding.

A projection 237c of the engaging member 237 is formed to project in the H1 direction from a surface 237d of the engagement member 237.

A beak shaped engaging pawl 237a is formed to project from the projection 237c of the engagement member 237.

The latching pawl 237b is formed to project from the projection 237c. Viewed from the top, the latching pawl 237b forms an angle with the engaging pawl 237a (see FIG. 31), and the sides of the latching pawl 237b are formed as wide faces having a width w in the H1–H2 direction (see FIG. 32).

As described above, the latching pawl 237b has a simple construction and can be formed to be integral with the engagement member 237 having the engaging pawl 237a, without causing the number of parts to be increased.

A description will now be given of the operation of the magnetic disk device 301 which has the above construction. FIG. 27 shows a state of the magnetic disk device 301 before the cartridge 204 is inserted. That is, the latching part 215i is in contact with the cam 236b of the latch lever 235, and the slider 215 is latched at an end position displaced in the A direction. The arm 211 which has the upper magnetic head 212 is raised together with the holder 205 so as to allow the disk to be mounted. The latch lever 235 is rotated to a position at which the ejection operation is carried out.

When the cartridge 204 is inserted into the holder 205 via the opening 227a of the front bezel 227, the engaging pawl 237a of the latch lever 235 comes into contact with the front end of a cartridge main body 241 and enters a depression 241a of the cartridge main body 241 (see FIG. 33). Thereafter, when the cartridge 204 is inserted in the A direction, the latch lever 235 is rotated clockwise, i.e. in the D2 direction, so that the engaging pawl 237a slips behind a front end 242a of the shutter 204a. FIG. 33 shows a corresponding state.

Thereafter, in response to the A direction movement of the cartridge 204, the latch lever 235 is rotated clockwise, and the shutter 204a is thrust open in the X1 direction by the engaging pawl 237a.

As shown in FIG. 33, when the engaging pawl 237a comes into contact with the back of the front end 242a of the shutter 204a, the latching pawl 237b and the engaging pawl 237a sandwich the front end 242a of the shutter 204, thus preventing the A direction movement of the shutter 204a with respect to the cartridge main body 241.

Therefore, even when a large force is exerted on the front end 242a of the shutter 204a by the engaging pawl 237a as a result of a forceful and speedy insertion of the cartridge 204 in the A direction, the engaging pawl 237a restrains the A direction movement of the shutter 204a, and it is possible to prevent pawls 242c and 242d from being disengaged from the groove 241c. Therefore, it is possible to prevent the shutter 204a from being detached from the cartridge main body 241.

In this way, it is possible to prevent the shutter 204a from being detached from the cartridge main body 241 by a simple construction whereby the engaging pawl 237a and the latching pawl 237b sandwich the front end 242a of the shutter 204a.

When the cartridge 204 moves in the A direction and the latch lever 235 is rotated clockwise until the latch lever 235 extends in the X1–X2 direction, the shutter 204a of the cartridge 204 is open all the way.

FIG. 34 shows the latch lever 235 and the cartridge 204. FIG. 34 shows a state where the cam 236b of the latch lever 235 is about to be unlatched from the latching part 215i of the slider 215.

The engaging pawl 237a of the latch lever 235 slips behind the front end 242a of the shutter 204a near a left end 241a-1 of the depression 241a. The shutter 204a comes into contact with the projection 237c (see FIG. 31) of the engagement member 237 from which projection 237c the engaging pawl 237a projects, with the result that the X2 direction movement of the shutter 204a is restrained.

The latching pawl 237b is detached from the front end 242a of the shutter 204a as the latch lever 235 leaves the state shown in FIG. 33 by being rotated clockwise. Thus, the latching pawl 237b does not restrain the X1 direction movement and the A direction movement of the shutter 204a.

When the cartridge 204 leaves the state shown in FIG. 34 and moves slightly in the A direction so as to detach the cam 236b of the latch lever 235 from the latching part 215i of the slider 215, the slider 215 is released from its latching engagement with the latch lever 235. As a result, the slider 215 slides in the B direction by the spring force of the spring 207 and 219.

The guide holes 215f of the slider 215 are slidably held in the depression 202c provided at the sides of the frame 202, the upward movement of the slider 215 being restrained by the engaging bulge 202d of the depression 202c. The contact parts 215o–215r come into contact with the top of the sides 202a and 202b of the frame 202 so that the downward movement of the slider 215 is restrained. Thus, during the B direction sliding notion, the slider 215 is prevented from being detached from the frame 202.

The other aspects of the construction and operation remain the same as those of the second embodiment, and the description thereof is omitted.

A description will now be given of a magnetic disk device according to a fourth embodiment. According to the fourth embodiment, it is possible to mount the disk cartridge in a proper position. The fourth embodiment also prevents the shutter from being detached from the latch lever in the disk cartridge ejection operation and prevents the magnetic head from getting gripped by the shutter.

FIGS. 35 through 37 shows the fourth embodiment. FIG. 35 is a perspective view showing a disk device 301 according to the fourth embodiment; FIG. 36 a perspective view showing an assembly comprising a cover member 313, a slider 314 and a holder 305; and FIG. 37 a perspective view showing a frame 302 and a holder 305.

The magnetic disk device 301 has, on the frame 302, the holder 305 to which a magnetic disk cartridge 304 (see FIG. 38) accommodating a magnetic disk (disk shaped recording medium) is inserted.

The holder 305 is provided to be capable of move up and down in response to the disk cartridge 304 mounting and ejection operations, respectively. A top plate 305a of the holder 305 is provided with an opening 305b through which a magnetic head unit 308 is introduced.

FIG. 38 shows a state of a shutter 304a, a latch lever 306 and a slider 314 when the disk cartridge 304 has been mounted. FIGS. 39A, 39B and 39C show an assembly comprising the slider 314, the holder 305 and the latch lever 306.

The latch lever 306 for engaging the slider 314 is coupled to the upper major surface of the top plate 305a of the holder 305. The latch lever 306 is provided with a shutter opening/closing member 306A rotated to open the shutter 304a of disk cartridge 304 in response to the cartridge insertion operation.

The latch lever 306 is pivotally supported by a pivot 325 provided in the holder 305 and is urged counterclockwise by an extending force of a coil spring 307 so as to be capable of ejecting the disk cartridge 305 from the holder 305.

FIGS. 40A and 40B shows the operation of the latch lever 306 when the shutter 304a is opened.

The latch lever comprises: an arm 306a having the shutter opening/closing member 306A at its end; a pivot hole 306b engaged with a pivot 325; a rotation restraining part 306c for restraining the rotation of the latch lever 306 by being engaged with the slider 314; a latching hole 306d for latching one end of the coil spring 307; a supporting part 306e provided by bending the end of the arm 306a to support the shutter opening/closing member 306A; an engaging part 306f which, projecting longitudinally from the end of the arm 306a, defines the vertical position of the end of the arm 306a by being engaged with the periphery of an arc shaped guide hole 305g provided in the top plate 305a of the holder 305.

The rotation restraining part 306c is formed to be fan shaped and to project radially around the pivot hole 306b. An arc shaped first restraining part 306h for restraining the B direction sliding motion of the slider 314 is provided at the periphery of the rotation restraining part 306c. A second restraining part 306i for restraining the counterclockwise (D direction) rotating motion of the latch lever 306 is provided to the left of the rotation restraining part 306c.

The supporting part 306e is inserted into the holder 305 from the arc shaped guide hole 305g provided in the top plate 305a of the holder 305, and the shutter opening/closing member 306A fixed to the supporting part 306e is rotated in the guide hole 305g.

The other end of the coil spring 307 is latched to a latching part 314h of the slider 314. Therefore, when the slider 314 slides in the A direction by an ejection operation, the coil spring 307 is expanded so as to increase a force with which to urge the latch lever 306.

The shutter opening/closing member 306A is formed of a plastic and is fixed to the supporting part 306e of the latch lever 306, the supporting part 306e being formed by working a sheet of metal. The shutter opening/closing member 306A comprises: a fixing part 306A1 fixed to the supporting part 306e; an engagement part 306A2 which comes into contact with the side of the shutter 304a of the disk cartridge 304 and is engageable with a depression 304b provided at the front of the disk cartridge 304; and a plate shaped projection 306A3 projecting from the engagement part 306A2 in the E direction to open the shutter 304a.

The engagement part 306A2 is supported by the supporting part 306e provided by bending the end of the arm 306a 90° downward, the vertical dimension of the engagement part 306A2 being greater than the thickness of the shutter 304a of the disk cartridge 304. Thus, the engagement part 306A2 faces the sides of the upper and lower portions of the shutter 304a and in substantially aligned relation with these sides and the side of the disk cartridge 304. In this way, the sides of the upper and lower portions of the shutter 304a are thrust simultaneously so that the opening operation of the shutter 304a by the pressure of the engagement part 306A2 can be performed in a stable manner.

Viewed from the top, the engagement part 306A2 is formed to have an oval shape or a shape of a water drop. The curvature of the outline of the engagement part 306A2 ensures that it is easy for the engagement part 306A2 to be engaged with the depression 304b of the disk cartridge 304 when the latch lever 306 is rotated counterclockwise (in the C direction).

Since the latch lever 306 is coupled to the holder 305, there is no need to provide a gap, between the projection 306A3 and the shutter 304a, for allowing for a vertical movement of the holder 305 between the cartridge-ejection position and the disk-mounting position. Therefore, the projection 306A3 is formed to extend wide in the thickness direction of the shutter 304a so that the projection 306A3 is stronger than the conventional projection and it is less likely that the projection 306A3 is bent in the face of an external impact.

FIGS. 41 and 42 are cross sectional views of the device in which the disk cartridge 304 is mounted, FIG. 41 being a front view and FIG. 42 being a side view.

The magnetic head unit 308 comprises: a carriage 309 provided to be movable in the radial direction (A-B direction) of the disk; a lower magnetic head 310 provided on the upper major surface of the end of the carriage 309; an arm 311 rotatably supported by an end 309a of the carriage 309; and an upper magnetic head 312 provided on the lower major surface of the end of the arm 311. In this embodiment, the carriage 309 and the arm 311 are provided to extend in the direction (A-B direction) in which the disk cartridge 304 is inserted.

The carriage 309 is screw coupled to a lead screw (not shown) driven by a stepping motor (not shown). Hence, the carriage 309 moves in the A and B directions in the frame 302 in response to the rotation of the lead screw so as to move the magnetic heads 310 and 312 in the tracking direction of the magnetic disk 303.

The arm 311 is urged downward by a pressing force of a torsion spring 309c provided at the base end 309a of the carriage 309. A contact part 311a projects from the side of the arm 311, and the top plate 305a of the holder 305 is in contact with the contact part 311a. That is, before the cartridge is inserted, the arm 311 is urged upward as a result of the rise of the holder 305 so as to separate the upper magnetic head 312 from the lower magnetic head 310.

FIG. 43 is an exploded perspective view showing a cover member 313 and a slider 314.

The cover member 313 is screwed to screw holes 302c (see FIG. 37) formed at edges 302a and 302b of the frame 302 so as to cover the holder 305. The cover member 313 comprises: a flat part 313a formed to have a shape of a letter J in a top view; a recess 313b formed to keep clear of the upper magnetic head unit 308; fitting parts 313c which, projecting from the respective sides, accept fitting screws 315; and forked guide parts 313e having guide grooves 313d which are engaged with pins 305f projecting from sides 305d and 305e of the holder 305 so as to guide the rising and lowering motion of the holder 305.

The slider 314 is provided between the top plate 305a of the holder 305 and the cover member 313. The slider 314 has a top plate 314a characterized by a U-shape top view and side plates 314b and 314c formed by bending the edges of the top plate 314a downward. Guide pins 316 provided below the long holes 314d are inserted through the guide holes 314d and settled in holes 313f provided in the flat part 313a of the cover member 313, the long holes 314d being provided in the top plate 314a so as to extend in the A-B direction. A hole 314d1 into which a large-diameter part 316a of the guide pin 316 is inserted is provided at an end of the long hole 314d, and a guide groove 314d2 in which a small-diameter part 316b of the guide pin 316 slides is also provided in the long hole 314d.

Thus, the slider 314 is held by the guide pins 316 projecting downward from the cover member 313 to be slidable in the A-B direction.

A projection 314i engageable with the rotation restraining part 306c of the latch lever 306 is provided at the inwardly facing side of the top plate 314a of the slider 214. The side plates 314b and 314c at the respective sides of the slider 314 have slanting grooves 314f engageable with the pins 305f projecting from the holder 305. A fitting part 314g to which an eject button 317 is fitted projects from the front of the top plate 314a.

As shown in FIGS. 39A, 39B and 39C, a compression spring 318 for urging the slider 314 in the B direction is provided so as to be inserted into a long hole 314j provided in the top plate 314a of the slider 314 and into a long hole 305h provided in the top plate 305a of the holder 305. One end of the compression spring 318 is latched to a latching hole 314k provided in the slider 314, and the other end is latched to a latching hole 305i provided in the top plate 305a of the holder 305.

Accordingly, when the cartridge is inserted, the slider 314 is displaced in the B direction due to the pressing force of the compression spring 318. In the ejection operation, the slider 314 is caused by the pressing of the eject button 317 to slide in the A direction.

When the slider 314 is caused to slide in the A direction in the ejection operation, the latching part 314i of the slider 314 is separated from the second restraining part 306i so that the latch lever 306 is rotated in the D direction. As a result of this, the shutter opening/closing part 306a of the latch lever 306 presses the front of the disk cartridge 304 in the B direction so as to eject the disk cartridge 304 out of the holder 305.

FIG. 44 is a cross sectional front view showing a state of the device wherein the cartridge has been ejected, and FIG. 45 is a cross sectional side view showing a state of the device wherein the cartridge has been ejected.

Before the cartridge is inserted, the holder 305 is raised to a position at which the holder 305 is capable of accepting the cartridge. Since the arm 311 of the upper magnetic head 312 has the contact part 311a which comes into contact with the top plate 305a of the holder 305, the contact part 311a is raised together with the holder 305. It is necessary to create a gap S for allowing for the upward rotation of the arm 311 between the holder 305 and the cover member 313. The slider 314 is slidably provided between the holder 305 and the cover member 313 so as to be accommodated in the gap S.

According to this embodiment, in which the slider 314 is accommodated in the gap S, the position of the holder 305 at which position the mounting of disk cartridge is enabled can be lower than in the constitution in which the slider 314 is disposed between the holder 305 and the frame 302. Consequently, the magnetic disk device 301 can be made thinner.

A turntable 322 on which the magnetic disk 303 inside the disk cartridge 304 is mounted is rotated at a constant speed by a motor 323. The motor 323 is provided in a base 324 fitted to the bottom of the frame 302. The motor 323 comprises: a driving coil (not shown) on the base 324; and a rotor 323a on which the turntable 322 is provided. That the motor 323 is embedded in the frame 302 and provided in the base 323 is instrumental in making the device thin. The lower position of the holder 305 results in a corresponding lowering of the turntable 322 with respect to the frame 302, a mounting surface 322a of the turntable 322 approaching a surface 302d of the frame 302.

A description will now be given of the cartridge insertion operation in the magnetic disk device having the above construction. FIGS. 46A, 46B and 46C shows successive operations of the latch lever 306 in response to the cartridge insertion operation.

The magnetic disk device 301 is in the condition shown in FIGS. 44 and 45 before the disk cartridge 304 is inserted. That is, the slider 314 is latched in a position displaced in the A direction. The arm 311 having the upper magnetic head 312 is raised together with the holder 305 to a position at which the cartridge insertion is enabled.

As shown in FIG. 35 and as indicated by a dashed chain line of FIGS. 44, 46A, 46B and 46C, when the disk cartridge 304 is inserted into the holder 305 via an opening 301B of the front bezel 301A, the front end of the disk cartridge 304 moves in the A direction and comes into contact with the engagement part 306A2 of the latch lever 306, as shown in FIG. 46A.

When the disk cartridge 304 is pressed further in the A direction, the latch lever 306 is rotated clockwise (in the C direction) as shown in FIG. 46B. As a result of this rotation, the engagement part 306A2 of the latch lever 306 presses the shutter 304a (in the E direction) so as to open the shutter 304a. As the disk cartridge 304 is being inserted in the A direction, the shutter 304a slides in the E direction in response to the clockwise rotation of the latch lever 306 until the shutter 304a is open all the way.

In response to the clockwise direction (C direction) rotation of the latch lever 306, the first restraining part 306h of the rotation restraining part 306c provided in the latch lever 306 is separated from the latching part 314i of the slider 314.

As a result of this, the slider 314 is released from the latching engagement with the latch lever 306 so that the slider 314 slides in the B direction due to a pressing force of the compression spring 318. As shown in FIG. 46C, the latching part 314i of the slider 314 slides in the B direction while sliding along the second restraining part 306i of the restraining part 306c so as to restrain the D direction rotation of the latch lever 6.

As described previously, the slanting grooves 314f provided in the side plates 314b and 314c of the slider 314 are engaged with the pins 305f projecting from the sides of the holder 305. Hence, as the slider 314 slides in the B direction, the pins 305f are pressed downward and slide in the slanting grooves 314f. As a result of this downward sliding motion, the holder 305 is lowered to the disk-mounting position shown in FIGS. 41 and 42, and the magnetic disk 303 inside the disk cartridge 304 is mounted on the turntable 322.

Since the latch lever 306 is provided in the holder 305, detaching of the engagement part 306A2 form the shutter 304a while the holder is lowered to the disk-insertion position is prevented.

The projection 306A3 projecting from the engagement part 306A2 advances into a gap between the shutter 304a and the front of the disk cartridge 304 and is engaged in the gap. This engagement prevents the engagement part 306A2 of the latch lever 306 from being detached from the depression 304b of the disk cartridge 304 even when an impact is exerted in the vertical direction.

Accordingly, the shutter 304a is prevented from sliding in the closing direction by the engagement part 306A2 of the latch lever 306 being detached from the depression 304b. Consequently, the magnetic heads 310 and 312 are prevented from being gripped by the shutter 304a as shown in FIG. 47 during the disk cartridge 304 mounting operation.

While the holder 305 is being lowered, the arm 311 is rotated counterclockwise by a force of the torsion spring 309c so as to lower the upper magnetic head 312. As shown in FIG. 38, when the disk cartridge 304 is inserted into the holder 305, the depression 304b provided at the front of the disk cartridge 304 is engaged with the engagement part 306A2 of the latch lever 306, so that the lateral movement is restrained and the front of the disk cartridge 304 comes into contact with the supporting part 306e of the latch lever 306.

It will be noted that, in a construction whereby the latch lever 306 opens and closes the shutter 304a of the disk cartridge 304, the disk cartridge 304 itself is displaced laterally (in this embodiment, leftward) due to a force of a spring member (not shown) for urging the shutter 304a in a direction in which the shutter 304a is closed. Thus, the side of the disk cartridge 304 comes into contact with the left inner wall of the holder 305. As a result of this, the holder 305 and the disk cartridge 4 are urged in the same direction.

FIG. 48 shows a normal relationship between the depressions 304d formed in the underside of the disk cartridge 304 and positioning bosses 331 formed to stand on the frame 302.

When the disk cartridge 304 and the holder 305 are displaced leftward, the depressions 304d formed in the underside of the disk cartridge 304 are displaced with respect to the positioning bosses 331 formed to stand on the frame 302, with the result that the holder 305 is mounted upon the positioning bosses 331 when the holder 305 reaches the disk-mounting position.

However, since the engagement part 306A2 of the latch lever 306 is engaged with the depression 304d of the disk cartridge 304 so as to restrain lateral displacement of the disk cartridge 304, the position of the disk cartridge 304 is defined such that the depressions 304d of the disk cartridge 304 are aligned with the positioning bosses 331 formed to stand on the frame 302. Therefore, the disk cartridge 304 can be properly settled in the disk-mounting position at which the depressions 304d are directly opposite the bosses 331. When the holder 305 is lowered, the depressions 304d are engaged with the bosses 331 so that the holder 305 is held in the disk-mounting position.

When the magnetic disk 303 is mounted on the turntable 322, the magnetic heads 312 and 310 come into contact with the recording surface of the magnetic disk 303. Thereafter, when the turntable 322 is driven to rotate by the motor 323, the magnetic disk 303 is rotated together with the turntable 322, and the magnetic heads 310 and 312 perform the magnetic recording/reproduction.

A description will now be given of the ejection operation of the magnetic disk device 301 having the above construction.

In order to eject the magnetic disk cartridge 304 mounted in the above described device, the eject button 317 is pressed in the A direction. This pressing causes the slider 314 to slide in the A direction and allows the holder 305 to rise to the cartridge insertion/ejection position.

When the slider 314 moves in the A direction as described above, the latching part 314i of the slider 314 slides in the A direction, as shown in 46B, while sliding along the second restraining part 306i of the rotation restraining part 306c so as to release the latch lever 306 from being restrained in its rotating motion. Consequently, the latch lever 306 is rotated in the D direction due to the spring force of the spring 307 and returns to the position shown in FIG. 46B.

As a result of the latch lever 306 being rotated in the D direction, the disk cartridge 304 inside the holder 305 is pressed by the engagement part 306A2 of the latch lever 306 and ejected in the B direction. When the latch lever 306 is rotated in the D direction, the latching part 314i of the slider 314 comes into contact with the first restraining part 306h so that the B direction sliding motion of the slider 314 is restrained.

Since the shutter 304a of the disk cartridge 304 is urged in the closing direction due to a spring member provided in the disk cartridge 304, the shutter 304a slides rightward so as to block an opening 304c in response to the D direction rotation of the latch lever 306. When the shutter 304a is sliding in the closing direction, the holder 305 is raised to the disk insertion/ejection position. Therefore, the arm 311 is rotated upward as shown in FIG. 45, and it is unlikely that the magnetic head 312 is gripped by the shutter 304a.

FIGS. 49A and 48B show a fifth embodiment of the present invention.

A shutter opening/closing member 332 formed of a plastic is fixed to the end of the arm 306a of the latch lever 306. The end of the arm 306a of the latch lever 306 is provided with an engagement part 334 engageable with the periphery of an arc shaped guide hole 333 of the holder 305, and a contact part 335 which comes into contact with the front of the disk cartridge 304. The engagement part 334 projects from the end of the arm 306a to extend in a direction opposite to the direction that the arm 306a extends.

The shutter opening/closing member 332 has a slit 332a with which the end of the arm 306a is engaged, the slit 332a sandwiching the end of the arm 306a. The slit 332a is provided with a boss 332b engaged with a small hole 336 provided at the end of the arm 306a.

The shutter opening/closing member 332 comprises: an engagement part 332c which comes into contact with the side of the shutter 304a of the disk cartridge 304 and is engaged with the depression 304b provided at the front of the disk cartridge 304; and a plate shaped projection 332d projecting from the engagement part 332c in a direction (E direction) in which the shutter 304a is opened.

The shutter opening/closing member 332 having the above construction is latched to the end of the arm 306a by the slit 332a and the boss 332b so that the shutter opening/closing member 332 can be fixed to the end of the arm 306a without using a screw or an adhesive. This construction makes the assembling process more efficient.

Since the function of the shutter opening/closing member 332 is the same as that of the fourth embodiment, the description thereof is omitted.

FIGS. 50A, 50B, 51A, 51B, 52A and 52B show a sixth embodiment of the present invention. FIGS. 50A and 50B shows a magnetic disk device 341 according to the sixth embodiment; FIGS. 51A and 51B are enlarged top views of a latch lever 343 for pressing the shutter 304a in the opening direction; and FIGS. 52A and 52B are side views showing the cartridge insertion/ejection position and the disk-mounting position of a holder 342.

The magnetic disk 341 is constituted such that, when the disk cartridge 304 is inserted into the holder 342, the holder 342 slides in the A direction and lowered to the disk-mounting position.

The holder 342 is constituted such that the latch lever 343 is rotatably provided on a top plate 342a, engaging pins 342d projecting from sides 342b and 342c of the holder 342. The engaging pins 342d of the holder 342 are engaged with a guide grooves 344b provided in an inner wall 344a of the frame 344. A stepped part 344c is provided in each of the guide grooves 344b.

When the holder 342 is at the cartridge insertion/ejection position, the engaging pins 342d are engaged with the stepped part 344c of the guide grooves 344b. When the disk cartridge 304 is inserted into the holder 342, the holder 342 moves in the A direction, and the engaging pins 342d are removed from the stepped part 344c of the guide grooves 344b. Thus, the holder 342 is lowered to the disk-mounting position.

The magnetic disk device 341 is not provided a slider such as the ones described previously. Instead, there is provided a returning mechanism (not shown) for returning the holder 342 from the disk-mounting position to the cartridge-insertion position when an eject button 346 provided in a front bezel 345 is pressed in the A direction.

This returning mechanism comprises a plurality of links, and a detailed description thereof is omitted.

Referring to FIGS. 50A and 50B, a magnetic head unit 348 having a magnetic head 347 is provided to the left of the holder 342 and is constructed to extend laterally, that is, at right angles with the A-B direction in which the disk cartridge 304 is inserted and ejected. The magnetic head 347 slides on the magnetic disk 303 inside the disk cartridge 304 through an opening 342e provided in the top plate 342a of the holder 342.

The magnetic head unit 348 comprises: a carriage 350 having a head arm 349 for supporting the magnetic head 347; a lead screw 351 screw coupled to the carriage 350; and a stepping motor 352 for driving the lead screw 351.

The head arm 349 extends from left to right with respect to the holder 342, the magnetic head 347 being aligned with the side of the holder 342 and with the magnetic disk 303 inside the disk cartridge 304 inserted into the holder 342, when the head slides on the disk. The carriage 350 moves in the A-B direction by a distance in proportion to the amount of rotation of the lead screw 351 driven by the stepping motor 352. Correspondingly, the magnetic head 347 moves in the radial direction of the magnetic disk 303.

The latch lever 343 is rotatably supported by a pivot 353 formed to stand on the top plate 342a of the holder 342, and has generally the same construction as the latch lever 306 of the third embodiment. That is, the latch lever 343 comprises an arm 343a having a shutter opening/closing member 354; a pivot hole 343b engageable with the pivot 353; a rotation restraining part 343c for restraining the rotating motion of the latch lever 343 by coming into contact with a stopper 355 projecting from an inner rear wall of the frame 344; a latching hole 343d to which one end of the coil spring 356 is latched; a supporting part 343e which, provided by bending the end of the arm 343a downward, supports the shutter opening/closing member 354; and an engagement part 343f which, projecting longitudinally from the end of the arm 343a, is engaged with the periphery of an arc shaped guide hole 342g provided in the top plate 342a of the holder 342 so as to define the vertical position of the end of the arm 343a.

The supporting part 343e is inserted into the holder 342 through the arc shaped guide hole 342g provided in the top plate 342a of the holder 342, and the shutter opening/closing member 354 fixed to the supporting part 343e is rotated in the guide hole 342g.

The shutter opening/closing member 354 is formed of a plastic and is fixed to the supporting part 343e of the latch lever formed by working a sheet of metal. The shutter opening/closing member 354 comprises: a fixing part 354a fixed to the supporting part 343e; an engagement part 354b which comes into contact with the side of the shutter 304a of the disk cartridge 304 and is engaged with the depression 304b provided at the front of the disk cartridge 304; and a plate shaped projection 354c projecting from the engagement part 354b in a direction (E direction) in which the shutter 304a is opened.

The engagement part 354b is supported by the supporting part 343e formed by bending the end of the arm 343a 90°, and extends vertically such that the vertical dimension of the engagement part 354b is greater than the thickness of the shutter 304a of the disk cartridge 304. Accordingly, the engagement part 354b comes into contact with the sides of the upper portion and the lower portion of the shutter 304a, there being a substantially aligned relation between the side of the disk cartridge 304, the sides of the upper and lower portion of the shutter 304a and the engagement part 354b. Thereby, the upper and lower portions of the shutter 304a are simultaneously thrust in the opening direction. The operation of opening the shutter 304a by the pressing force of the engagement part 354b can be performed in a more stable manner.

In the above described construction, in which a slider is not provided, it is possible to open and close the shutter 304a in a stable manner by providing the latch lever 343, and to prevent displacement of the cartridge mounting position by the engagement part 354b being engaged with the depression 304b of the cartridge 304 when the disk cartridge 304 is mounted. Moreover, the projection 354c projecting from the engagement part 354b is inserted between the front of the disk cartridge 304 and the shutter 304a so that the engagement part 354b is prevented from detached from the depression 304b even if an external impact is applied. In this way, malfunctions such as an accident wherein the magnetic head 347 is gripped by the shutter 304a can be prevented.

FIGS. 53A, 53B, 54A, 54B, 55, 56 and 57 show a seventh embodiment of the present invention. FIGS. 53A and 53B show a magnetic disk device 361 according to the seventh embodiment; FIGS. 54A and 54B show the shape of a latch lever 362; and FIG. 55 is a top view showing the state of the disk cartridge 304 when it is inserted into the device. FIG. 56 is a top view showing the disk cartridge 304 tilted leftward; FIG. 57 is a top view showing the condition of the disk cartridge 304 as it returns to be level by coming into contact with the latch lever 362.

In this embodiment, the magnetic disk device 361 has the same construction as the aforementioned magnetic disk device 341, the latch lever 362 being an only exception. The same components are designated by the same reference numerals, and the description thereof is omitted.

As in the case of the magnetic disk device 341 according to the sixth embodiment, the magnetic head unit 348 is provided to the left of the holder 342 so as to extend in the lateral direction at right angles with the A-B direction, that is, the direction in which the disk cartridge 304 is inserted and ejected. The latch lever 362 is provided in the holder 342 of this magnetic disk device 361.

The latch lever 362 comprises: an arm 362a having a shutter opening/closing member 363; a pivot hole 362 engageable with the pivot 353; a rotation restraining part 362c which, coming into contact with the stopper 355 projecting from the inner rear wall of the frame 344, restrains the rotation of the latch lever 362; a latching hole 362d to which one end of the coil spring 356 is latched; a supporting part 362e which, formed by longitudinally bending the end of the arm 362a downward, supports the shutter opening/closing member 363; an engagement part 362f which, projecting longitudinally from the end of the arm 362a, is engaged with the periphery of an arc shaped guide hole 342g provided in the top plate 342a of the holder 342 so as to define the vertical position of the end of the arm 362a.

The supporting part 362e is inserted into the holder 342 through the arc shaped guide hole 342g provided in the top plate 342a of the holder 342, and the shutter opening/closing member 363 fixed to the supporting part 362e is rotated in the guide hole 342g.

The shutter opening/closing member 363 is formed of a plastic and is fixed to the supporting part 262e of the latch lever 363 formed by working a sheet of metal. The shutter opening/closing member 363 comprises: a fixing part 363a fixed to the supporting part 362e; a shutter contact part 363b which comes into contact with the side of the shutter 304a of the disk cartridge 304; a plate shaped first projection 363c projecting from the shutter contact part 363b in a direction (E direction) in which the shutter 304a is opened; a second projection 363d which, coming into contact with the front of the disk shutter 304a when the disk cartridge 304 starts to be inserted, maintains the shutter 304a in position in the longitudinal direction (A-B direction); and a contact face 363e coming into contact with a depression 304e provided at the front of the cartridge 304.

The cartridge contact face 363e is provided in the fixing part 363a formed by bending the end of the arm 362a 90° downward, and comes into contact with the depression 304e of the disk cartridge 304 inserted into the holder 342. A chamfered part 363f is provided at a right corner of the cartridge contact face 363e. The chamfered part 363f is formed at an angle of about 45°. When the disk cartridge 304 is inserted while being tilted leftward, the chamfered part 363f comes into contact with a slope 304f provided to the right of the depression 304e so as to return the disk cartridge 304 to a level position.

The cartridge contact part 363e extends vertically and has a vertical dimension greater than the thickness of the shutter 304a. Accordingly, the cartridge contact part 363e comes into contact with the depression 304e provided at the front of the disk cartridge 304 while the disk cartridge 304 is being inserted into the holder 342.

A description will now be given of the insertion operation of the disk cartridge 304.

When the disk cartridge 304 is inserted into the holder 305 via a disk insertion opening 345a of the front bezel 345, the front of the disk cartridge 304 moves in the A direction to come into contact with the shutter opening/closing member 363 provided at the end of the latch lever 362. When the latch lever 362 starts to be rotated clockwise in response to the insertion of the disk cartridge 304, the first projection 363c of the shutter opening/closing member 363 advances leftward into the shutter 304a. At the start of the insertion operation of the disk cartridge 304, the shutter contact part 363b comes into contact with the right side of the shutter 304a, and the second projection 363d comes into contact with the front of the shutter 304a, so that the shutter 304a is maintained in position longitudinally.

When the disk cartridge 304 is pressed in the A direction, the latch lever 362 is rotated clockwise so that the shutter contact part 363b presses the shutter 304a in the opening direction (E direction). As the disk cartridge 304 is further inserted in the A direction, the shutter 304a slides in the E direction until the shutter 304a is open all the way.

During the opening operation of the shutter 304a, the latch lever 362 is rotated clockwise, and second projection 363d is separated from the front of the shutter 304a.

In the disk device 361 of this embodiment wherein the head carriage 348 extends laterally, the recess 342e spanning the distance that the head carriage 348 travels is provided to the left of the holder 342 to allow for the travel of the head carriage 348.

When the disk cartridge 304 is inserted into the holder 342 having the above construction, only the right side of the disk cartridge 304 is guided by the holder 342 since the recess 342e is provided in the left side of the holder 342.

When the shutter opening/closing member 363 of the latch lever 362 comes into contact with the side of the shutter 304a of the disk cartridge 304 so as to slide the shutter 304a in the opening direction as the disk cartridge 304 is inserted, a spring member urging the shutter 304a in the closing direction causes the disk cartridge 304 to be tilted, inside the holder 342, leftward toward the recess 342e. As a result of this, the disk cartridge 304 projects from the side of the recess 342e so that it is impossible to mount the disk cartridge 304 in a predetermined position.

A potential problem is that if the holder 342 is lowered to the mounting position while the inserted disk cartridge 304 is inclined leftward inside the holder 342, the side of the disk cartridge 304 comes into contact with the head carriage 348, thus preventing the head carriage 348 from moving, and causing the precision of the magnetic recording and reproduction to be lowered.

However, in this embodiment, as shown in FIG. 56, when the inserted disk cartridge 304 is tilted leftward, the chamfered part 363f provided in the shutter opening/closing part 363 of the latch lever 362 comes into contact with the slope 304f provided to the right of the depression 304e of the disk cartridge 304. Accordingly, because of the contact of the slope 304f with the chamfered part 363f, a rightward force Fa is exerted to the slope 304f of the cartridge 304 in reaction to the pressing and insertion of the disk cartridge 304, and a force Fb pressing the disk cartridge 304 in the B direction is exerted on the slope 304f.

The force Fb is substantially smaller than the force which presses the disk cartridge 304 in the direction of the insertion. Hence, the force Fb may be neglected in the cartridge insertion operation.

The latch lever 362 is urged counterclockwise by the tension of the coil spring 356, the coil spring 356 being expanded in response to the clockwise rotation of the latch lever 362, thus increasing the tension of the coil spring 356. Thus, when the disk cartridge 304 has been inserted into the holder 342, the chamfered part 363f of the latch lever 363 presses the slope 304f of the disk cartridge 304 rightward with the force Fa so as to return the disk cartridge 304 to a level position.

When the disk cartridge 304 reaches the end position as it is inserted into the holder 342, the finger that has hitherto been used to press the disk cartridge 304 in the insertion direction (A direction) is removed from the disk cartridge 304. Due to this absence of the force pressing the disk cartridge 304 in the insertion direction (A direction), and due to the contact of the chamfered part 363f of the latch lever 362 with the slope 304f of the disk cartridge 304, the force Fb pressing the disk cartridge 304 in the B direction is exerted. However, since the first projection 363c of the shutter opening/closing member 363 is engaged with the shutter 304a, the disk cartridge 304 is prevented from being returned in the B direction.

Due to the contact of the cartridge contact face 363e of the latch lever 362 with the depression 304e of the disk cartridge 304, the disk cartridge 304 is maintained in a level position. Once this condition holds, the disk cartridge 304 is returned to a level position even when tilted temporarily leftward, due to an interaction between the chamfered part 363f of the latch lever 362 and the slope 304f of the disk cartridge 304.

In this way, tilting of the disk cartridge 304 and the resultant detaching of the depression 304d (see FIG. 48) of the disk cartridge 304 from the boss 331 are prevented. Also, the disk cartridge 304 is prevented from coming into contact with the head carriage 348 by projecting laterally from the recess 342e.

The first through seventh embodiments have been described. The application of the present invention is not limited to magnetic disk devices, and may extend to optical disk devices and magnetooptic disk devices, and the like.

The present invention is not limited to the above described embodiments, and variations and modifications may be made without departing from the scope of the present invention.

What is claimed is:

1. A disk device in which a disk cartridge accommodating a disk-shaped recording medium is inserted, the disk cartridge having a movable shutter which is openable to expose the recording medium for reading or writing data from or on the recording medium, said disk device comprising:

a holder holding the disk cartridge;

a slider raising and lowering said holder; and a latch member latching said slider before the disk cartridge is inserted into said disk device, said latch member releasing its latching action on said slider at a predetermined position responsive to insertion of the disk cartridge into said disk device so as to locate said disk cartridge inside said holder at a predetermined position;

said slider comprising a cam engagement portion;

said latch member comprising a shutter engagement portion engaged with the shutter of the disk cartridge, and a cam portion; and said slider moving so that said cam engagement portion of said slider comes into engagement with said cam portion of said latch member, when said latch member releases its latching action on said slider, to exert a force on said cam portion for moving said shutter engagement portion of said latch member in a direction in which the disk cartridge is further inserted into said disk device.

2. The disk device as claimed in claim 1, wherein said cam portion of said latch member is oblique to a direction in which said cam engagement portion of said slider moves when said latch member releases its latching action on said slider; and when said latch member releases its latching action on said slider, said slider moves so that said cam engagement portion of said slider pushes said cam obliquely, said latch member being thereby rotated so that said shutter engagement portion of said latch member applies a force to the shutter of the disk cartridge, and said disk cartridge is moved by said shutter in the direction in which said disk cartridge is further inserted into said disk device.

* * * * *